US012432745B2

(12) United States Patent
MolavianJazi et al.

(10) Patent No.: US 12,432,745 B2
(45) Date of Patent: Sep. 30, 2025

(54) ACKNOWLEDGEMENT INFORMATION REPORTING FOR MULTI-CELL SCHEDULING

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 17/938,292

(22) Filed: Oct. 5, 2022

(65) Prior Publication Data

US 2023/0139269 A1 May 4, 2023

Related U.S. Application Data

(60) Provisional application No. 63/254,874, filed on Oct. 12, 2021.

(51) Int. Cl.
*H04W 72/23* (2023.01)
*H04L 1/1812* (2023.01)
*H04W 72/1273* (2023.01)

(52) U.S. Cl.
CPC .......... *H04W 72/23* (2023.01); *H04L 1/1812* (2013.01); *H04W 72/1273* (2013.01)

(58) Field of Classification Search
None
See application file for complete search history.

(56) References Cited

U.S. PATENT DOCUMENTS

| 12,302,394 B2 * | 5/2025 | Huang ............... H04L 27/2607 |
| 2012/0195265 A1 | 8/2012 | Kim et al. |

(Continued)

FOREIGN PATENT DOCUMENTS

| WO | 2019139908 A1 | 7/2019 |
| WO | 2021035437 A1 | 3/2021 |

OTHER PUBLICATIONS

International Search Report and Written Opinion issued Jan. 31, 2023 regarding International Application No. PCT/KR2022/015392, 7 pages.
"3rd Generation Partnership Project; Technical Specification Group Radio Access Network; NR; Physical layer procedures for control (Release 16)", 3GPP TS 38.213 V16.7.0, Sep. 2021, 188 pages.

(Continued)

*Primary Examiner* — Otis L Thompson, Jr.

(57) ABSTRACT

A method for acknowledgement information enhancement includes receiving first information for first cells; second information for second cells; first and second DCI formats; and N PDSCHs on N cells, from the second cells, which are scheduled by a DCI format from the second DCI formats. The method further includes determining first HARQ-ACK information bits associated with the first DCI formats and second HARQ-ACK information bits associated with the second DCI formats. The second HARQ-ACK information bits include, for the DCI format, $M=\Sigma_{i \in N} M_i$ HARQ-ACK information bits corresponding to receptions of the N PDSCHs on N cells, in ascending order of cell indexes for the N cells and $(M_{max}-M)$ HARQ-ACK information bits with NACK values that are appended to the M HARQ-ACK information bits. The method further transmitting a channel that includes a HARQ-ACK codebook generated by appending the second HARQ-ACK information bits to the first HARQ-ACK information bits.

18 Claims, 7 Drawing Sheets

(56) References Cited

U.S. PATENT DOCUMENTS

| | | | |
|---|---|---|---|
| 2013/0258914 A1 | 10/2013 | Seo et al. | |
| 2014/0036749 A1* | 2/2014 | Wang | H04W 72/20 370/328 |
| 2017/0273056 A1* | 9/2017 | Papasakellariou | H04W 52/44 |
| 2018/0013522 A1 | 1/2018 | Liu et al. | |
| 2018/0019843 A1* | 1/2018 | Papasakellariou | H04L 5/0091 |
| 2019/0356456 A1 | 11/2019 | Park | |
| 2020/0154410 A1* | 5/2020 | Suzuki | H04W 72/23 |
| 2020/0162207 A1 | 5/2020 | Hwang et al. | |
| 2020/0228289 A1* | 7/2020 | He | H04L 1/1861 |
| 2021/0127385 A1* | 4/2021 | Kung | H04L 5/0007 |
| 2021/0168762 A1* | 6/2021 | Huang | H04B 7/0456 |
| 2021/0282182 A1* | 9/2021 | Nogami | H04W 74/08 |
| 2022/0173867 A1* | 6/2022 | Nogami | H04L 5/001 |
| 2022/0330115 A1* | 10/2022 | Back | H04W 76/20 |
| 2022/0353889 A1* | 11/2022 | Lin | H04L 1/1864 |
| 2022/0353894 A1* | 11/2022 | Nogami | H04L 5/0053 |
| 2023/0180260 A1* | 6/2023 | Nogami | H04W 72/231 370/329 |
| 2023/0262712 A1* | 8/2023 | Park | H04W 72/23 370/336 |
| 2023/0319842 A1* | 10/2023 | Nogami | H04W 72/12 370/329 |
| 2024/0007228 A1* | 1/2024 | Wu | H04W 72/20 |

OTHER PUBLICATIONS

"5G; NR; Physical channels and modulation (3GPP TS 38.211 version 16.5.0, Release 16)", ETSI TS 138 211 V16.5.0, Apr. 2021, 138 pgs.

"5G; NR; Multiplexing and channel coding (3GPP TS 38.212 version 16.5.0 Release 16)", ETSI TS 138 212 V16.5.0, Apr. 2021, 155 pages.

"5G; NR; Physical layer procedures for control (3GPP TS 38.213 version 16.5.0 Release 16)", ETSI TS 138 213 V16.5.0, Apr. 2021, 188 pages.

"5G; NR; Physical layer procedures for data (3GPP TS 38.214 version 16.5.0 Release 16)", ETSI TS 138 214 V16.5.0, Apr. 2021, 173 pages.

"5G; NR; Medium Access Control (MAC) protocol specification (3GPP TS 38.321 version 16.4.0 Release 16)", ETSI TS 138 321 V16.4.0, Apr. 2021, 159 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

"5G; NR; NR and NG-RAN Overall description; Stage-2 (3GPP TS 38.300 version 16.5.0 Release 16)", ETSI TS 138 300 V16.5.0, Apr. 2021, 153 pages.

Extended European Search Report issued Nov. 13, 2025 regarding Application No. 22881343.2, 10 pages.

* cited by examiner

ACKNOWLEDGEMENT INFORMATION REPORTING FOR MULTI-CELL SCHEDULING

CROSS-REFERENCE TO RELATED APPLICATION AND CLAIM OF PRIORITY

This application claims priority under 35 U.S.C. § 119(e) to U.S. Provisional Patent Application No. 63/254,874 filed on Oct. 12, 2021. The above-identified provisional patent application is hereby incorporated by reference in its entirety.

TECHNICAL FIELD

The present disclosure relates generally to wireless communication systems and, more specifically, the present disclosure relates to acknowledgement information reporting for multi-cell scheduling.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to acknowledgement information reporting for multi-cell scheduling.

In one embodiment, a method is provided. The method includes receiving first information for first cells; second information for second cells; first downlink control information (DCI) formats; second DCI formats; and N PDSCHs on N cells, from the second cells, which are scheduled by a DCI format from the second DCI formats. Each DCI format from the first DCI formats is associated with scheduling a physical downlink shared channel (PDSCH) reception on a cell from the first cells. Each DCI format from the second DCI formats is associated with scheduling more than one PDSCH reception on respective more than one cell from the second cells. The method further includes determining first hybrid automatic repeat request acknowledgement (HARQ-ACK) information bits associated with the first DCI formats and determining second HARQ-ACK information bits associated with the second DCI formats. The second HARQ-ACK information bits include, for the DCI format, $M = \Sigma_{i \in N} M_i$ HARQ-ACK information bits corresponding to receptions of the N PDSCHs on N cells, in ascending order of cell indexes for the N cells and ($M_{max} - M$) HARQ-ACK information bits with negative acknowledgement (NACK) values that are appended to the M HARQ-ACK information bits. $M_i$ is a number of HARQ-ACK information bits associated with a reception of a PDSCH from the N PDSCHs, on cell i from the N cells. $M_{max}$ is a maximum number of HARQ-ACK information bits for each DCI format from the second DCI formats. The method further includes generating a HARQ-ACK codebook by appending the second HARQ-ACK information bits to the first HARQ-ACK information bits and transmitting a physical uplink control channel (PUCCH) or a physical uplink shared channel (PUSCH) that includes the HARQ-ACK codebook.

In another embodiment, a user equipment (UE) is provided. The UE includes a transceiver configured to receive first information for first cells; second information for second cells; first DCI formats; second DCI formats; and N PDSCHs on N cells, from the second cells, which are scheduled by a DCI format from the second DCI formats. Each DCI format from the first DCI formats is associated with scheduling a PDSCH reception on a cell from the first cells. Each DCI format from the second DCI formats is associated with scheduling more than one PDSCH receptions on respective more than one cells from the second cells. The UE further includes a processor operably connected to the transceiver. The processor is configured to determine first HARQ-ACK information bits associated with the first DCI formats, determine second HARQ-ACK information bits associated with the second DCI formats, and generate a HARQ-ACK codebook by appending the second HARQ-ACK information bits to the first HARQ-ACK information bits. The second HARQ-ACK information bits include, for the DCI format, $M = \Sigma_{i \in N} M_i$ HARQ-ACK information bits corresponding to receptions of the N PDSCHs on N cells, in ascending order of cell indexes for the N cells and ($M_{max} - M$) HARQ-ACK information bits with NACK values that are appended to the M HARQ-ACK information bits. $M_i$ is a number of HARQ-ACK information bits associated with a reception of a PDSCH from the N PDSCHs, on cell i from the N cells. $M_{max}$ is a maximum number of HARQ-ACK information bits for each DCI format from the second DCI formats. The transceiver is further configured to transmit a PUCCH or a PUSCH that includes the HARQ-ACK codebook.

In yet another embodiment, a base station (BS) is provided. The BS includes a transceiver configured to transmit first information for first cells; second information for second cells; first DCI formats; second DCI formats; and N PDSCHs on N cells, from the second cells, that are scheduled by a DCI format from the second DCI formats and receive a PUCCH or a PUSCH that includes a HARQ-ACK codebook that includes second HARQ-ACK information bits appended to first HARQ-ACK information bits. Each DCI format from the first DCI formats is associated with scheduling a PDSCH transmission on a cell from the first cells. Each DCI format from the second DCI formats is associated with scheduling more than one PDSCH transmissions on respective more than one cells from the second cells. The BS further includes a processor operably connected to the transceiver. The processor is configured to identify the first HARQ-ACK information bits that are associated with the first DCI formats and identify the second HARQ-ACK information bits that are associated with the second DCI formats. The second HARQ-ACK information bits include, for the DCI format, $M = \Sigma_{i \in N} M_i$ HARQ-ACK information bits corresponding to transmissions of the N PDSCHs on N cells, in ascending order of cell indexes for the N cells and ($M_{max} - M$) HARQ-ACK information bits with NACK values that are appended to the M HARQ-ACK information bits. $M_i$ is a number of HARQ-ACK information bits associated with a transmission of a PDSCH from the N PDSCHs, on cell i from the N cells. $M_{max}$ is a maximum number of HARQ-ACK information bits for each DCI format from the second DCI formats.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
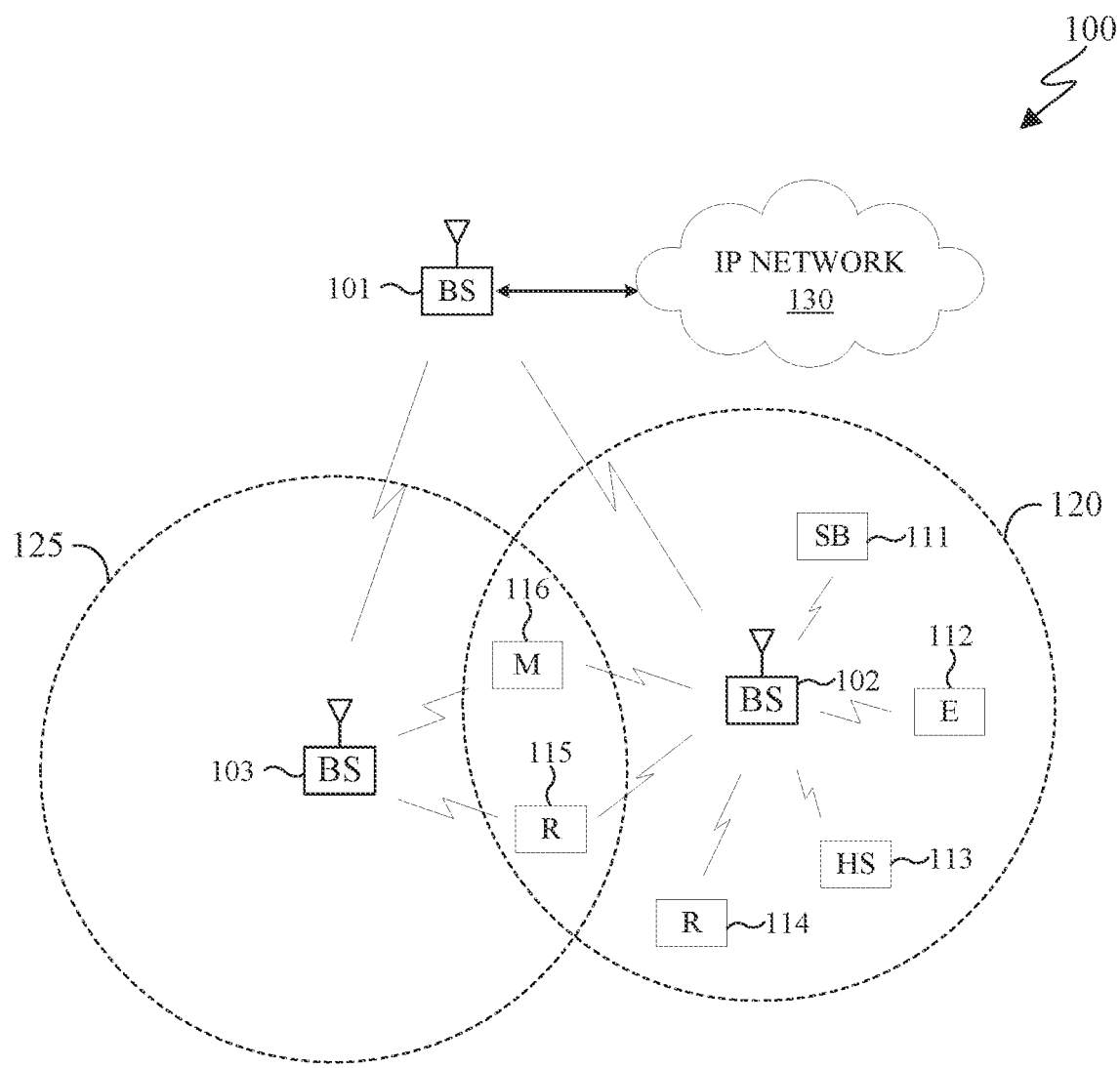
FIG. 1 illustrates an example wireless network according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.5.0, "NR; Physical channels and modulation" ["REF1"]; 3GPP TS 38.212 Rel-16 v16.5.0, "NR; Multiplexing and channel coding" ["REF2"]; 3GPP TS 38.213 Rel-16 v16.5.0, "NR; Physical layer procedures for control" ["REF3"]; 3GPP TS 38.214 Rel-16 v16.5.0, "NR; Physical layer procedures for data" ["REF4"]; 3GPP TS 38.321 Rel-16 v16.4.0, "NR; Medium Access Control (MAC) protocol specification" ["REF5"]; 3GPP TS 38.331 Rel-16 v16.4.1, "NR; Radio Resource Control (RRC) protocol specification" ["REF6"]; and 3GPP TS 38.300 Rel-16 v16.5.0, "NR; NR and NG-RAN Overall Description; Stage 2" ["REF7"].

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
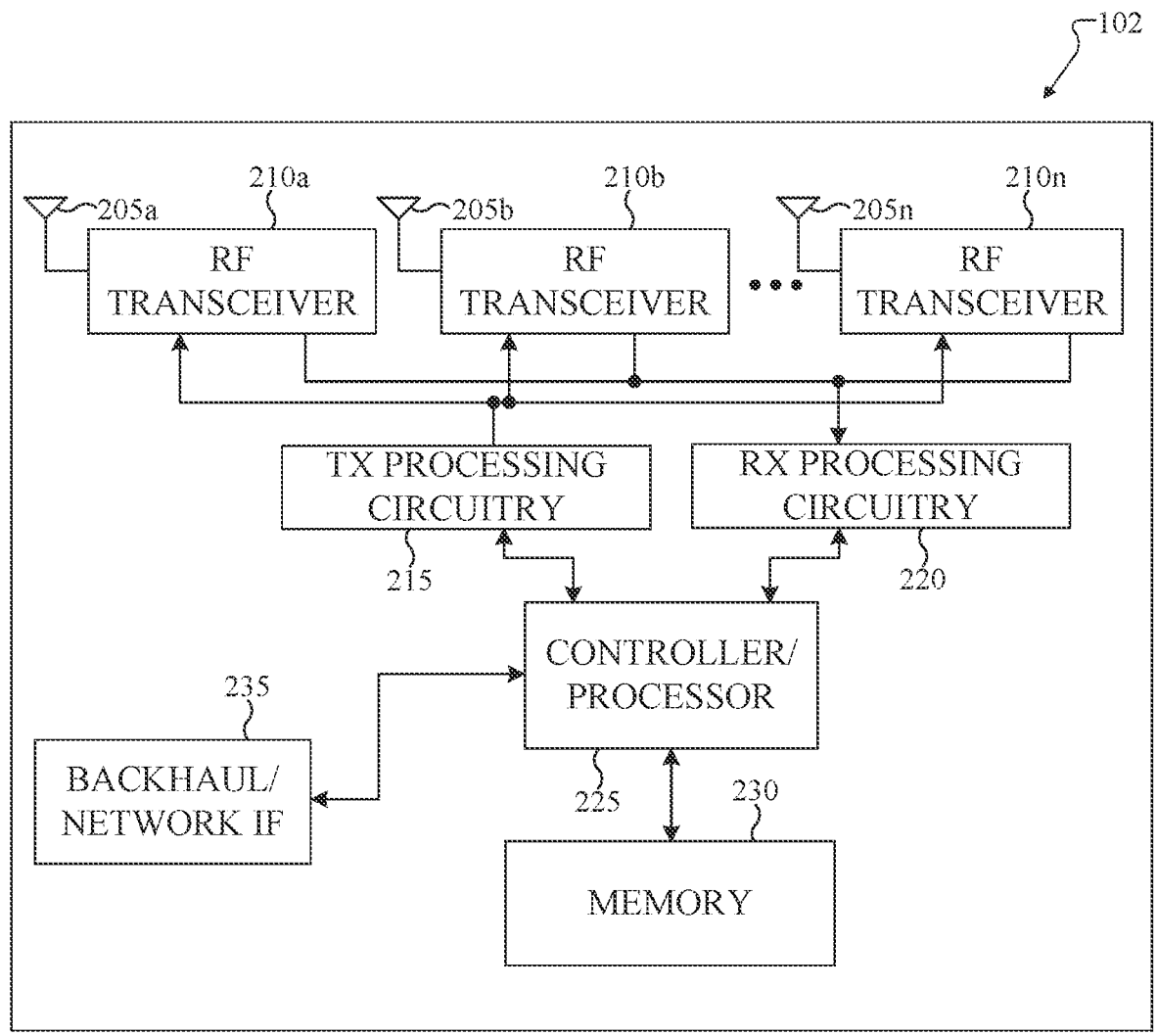
FIG. 2 illustrates an example BS according to embodiments of the present disclosure.
Figure 3:
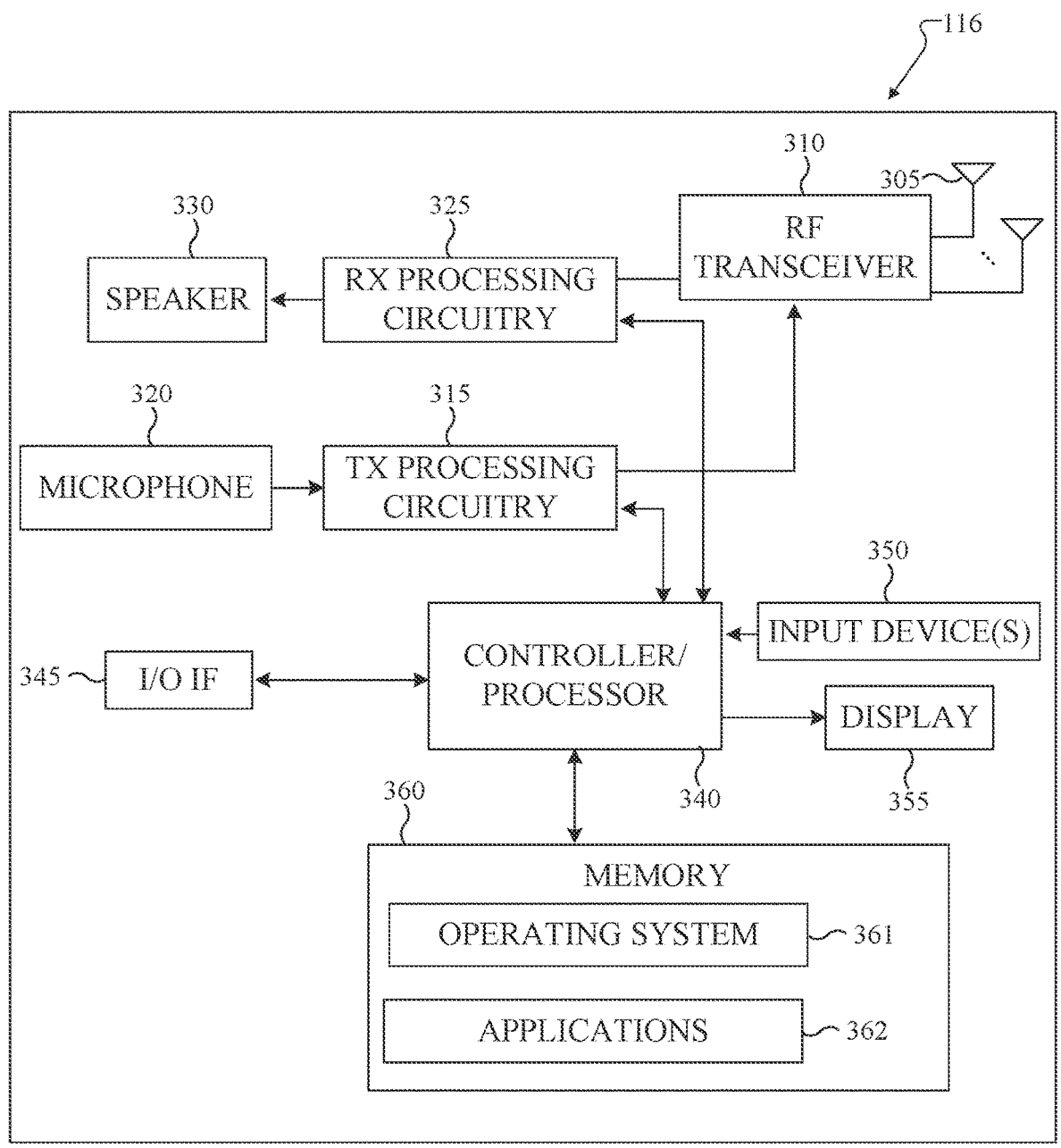
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In certain embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for acknowledgement information for multi-cell scheduling. In certain embodiments, and one or more of the BSs 101-103 includes circuitry, programing, or a combination thereof for acknowledgement information for multi-cell scheduling.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support acknowledgement information for multi-cell scheduling. Any of a wide variety of other functions could be supported in the BS 102 by the controller/processor 225. In certain embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In certain embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In certain embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
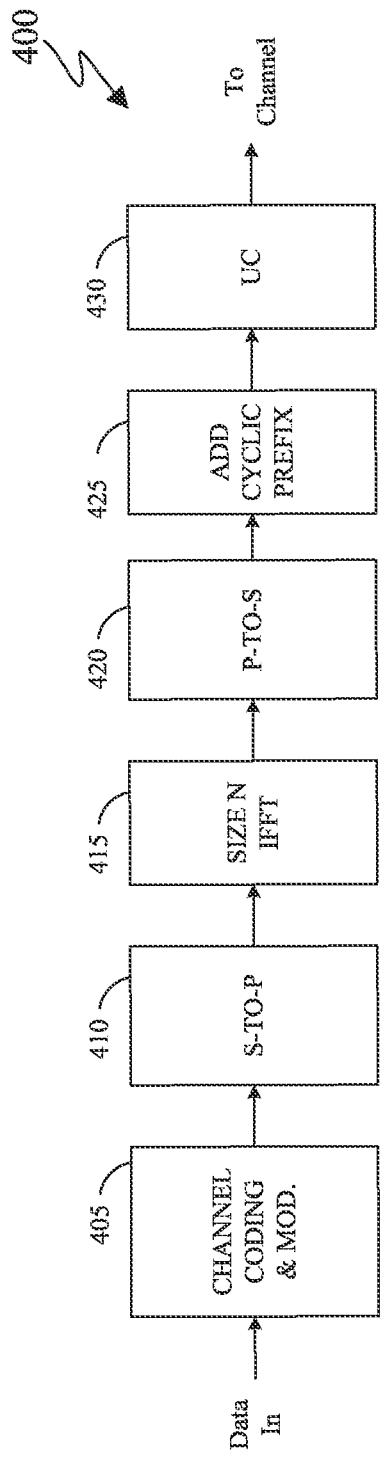
FIGS. 4 and 5 illustrate example wireless transmit and receive paths according to embodiments of the present disclosure.
Figure 5:
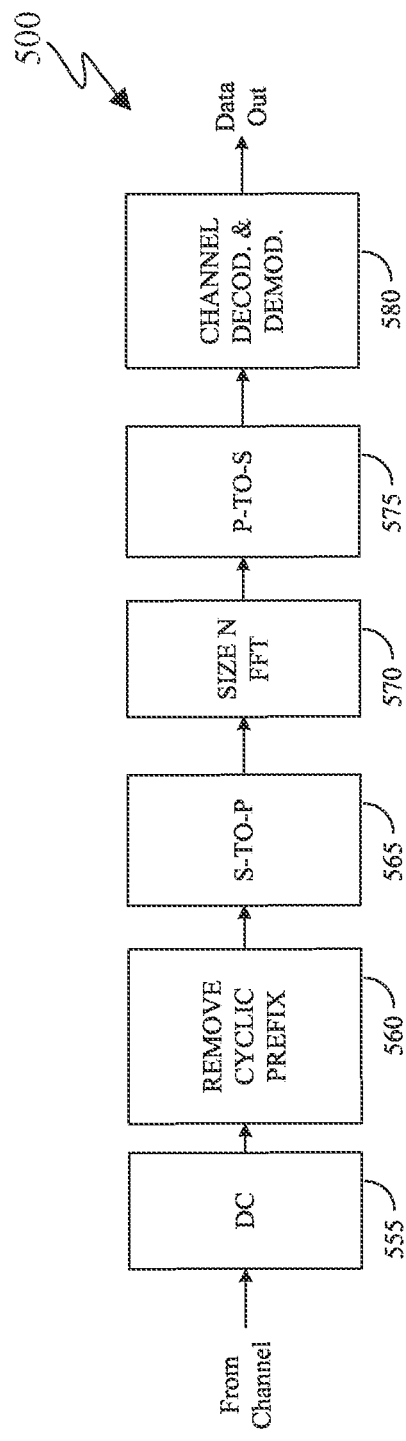

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In certain embodiments, the receive path 500 is configured to support acknowledgement information for multi-cell scheduling as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Various embodiments of the present disclosure relate to a pre-5th-Generation (5G) or 5G or beyond 5G communication system to be provided for supporting one or more of: higher data rates, lower latency, higher reliability, improved coverage, and massive connectivity, and so on. Various embodiments apply to UE's operating with other radio access technology (RAT) and/or standards, such as different releases/generations of 3GPP standards (including beyond 5G, 5G Advanced, 6G, and so on), IEEE standards (such as 802.16 WiMAX and 802.11 Wi-Fi and so on), and so forth.

Various embodiments of the present disclosure provide enhancements for cross-carrier scheduling operation in a carrier aggregation (CA) framework to support joint scheduling of multiple cells such as by using a single downlink control information (DCI) format or a two-stage DCI format.

In 5G NR systems of Rel-15/16, a downlink or uplink data transmission can be scheduled only for a single serving cell. In other words, a DCI format provides scheduling information parameters for a physical downlink shared channel (PDSCH) or a physical uplink shared channel (PUSCH) on a single serving cell. If the serving cell is a scheduled cell, the UE receives a DCI format for the PDSCH/PUSCH in a physical downlink control channel (PDCCH) that the UE receives on a corresponding scheduling cell. Based on a carrier indication field (CIF) in the DCI format, the UE can determine a serving cell on which the UE can receive the PDSCH or transmit the PUSCH.

Embodiments of the present disclosure take into consideration that Rel-15/16 NR system does not support joint scheduling of multiple PDSCHs or multiple PUSCH on multiple cells using a single/common control signaling, such as by using a single DCI format. For such operation, the UE receives multiple DCI formats, wherein each DCI format can schedule one of the multiple PDSCHs or PUSCHs on one of the serving cells. Such operation achieves the intended outcome, but with possibly high signaling overhead. In various scenarios, it is possible that several scheduling parameters or corresponding UE operations are shared among the multiple PDSCHs or PUSCHs on the jointly scheduled cells, referred to as co-scheduled cells.

For example, the UE may use a same physical uplink control channel (PUCCH) resource to transmit hybrid automatic repeat request (HARQ)—acknowledgement (ACK) feedback corresponding to the multiple PDSCHs. Therefore, an indication for the same PUCCH resource (and corresponding operations for PUCCH transmission) may be unnecessarily repeated multiple times. In addition, in some scenarios, such as intra-band CA, it is likely that physical channel conditions are correlated, so various scheduling parameters pertaining link adaptation, MIMO/beamforming operation, and even possibly resource allocation can be common and repeated among the co-scheduled cells. Such unnecessary overhead in control signaling can be significant, especially when the number of co-scheduled cells are large, such as 4-8 cells. Last but not least, cyclic redundancy check (CRC) field needs to be repeated multiple times, which incurs significant signaling overhead, especially for large number of co-scheduled cells.

Design of HARQ-ACK codebooks in Rel-15/16 5G NR systems is based on consideration of single PDSCH reception on a single serving cell that is individually scheduled by a corresponding DCI format, herein referred to as DCI formats for single-cell scheduling (SC-DCI format). For example, HARQ-ACK information corresponding to each DCI (in case of TB-based PDSCH reception) is 1 or 2 bits, depending on whether a corresponding PDSCH includes 1 or 2 transport blocks (TBs). For a Type-2 or "dynamic" HARQ-ACK CB, definition of downlink assignment index (DAI) aims to detect missed DCIs, so each DAI refers to a single DCI and a single corresponding PDSCH. Other HARQ-ACK design aspects, such as total DAI in uplink (UL) DCI formats and HARQ timeline considerations, rely on the same assumption for single-cell scheduling.

When the UE receives a DCI format for joint scheduling of multiple PDSCHs on a set of co-scheduled cells, the DCI format triggers multiple HARQ-ACK information bits, no less than a number of co-scheduled PDSCHs/cells (and with up to a factor of 2 of the number, if any of the co-scheduled cells is configured with 2-TB per PDSCH). In addition, the UE may have separate TDRA table or K1 configuration for multi-cell scheduling compared to single-cell scheduling.

Therefore, embodiments of the present disclosure take into consideration that there is a need for multi-cell scheduling, wherein multiple cells can be jointly scheduled using reduced signaling overhead, such as by using only a single DCI format.

Embodiments of the present disclosure take into consideration that there is a need to extend Type-2 HARQ-ACK codebooks to accommodate DCI formats for multi-cell scheduling, including definition and operation of counter/total DAI in downlink (DL) DCI formats for PDSCH reception (with single-cell or multi-cell scheduling), ordering of HARQ-ACK information bits, and design of total DAI in uplink (UL) DCI formats for PUSCH transmission.

Additionally, embodiments of the present disclosure take into consideration that there is a need to develop such extensions by taking into account various mechanisms for multi-cell scheduling, such as a one-stage DCI format (for example, with multi-cell mapping) or two-stage DCI formats with a $1^{st}$-stage DCI carried by a PDCCH and a $2^{nd}$-stage DCI carried by a PDSCH/PDCCH.

Accordingly, embodiments of the present disclosure provide methods and apparatus for multi-cell scheduling with reduced signaling overhead such as a by a single DCI format.

Enhancements for Type-2 HARQ-ACK codebooks are presented wherein a UE with multi-cell scheduling configuration can define a counter/total DAI per scheduled PDSCH, as opposed to per DCI in UE behavior as described in [REF3]. In addition, the UE can assign multiple consecutive DAI values for the multiple co-scheduled PDSCH indicated by a DCI format for multi-cell scheduling, wherein the DAI values are assigned to a reference serving cell, such as a cell with smallest/largest cell index or CIF, or a cell with first/earliest or last/latest PDSCH reception, among the co-scheduled cells/PDSCHs. Methods are disclosed to align definition, operation, and size of counter/total DAI in downlink (DL) DCI formats for multi-cell scheduling with those of counter/total DAI in DL DCI formats for single-cell scheduling, and also those of total DAI in UL DCI formats for PUSCH(s) that carry the Type-2 CB. For example, when the UE generates a same Type-2 CB for both single-cell scheduling and multi-cell scheduling, the UE needs to increase a size of DL counter/total DAI for multi-cell scheduling, and so for a size of DL counter/total DAI for single-cell scheduling. In another example, when the UE generates different Type-2 sub-CBs for single-cell scheduling and multi-cell scheduling, the UE expects to receive separate sub-fields or values in a total DAI field of an UL DCI format, each sub-field corresponding to one of two sub-CBs. A tradeoff between HARQ-ACK CB size (uplink control information (UCI) size) and DCI format size is discussed, and "operating points" with respect to such tradeoff are explained for various Type-2 CB generation methods. In addition, methods are disclosed for generation of two or three or four Type-2 sub-CBs when the UE is configured both multi-cell scheduling and codebook group (CBG) operation.

The designs for Type-2 CB in presence of multi-cell scheduling also consider impact of two-stage DCI, such as relative timing and SCS configuration of the $1^{st}$-stage DCI and the $2^{nd}$-stage DCI.

The methods provided in the present disclosure enable reduced downlink signaling for scheduling multiple PDSCHs on multiple cells, by providing common values, rather than separate values, related to HARQ-ACK information generation and corresponding PUCCH transmission. The methods in the present disclosure also enable reduced uplink signaling by appending HARQ-ACK information corresponding to the multiple PDSCHs on multiple cells into a single HARQ-ACK codebook and using a single, common PUCCH or PUSCH transmission to provide the HARQ-ACK codebook.

One motivation for multi-cell scheduling using a single DCI format is enhanced cross-carrier scheduling operation for larger number of cells, such as 4-8 cells, operating in an intra-band CA framework in frequency bands below 6 GHz or above 6 GHz, referred to as FR1 or FR2, respectively.

In general, the embodiments apply to any deployments, verticals, or scenarios including inter-band CA with potentially fragmented spectrum in frequency domain, with eMBB, ultra-reliable and low latency communication (URLLC) and industrial internet of things (IIoT) and extended reality (XR), mMTC and IoT, with sidelink/Vehicle to anything (V2X) communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Embodiments of the disclosure for enhancing HARQ-ACK codebook design in presence of multi-cell scheduling configuration with reduced signaling overhead are summarized in the following and are fully elaborated further below. Combinations of the embodiments are also applicable, but they are not described in detail for brevity.

For example, an embodiment, described in greater detail below, describes a multi-cell scheduling operation. For example, a UE can be provided a number of sets of co-scheduled cells by higher layers. The term set of co-scheduled cells is used to refer to a set of serving cells wherein the UE can be scheduled PDSCH receptions or PUSCH transmissions on one, two or more or all cells from the set of co-scheduled cells by a single DCI format, or by using complementary methods such as those described herein. Additionally, the UE can be indicated via a DCI format in a PDCCH or via a MAC CE in a PDSCH a subset of a set of co-scheduled cells, wherein cells of the subset can change across different PDCCH monitoring occasions, for example, as indicated by a corresponding DCI format.

For another example, an embodiment, described in greater detail below, describes various mechanisms for multi-cell scheduling. For example, the UE can distinguish a single-cell scheduling DCI format from a multi-cell scheduling DCI format via various methods, such as a DCI format size, or a radio network temporary identifier (RNTI) used for scrambling a CRC of a DCI format for multi-cell scheduling, or by an explicit indication by a field in the DCI format.

For another example, an embodiment, described in greater detail below, describes PDCCH monitoring for multi-cell scheduling. For example, the UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format. There can be two cases for monitoring a DCI format for multi-cell scheduling: a first case based on search space set(s) dedicated to multi-cell scheduling, and a second case based on search space set(s) shared by both single-cell scheduling and multi-cells scheduling.

For another example, an embodiment, described in greater detail below, provides for HARQ-ACK codebook for multi-cell scheduling. For example, a UE configured with multi-cell scheduling for a set of co-scheduled cells expects that all cells in the set of co-scheduled cells belong to a same PUCCH group, and also that the UE is provided configuration for a HARQ-ACK codebook, such as Type-1 or Type-2 or Type-3 codebook. HARQ codebook generation for multi-cell scheduling can depend on configuration of a set of K1 values provided for each cell for multi-cell scheduling. The UE can be provided a dedicated K1 configuration for multi-cell scheduling for a set of co-scheduled cells, or the UE can implicitly determine a K1 configuration for multi-cell scheduling based on intersection (or union) of corresponding configurations for single-cell scheduling among the set of co-scheduled cells. A value of K1 can be with respect to an SCS configuration of a corresponding cell with PUCCH configuration (such as the PCell).

For another example, an embodiment, described in greater detail below, describes extension of Type-2 (dynamic) HARQ-ACK codebook for multi-cell scheduling. For example, for a UE configured with multi-cell scheduling, the UE can generate a same Type-2 HARQ-ACK codebook for both single-cell scheduling and multi-cell scheduling or can generate separate Type-2 sub-codebooks (and then append) corresponding to each of single-cell scheduling and multi-cell scheduling. The UE determines to generate a same Type-2 CB or separate Type-2 CBs based on the specifications for system operation or based on network configuration. The design of DL DAI in a downlink DCI format for multi-cell scheduling (and potentially also for DCI formats for single-cell scheduling), as well as UL DAI in any uplink DCI formats (for single-cell scheduling or for multi-cell scheduling) can be different based on whether the UE generates same or separate Type-2 CBs for single-cell scheduling and multi-cell scheduling. For example, DAI in the DL DCI format for multi-cell scheduling of PDSCHs can be cell-common among co-scheduled cells (that is, per DCI), or can be cell-specific among co-scheduled cells (that is, per PDSCH from co-scheduled PDSCHs). Different designs can achieve different "operating points" in a trade-off between a size of HARQ-ACK codebook size (that is, UCI payload) and a size of DCI format(s).

For another example, an embodiment, described in greater detail below, describes generating a same Type-2 CB for single-cell scheduling and multi-cell PDSCH scheduling (assuming no CBG configuration for any cell). For example, for a UE configured with multi-cell PDSCH scheduling and not configured CBG-based PDSCH reception for any serving cells in a corresponding PUCCH group, when the UE generates a same Type-2 CB corresponding to both single-cell scheduling and multi-cell scheduling, the UE is provided DL DAI field(s) in DL DCI formats, including a DCI format for multi-cell scheduling of PDSCHs, that is counted per scheduled PDSCH. DL DAI fields can include counter DAI (c-DAI) and total DAI (t-DAI). The UE generates the Type-2 HARQ-ACK codebook based on an ascending order of DAI, which is in turn based on an ascending order of PDSCHs. Various methods are provided for ordering co-scheduled PDSCHs, for example, based on corresponding cell index.

For another example, an embodiment, described in greater detail below, describes generating separate Type-2 CBs for single-cell scheduling and multi-cell PDSCH scheduling, with DAI counting per scheduled PDSCH (assuming no CBG configuration for any cell). For example, for a UE configured with multi-cell PDSCH scheduling and not configured CBG-based PDSCH reception for any serving cells, when the UE generates separate Type-2 sub-CBs corresponding to each of single-cell scheduling and multi-cell scheduling DCI formats, the UE can be provided counter and total DL DAI fields in a DCI format for multi-cell scheduling of PDSCHs that counted scheduled PDSCHs. Handling of DAI, such as size of DL/UL DAI fields and ordering of DL DAI values and corresponding HARQ-ACK feedback information bits in the Type-2 CB, will be similar to the case of same Type-2 CB for both single-cell scheduling and multi-cell scheduling with DL DAI counting per scheduled PDSCH, as described herein. The difference is that DL DAI for multi-cell scheduling is (accumulated/processed) separate from DL DAI for single-cell scheduling, so a size of DL DAI fields in DL DCI formats for single-cell scheduling are not impacted. In addition, any UL DCI format will include two separate DAI fields or values, one field/value with 2 bits corresponding to the Type-2 sub-CB for single-cell scheduling, and another field with increased size (such as 5 bits) corresponding to the Type-2 sub-CB for multi-cell scheduling.

For another example, an embodiment, described in greater detail below, describes generating separate Type-2 CBs for single-cell scheduling and multi-cell PDSCH scheduling, with DAI counting per DCI (assuming no CBG configuration for any cell). For example, for a UE configured with multi-cell PDSCH scheduling and not configured CBG-based PDSCH reception on any serving cells in a corresponding PUCCH group, when the UE generates separate Type-2 sub-CBs corresponding to each of single-cell scheduling and multi-cell scheduling, the UE can be provided counter and total DAI fields in a DCI format for multi-cell scheduling of PDSCHs, that are counted/accumulated per DL DCI format. Accordingly, the UE includes, in the second Type-2 CB, a fixed number of bits, such as $M_{max,mc}$ bits, for each DL DCI format for multi-cell PDSCH scheduling, regardless of a number of actually co-scheduled cells (except when only one PDSCH on one cell is scheduled). Herein, $M_{max,mc}$ refers to a maximum (possible) size/number of HARQ-ACK information bits corresponding to any configured set of co-scheduled cells. According to this method, there is no need to increase a size of counter/total DAI field in DL DCI formats for multi-cell PDSCH scheduling, regardless of a (maximum possible) size o set(s) of co-scheduled cells. There is also no impact to size of other DL DCI formats, including for single-cell PDSCH scheduling. For any UL DCI formats with a total DAI field, the DCI format includes two separate UL DAI sub-fields/values, corresponding to the two Type-2 sub-CBs, each with a same size as for single-cell PDSHC scheduling (such as 2 bits).

For another example, an embodiment, described in greater detail below, describes generating Type-2 CB(s) in presence of both multi-cell scheduling and CBG configuration. For example, when a UE is configured with multi-cell scheduling, the UE may or may not be configured with codeblock group (CBG) operation. When CBG is not configured, the UE can generate a single Type-2 CB or two separate Type-2 sub-CBs, as described in embodiments herein. When CBG is configured, the UE can be configured with up to 4 Type-2 sub-CBs: a first sub-CB for cells with single-cell scheduling only without CBG, a second sub-CB for cells with single-cell scheduling only with CBG, a third sub-CB for cells with multi-cell scheduling without CBG, and a fourth sub-CB for cells with multi-cell scheduling with CBG. Depending on network restrictions for CBG configuration and/or DAI operation (for example, per DCI or per PDSCH), various cases are provided for joint operation of multi-cell scheduling and CBG operation, as provided in the following. For each case, the UE can generate the Type-2 CB with several different options/solutions, which achieve different operating points in a trade-off between overall size of the Type-2 CB with size of DL/UL DAI fields in applicable DCI formats. In another alternative, there may be no restrictions by the specifications for system operation, but gNB implementation and configuration can determine which case and/or solution is used for Type-2 CB generation. For example, gNB configuration can support CBG configuration and multi-cell scheduling for a same cell but configure a small CBG size (such as 2 CBGs per PDSCH) to maintain a reasonable CB size and UCI/DCI overhead.

For another example, an embodiment, described in greater detail below, describes handling search space sets for multi-cell scheduling in generation of Type-2 CB(s). For example, when a UE is configured with multi-cell scheduling, the UE determines PDCCH monitoring occasions (MOs) for DL DCI formats for multi-cell scheduling for which the UE transmits HARQ-ACK information in a same PUCCH in slot n according to search space sets for multi-cell scheduling. Herein, a search space set for multi-cell scheduling can be a legacy UE-specific search space (USS) set for single-cell scheduling, or a new USS set dedicated to multi-cell scheduling (M-USS), as described in embodiments herein. For example, an M-USS set can be configured and monitored only on one (reference) cell, or multiple linked M-USS sets can be configured and monitored on all co-scheduled cells.

For another example, an embodiment, described in greater detail below, describes other aspects of HARQ-ACK codebook generation in presence of multi-cell scheduling.

For another example, an embodiment, described in greater detail below, describes Type-3 HARQ codebook in presence of multi-cell scheduling. For example, for a UE that is configured a number of sets of co-scheduled cells, when a DCI format for multi-cell scheduling includes a flag, such as a One-shot HARQ-ACK request field, that triggers generation of a Type-3 HARQ codebook (also referred to as, a "One-shot" CB), the UE can consider the DCI format for multi-cell scheduling as an implicit triggering state for the Type-3 HARQ codebook.

For another example, an embodiment, described in greater detail below, describes HARQ timeline in presence of two-stage multi-cell scheduling. For example, for a UE that is configured a two-stage DCI format for multi-cell scheduling, the UE determines a minimum PDCCH-to-HARQ (N3) timeline relative to a $2^{nd}$-stage DCI. In addition, when the UE receives a $2^{nd}$-stage DCI in a PDSCH, such as a first PDSCH that is scheduled by a corresponding $1^{st}$-stage DCI, the UE considers an SCS configuration of the (first) PDSCH when determining an SCS configuration for the N3 timeline. An N3/N2 timeline relative to a $2^{nd}$-stage DCI can also be used when the UE determines a minimum time until DL bandwidth part (BWP) switching.

For another example, an embodiment, described in greater detail below, describes multiplexing HARQ-ACK feedback on co-scheduled PUSCHs. For example, for a UE configured with multi-cell scheduling for PUSCHs, the specifications for system operation may not allow HARQ-ACK multiplexing on co-scheduled PUSCHs, for example, to reduce DCI format size. When multiplexing HARQ-ACK feedback on co-scheduled PUSCHs is supported, a DAI field in an UL DCI format for multi-cell scheduling of PUSCH transmissions can be a cell-common parameter that applies to all co-scheduled PUSCHs or can be a cell-specific parameter that applies to a reference cell from the co-scheduled cells, such as a first or a last PUSCH. When a DCI format for multi-cell scheduling of PUSCHs is configured to be a two-stage DCI, the UE can receive the UL DAI in the 2nd-stage DCI.

For another example, an embodiment, described in greater detail below, describes out-of-order (OoO) scheduling in presence of multi-cell scheduling. For example, for a UE configured with multi-cell scheduling, and when the UE does not support OoO scheduling, the UE expects that a DCI format for multi-cell scheduling satisfies the "in-order" scheduling property in a same way as a DCI format for single-cell scheduling. To achieve this property, the OoO property can be defined across all serving cells or across pairs of sets/groups of serving cells, rather than pairs of individual serving cells. The OoO property can be defined with respect to only a first/earliest PDSCH or PUSCH indicated by a DCI format for multi-cell scheduling (rather than all co-scheduled PDSCHs or PUSCHs).

For yet another example, an embodiment, described in greater detail below, describes usage of DL total DAI in all PDCCH monitoring occasions for Type-2 CB generation. For example, when a UE generates a Type-2 CB or multiple Type-2 sub-CBs, in order to increase a UE ability for detecting missed DCI formats, the UE can use a total DAI in DL DCI formats received in each PDCCH monitoring occasion (rather than only in a last PDCCH monitoring occasion) with DCI formats associated with a PUCCH transmission in a slot n.

Throughout the present disclosure, the term "configuration" or "higher layer configuration" and variations thereof (such as "configured" and so on) are used to refer to one or more of: a system information signaling such as by a master information block (MIB) or a system information block (SIB) (such as SIB1), a common or cell-specific higher layer/RRC signaling, or a dedicated or UE-specific or BWP-specific higher layer/RRC signaling.

Throughout the present disclosure, the term signal quality is used to refer to e.g. reference signal received power (RSRP), reference signal received quality (RSRQ), received Signal Strength Indicator (RSSI), signal to noise ratio (SNR), or signal to interference and noise ratio (SINR), with or without filtering such as L1 or L3 filtering, of a channel or a signal such as a reference signal (RS) including synchronized signal (SS)/physical broadcast channel (PBCH) block (SSB), channel state information RS (CSI-RS), or sounding reference signal (SRS).

An antenna port is defined such that the channel over which a symbol on the antenna port is conveyed can be inferred from the channel over which another symbol on the same antenna port is conveyed.

For demodulation RS (DM-RS) associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DM-RS ports associated with a PDSCH are quasi co-located (QCL) with QCL Type A, Type D (when applicable) and average gain. The UE may further assume that no DM-RS collides with the SS/PBCH block.

A UE (such as the UE 116) can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DM-RS ports of the PDSCH, the DM-RS port of PDCCH or the CSI-RS port(s) of a CSI-RS resource. The quasi-co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi-co-location types corresponding to each DL RS are given by the higher layer parameter qcl-Type in QCL-Info and may take one of the following values: 'QCL-TypeA', 'QCL-TypeB', 'QCL-TypeC', and 'QCL-TypeD'. For example, a quasi-co-location type of 'QCL-TypeA' can correspond to {Doppler shift, Doppler spread, average delay, delay spread}. For another example, a quasi-co-location type of 'QCL-TypeB' can correspond to {Doppler shift, Doppler spread}. For another example, a quasi-co-location type of 'QCL-TypeC' can correspond to {Doppler shift, average delay}. For yet another example, a quasi-co-location type of 'QCL-TypeD' can correspond to 'QCL-TypeD': {Spatial Rx parameter}.

The UE receives a MAC-coverage enhancement (CE) activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$ where $N_{slot}^{subframe,\mu}$ is a number of slot per subframe for subcarrier spacing (SCS) configuration $\mu$.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', then the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers). If a UE is configured with enableDefaultTCIStatePerCoresetPoolIndex and the UE is configured by higher layer parameter PDCCH-Config that contains two different values of coresetPoolIndex in different ControlResourceSets, then the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers). If a UE is configured with enableTwoDefault-TCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers). In these above cases, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

In certain embodiments, if the PDCCH carrying the scheduling DCI is received on one component carrier, and the PDSCH scheduled by that DCI is on another component carrier, then the timeDurationForQCL is determined based on the subcarrier spacing of the scheduled PDSCH. If $\mu_{PDCCH} < \mu_{PDSCH}$ an additional timing delay $d2^{\mu_{PDSCH}}/2^{\mu_{PDCCH}}$ is added to the timeDurationForQCL, where d is defined in 5.2.1.5.1a-1, otherwise d is zero. For both the cases, when the UE is configured with enableDefaultBeamForCCS, and when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell.

For PUSCH scheduled by DCI format 0_0 on a cell and if the higher layer parameter enableDefaultBeamPL-For-PUSCH0-0 is set 'enabled', the UE is not configured with PUCCH resources on the active UL BWP and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell.

For PUSCH scheduled by DCI format 0_0 on a cell and if the higher layer parameter enableDefaultBeamPL-For-PUSCH0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell in case CORESET(s) are configured on the cell.

In Multiple Transmit/Receive Point (multi-TRP) operation, a serving cell can schedule UE from two TRPs, providing better PDSCH coverage, reliability and/or data rates.

There are two different operation modes for multi-TRP: single-DCI and multi-DCI. For both modes, control of uplink and downlink operation is done by both physical layer and MAC. In single-DCI mode, UE is scheduled by the same DCI for both TRPs and in multi-DCI mode, UE is scheduled by independent DCIs from each TRP.

In CA, two or more Component Carriers (CCs) are aggregated. A UE may simultaneously receive or transmit on one or multiple CCs depending on its capabilities. For example, a UE with single timing advance capability for CA can simultaneously receive and/or transmit on multiple CCs corresponding to multiple serving cells sharing the same timing advance (multiple serving cells grouped in one TAG). For another example, a UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell. For yet another example, a non-CA capable UE can receive on a single CC and transmit on a single CC corresponding to one serving cell only (one serving cell in one TAG).

CA is supported for both contiguous and non-contiguous CCs. When CA is deployed frame timing and SFN are aligned across cells that can be aggregated, or an offset in multiples of slots between the PCell/PSCell and an SCell is configured to the UE. The maximum number of configured CCs for a UE is 16 for DL and 16 for UL.

When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). Depending on UE capabilities, Secondary Cells (SCells) can be configured to form together with the PCell a set of serving cells. The configured set of serving cells for a UE therefore includes of one PCell and one or more SCells.

The reconfiguration, addition and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signaling is used for sending all required system information of the SCell i.e., while in connected mode, UEs need not acquire broadcast system information directly from the SCells.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform channel quality indicator (CQI) measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signaling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells SCells added to the set are initially activated or deactivated; while SCells which remain in the set (either unchanged or reconfigured) do not change their activation status (activated or deactivated).

At handover or connection resume from RRC_INACTIVE: SCells are activated or deactivated.

To enable reasonable UE battery consumption when bandwidth adaptation (BA) is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, physical random-access channel (PRACH) and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, AGC and beam management, if configured. A DCI is used to control entering/leaving the dormant BWP for one or more SCell(s) or one or more SCell group(s).

The dormant BWP is one of the UE's dedicated BWPs configured by network via dedicated RRC signaling. The SpCell and PUCCH SCell cannot be configured with a dormant BWP.

Cross-carrier scheduling with the Carrier Indicator Field (CIF) allows the PDCCH of a serving cell to schedule resources on another serving cell but with the following restrictions: (i) cross-carrier scheduling does not apply to PCell i.e. PCell is scheduled via its PDCCH; (ii) when an SCell is configured with a PDCCH, that cell's PDSCH and PUSCH are scheduled by the PDCCH on this SCell; (iii) when an SCell is not configured with a PDCCH, that SCell's PDSCH and PUSCH are scheduled by a PDCCH on another serving cell; (iv) the scheduling PDCCH and the scheduled PDSCH/PUSCH can use the same or different numerologies.

Some of the restrictions above may be relaxed. For example, dynamic spectrum sharing (DSS) allows LTE and NR to share the same carrier. As the number of NR devices in a network increases, it is important that sufficient scheduling capacity for NR UEs on the shared carriers is ensured. In the case of DSS operation, PDCCH enhancements for cross-carrier scheduling including are provided such that PDCCH of an SCell, referred to as a special/scheduling SCell (sSCell), can schedule PDSCH or PUSCH on the P(S)Cell.

The PDCCH can be used to schedule DL transmissions on PDSCH and UL transmissions on PUSCH, where the DCI on PDCCH includes: (i) downlink assignments containing at least modulation and coding format, resource allocation, and HARQ information related to DL-SCH; and (ii) uplink scheduling grants containing at least modulation and coding format, resource allocation, and HARQ information related to UL-SCH.

In addition to scheduling, PDCCH can be used to for: (i) activation and deactivation of configured PUSCH transmission with configured grant; (ii) activation and deactivation of PDSCH semi-persistent transmission; (iii) notifying one or more UEs of the slot format; (iv) notifying one or more UEs of the PRB(s) and OFDM symbol(s) where the UE may assume no transmission is intended for the UE; (v) transmission of TPC commands for PUCCH and PUSCH; (vi) transmission of one or more TPC commands for SRS transmissions by one or more UEs; (vii) switching a UE's active bandwidth part; (viii) initiating a random access procedure; (ix) indicating the UE(s) to monitor the PDCCH during the next occurrence of the discontinuous reception (DRX) on-duration; (x) in IAB context, indicating the availability for soft symbols of an IAB-DU; and (xi) triggering one shot HARQ-ACK codebook feedback. Additionally, PDCCH can be used for operation with shared spectrum channel access including: (i) triggering search space set group switching; (ii) indicating one or more UEs about the available RB sets and channel occupancy time duration; and (iii) indicating downlink feedback information for configured grant PUSCH (configured grant downlink feedback information (CG-DFI)).

A UE monitors a set of PDCCH candidates in the configured monitoring occasions in one or more configured COntrol REsource SETs (CORESETs) according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting of a set of REGs. Control channels are formed by aggregation of CCE. Different code rates for the control channels are realized by aggregating different number of CCE. Interleaved and non-interleaved CCE-to-REG mapping are supported in a CORESET.

Polar coding and QPSK modulation are used for PDCCH. Each resource element group carrying PDCCH carries its own DM-RS.

A UE (such as the UE 116) monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

In the downlink, the gNB can dynamically allocate resources to UEs via the cell-RNTI (C-RNTI) on PDCCH(s). A UE monitors the PDCCH(s) in order to find possible assignments when its downlink reception is enabled (activity governed by discontinuous reception (DRX) when configured). When CA is configured, the same C-RNTI applies to all serving cells.

The gNB (such as the BS 102) may pre-empt an ongoing PDSCH transmission to one UE with a latency-critical transmission to another UE. The gNB can configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the gNB can allocate downlink resources for the initial HARQ transmissions to UEs: RRC defines the periodicity of the configured downlink assignments while PDCCH addressed to Configured scheduling RNTI (CS-RNTI) can either signal and activate the configured downlink assignment, or deactivate it; i.e. a PDCCH addressed to CS-RNTI indicates that the downlink assignment can be implicitly reused according to the periodicity defined by RRC, until deactivated. When required, retransmissions are explicitly scheduled on PDCCH(s).

The dynamically allocated downlink reception overrides the configured downlink assignment in the same serving cell, if they overlap in time. Otherwise, a downlink reception according to the configured downlink assignment is assumed, if activated.

The UE may be configured with up to 8 active configured downlink assignments for a given BWP of a serving cell. When more than one is configured: the network decides which of these configured downlink assignments are active at a time (including all of them); and each configured downlink assignment is activated separately using a DCI command and deactivation of configured downlink assignments is done using a DCI command, which can either deactivate a single configured downlink assignment or multiple configured downlink assignments jointly.

PUSCH may be scheduled with DCI on PDCCH, or a semi-static configured grant may be provided over RRC, where two types of operation are supported: the first PUSCH is triggered with a DCI, with subsequent PUSCH transmissions following the RRC configuration and scheduling received on the DCI, or the PUSCH is triggered by data arrival to the UE's transmit buffer and the PUSCH transmissions follow the RRC configuration.

In the uplink, the gNB can dynamically allocate resources to UEs via the C-RNTI on PDCCH(s). A UE monitors the PDCCH(s) in order to find possible grants for uplink transmission when its downlink reception is enabled (activity governed by DRX when configured). When CA is configured, the same C-RNTI applies to all serving cells.

The gNB may cancel a PUSCH transmission, or a repetition of a PUSCH transmission, or an SRS transmission of a UE for another UE with a latency-critical transmission. The gNB can configure UEs to monitor cancelled transmission indications using CI-RNTI on a PDCCH. If a UE receives the cancelled transmission indication, the UE shall cancel the PUSCH transmission from the earliest symbol overlapped with the resource or the SRS transmission overlapped with the resource indicated by cancellation.

In addition, with Configured Grants, the gNB can allocate uplink resources for the initial HARQ transmissions and HARQ retransmissions to UEs. Two types of configured uplink grants are defined. A first type, denoted as Type 1, RRC directly provides the configured uplink grant (including the periodicity). A second type, denoted as Type 2, RRC defines the periodicity of the configured uplink grant while PDCCH addressed to CS-RNTI can either signal and activate the configured uplink grant, or deactivate it; i.e., a PDCCH addressed to CS-RNTI indicates that the uplink grant can be implicitly reused according to the periodicity defined by RRC, until deactivated.

The HARQ functionality ensures delivery between peer entities at Layer 1. A single HARQ process supports one TB when the physical layer is not configured for downlink/uplink spatial multiplexing, and when the physical layer is configured for downlink/uplink spatial multiplexing, a single HARQ process supports one or multiple TBs.

In case of CA, the multi-carrier nature of the physical layer is only exposed to the MAC layer for which one HARQ entity is required per serving cell. In both uplink and downlink, there is one independent HARQ entity per serving cell and one transport block is generated per assignment/grant per serving cell in the absence of spatial multiplexing. Each transport block and its potential HARQ retransmissions are mapped to a single serving cell.

For downlink, Asynchronous Incremental Redundancy Hybrid ARQ is supported. The gNB provides the UE with the HARQ-ACK feedback timing either dynamically in the DCI or semi-statically in an RRC configuration. Retransmission of HARQ-ACK feedback is supported for operation with shared spectrum channel access by using enhanced dynamic codebook and/or one-shot triggering of HARQ-ACK transmission for all configured CCs and HARQ processes in the PUCCH group. The UE may be configured to receive code block group-based transmissions where retransmissions may be scheduled to carry a sub-set of all the code blocks of a TB.

For uplink, Asynchronous Incremental Redundancy HARQ is supported. The gNB schedules each uplink transmission and retransmission using the uplink grant on DCI. For operation with shared spectrum channel access, UE can also retransmit on configured grants. The UE may be configured to transmit code block group-based transmissions where retransmissions may be scheduled to carry a sub-set of all the code blocks of a transport block.

Up to two HARQ-ACK codebooks corresponding to a priority (high/low) can be constructed simultaneously. For each HARQ-ACK codebook, more than one PUCCH for HARQ-ACK transmission within a slot is supported. Each PUCCH is limited within one sub-slot, and the sub-slot pattern is configured per HARQ-ACK codebook.

PUCCH carries the Uplink Control Information (UCI) from the UE to the gNB. UCI includes at least HARQ-ACK information, scheduling request (SR), and CSI.

UCI can be transmitted on a PUCCH or multiplexed in a PUSCH. UCI multiplexing in PUSCH is supported when UCI and PUSCH transmissions coincide in time, either due to transmission of a UL-SCH transport block or due to triggering of A-CSI transmission without UL-SCH transport block: (i) UCI carrying HARQ-ACK feedback with 1 or 2 bits is multiplexed by puncturing PUSCH; (ii) in all other cases UCI is multiplexed by rate matching PUSCH.

For configured grants operation with shared spectrum channel access, a CG-UCI (Configured Grant Uplink Control Information) is transmitted in PUSCH scheduled by configured uplink grant. For operation with shared spectrum channel access, multiplexing of CG-UCI and PUCCH carrying HARQ-ACK feedback can be configured by the gNB. If not configured, when PUCCH overlaps with PUSCH scheduled by a configured grant within a PUCCH group and PUCCH carries HARQ ACK feedback, PUSCH scheduled by configured grant is skipped.

PUCCH carries the UCI from the UE (such as the UE 116) to the gNB (such as the BS 102). Five formats of PUCCH exist, depending on the duration of PUCCH and the UCI payload size. A first format denoted as "Format #0" indicates short PUCCH of 1 or 2 symbols with small UCI payloads of up to two bits with UE multiplexing capacity of up to 6 UEs with 1-bit payload in the same PRB. A second format denoted as "Format #1" indicates long PUCCH of 4-14 symbols with small UCI payloads of up to two bits with UE multiplexing capacity of up to 84 UEs without frequency hopping and 36 UEs with frequency hopping in the same PRB. A third format denoted as "Format #2" short PUCCH of 1 or 2 symbols with large UCI payloads of more than two bits with no UE multiplexing capability in the same PRBs. A fourth format denoted as "Format #3" indicates long PUCCH of 4-14 symbols with large UCI payloads with no UE multiplexing capability in the same PRBs. A firth format denoted as "Format #4" indicates long PUCCH of 4-14 symbols with moderate UCI payloads with multiplexing capacity of up to 4 UEs in the same PRBs.

The short PUCCH format of up to two UCI bits is based on sequence selection, while the short PUCCH format of more than two UCI bits frequency multiplexes UCI and DM-RS. The long PUCCH formats time-multiplex the UCI and DM-RS. Frequency hopping is supported for long PUCCH formats and for short PUCCH formats of duration of 2 symbols. Long PUCCH formats can be repeated over multiple slots.

For operation with shared spectrum channel access, PUCCH Format #0, #1, #2, #3 are extended to use resource in one PRB interlace (up to two interlaces for Format #2 and Format #3) in one RB Set. PUCCH Format #2 and #3 are enhanced to support multiplexing capacity of up to 4 UEs in the same PRB interlace when one interlace is used.

UCI multiplexing in PUSCH is supported when UCI and PUSCH transmissions coincide in time, either due to transmission of a UL-SCH transport block or due to triggering of A-CSI transmission without UL-SCH transport block: (i) UCI carrying HARQ-ACK feedback with 1 or 2 bits is multiplexed by puncturing PUSCH; (ii) in all other cases UCI is multiplexed by rate matching PUSCH.

UCI can include: (i) CSI; (ii) ACK/negative acknowledgment (NACK); or (iii) scheduling request.

For operation with shared spectrum channel access, multiplexing of CG-UCI and PUCCH carrying HARQ-ACK feedback can be configured by the gNB. If not configured, when PUCCH overlaps with PUSCH scheduled by a configured grant within a PUCCH group and PUCCH carries HARQ ACK feedback, PUSCH scheduled by configured grant is skipped.

QPSK and π/2 BPSK modulation can be used for long PUCCH with more than 2 bits of information, QPSK is used for short PUCCH with more than 2 bits of information and BPSK and QPSK modulation can be used for long PUCCH with up to 2 information bits.

Transform precoding is applied to PUCCH Format #3 and Format #4.

Channel coding used for uplink control information is described in Table (1), below.

TABLE (1)

| Uplink Control Information size including CRC, if present | Channel code |
| --- | --- |
| 1 | Repetition code |
| 2 | Simplex code |
| 3-11 | Reed Muller code |
| >11 | Polar code |

PUSCH and PUCCH can be associated with a priority (high/low) by RRC or L1 signaling. If a PUCCH transmission overlaps in time with a transmission of a PUSCH or another PUCCH, only the PUCCH or PUSCH associated with a high priority can be transmitted.

In case of Supplementary Uplink (SUL), the UE is configured with 2 ULs for one DL of the same cell, and uplink transmissions on those two ULs are controlled by the network to avoid overlapping PUSCH/PUCCH transmissions in time. Overlapping transmissions on PUSCH are avoided through scheduling while overlapping transmissions on PUCCH are avoided through configuration (PUCCH can only be configured for only one of the 2 ULs of the cell). In addition, initial access is supported in each of the uplink.

If a UE (such as the UE 116) is provided pdsch-HARQ-ACK-CodebookList, the UE can be indicated by pdsch-HARQ-ACK-CodebookList to generate one or two HARQ-ACK codebooks. If the UE is indicated to generate one HARQ-ACK codebook, the HARQ-ACK codebook is associated with a PUCCH of priority index 0. If a UE is provided pdsch-HARQ-ACK-CodebookList, the UE multiplexes in a same HARQ-ACK codebook only HARQ-ACK information associated with a same priority index. If the UE is indicated to generate two HARQ-ACK codebooks, a first HARQ-ACK codebook is associated with a PUCCH of priority index 0 and a second HARQ-ACK codebook is associated with a PUCCH of priority index 1. The UE is provided first and second for each of {PUCCH-Config, UCI-OnPUSCH, PDSCH-codeBlockGroupTransmission} by {PUCCH-ConfigurationList, UCI-OnPUSCH-ListDCI-0-1, PDSCH-CodeBlockGroupTransmissionList} or {PUCCH-ConfigurationList, UCI-OnPUSCH-ListDCI-0-2, PDSCH-CodeBlockGroupTransmissionList}, respectively, for use with the first and second HARQ-ACK codebooks, respectively.

If a UE receives a PDSCH without receiving a corresponding PDCCH, or if the UE receives a PDCCH indicating a SPS PDSCH release, the UE generates one corresponding HARQ-ACK information bit. If the UE generates two HARQ-ACK codebooks, the UE is indicated by harq- CodebookID, per SPS PDSCH configuration, a HARQ-ACK codebook index for multiplexing the corresponding HARQ-ACK information bit.

If a UE is provided pdsch-HARQ-ACK-OneShotFeedback and the UE detects a DCI format in any PDCCH monitoring occasion that includes a One-shot HARQ-ACK request field with value 1 then (i) the UE includes the HARQ-ACK information in a Type-3 HARQ-ACK codebook, and (ii) the UE does not expect that the PDSCH-to-HARQ_feedback timing indicator field of the DCI format provides an inapplicable value from dl-DataToUL-ACK-r16.

In the remaining of this clause, reference is to one HARQ-ACK codebook and to DCI formats that schedule PDSCH reception, or indicate SPS PDSCH release, or indicate SCell dormancy without scheduling a PDSCH reception and are associated with the HARQ-ACK codebook.

If a UE (such as the UE 116) is configured to receive SPS PDSCHs in a slot for SPS configurations that are indicated to be released by a DCI format, and if the UE receives the PDCCH providing the DCI format in the slot where the end of a last symbol of the PDCCH reception is not after the end of a last symbol of any of the SPS PDSCH receptions, and if HARQ-ACK information for the SPS PDSCH release and the SPS PDSCH receptions would be multiplexed in a same PUCCH, the UE does not expect to receive the SPS PDSCHs, does not generate HARQ-ACK information for the SPS PDSCH receptions, and generates a HARQ-ACK information bit for the SPS PDSCH release.

If a UE detects a DCI format 1_1 indicating (i) SCell dormancy without scheduling a PDSCH reception, as described in clause 10.3, and (ii) is provided pdsch-HARQ-ACK-Codebook=dynamic or pdsch-HARQ-ACK-Codebook-r16, then the UE generates a HARQ-ACK information bit as described in clause 9.1.3 for a DCI format 1_1 indicating SCell dormancy, and the HARQ-ACK information bit value is ACK.

If a UE is not provided PDSCH-CodeBlockGroupTransmission, the UE generates one HARQ-ACK information bit per transport block.

For a HARQ-ACK information bit, a UE generates a positive acknowledgement (ACK) if the UE detects a DCI format that provides a SPS PDSCH release or correctly decodes a transport block and generates a NACK if the UE does not correctly decode the transport block. A HARQ-ACK information bit value of 0 represents a NACK while a HARQ-ACK information bit value of 1 represents an ACK.

In the following, the CRC for a DCI format is scrambled with a C-RNTI, a modulation and coding scheme-C-RNTI (MCS-C-RNTI), or a CS-RNTI.

If a UE is provided PDSCH-CodeBlockGroupTransmission for a serving cell, the UE receives a PDSCH scheduled by DCI format 1_1, that includes code block groups (CBGs) of a transport block. The UE is also provided maxCodeBlockGroupsPerTransportBlock indicating a maximum number $N_{HARQ-ACK}^{CBG/TB,max}$ of CBGs for generating respective HARQ-ACK information bits for a transport block reception for the serving cell.

For a number of C code blocks (CBs) in a transport block, the UE determines a number of CBGs M according to [REF4] and determines a number of HARQ-ACK bits for the transport block as $N_{HARQ-ACK}^{CBG/TB}=M$.

The UE (such as the UE 116) generates an ACK for the HARQ-ACK information bit of a CBG if the UE correctly received all code blocks of the CBG and generates a NACK for the HARQ-ACK information bit of a CBG if the UE incorrectly received at least one code block of the CBG. If the UE receives two transport blocks, the UE concatenates the HARQ-ACK information bits for CBGs of the second transport block after the HARQ-ACK information bits for CBGs of the first transport block.

The HARQ-ACK codebook includes the $N_{HARQ-ACK}^{CBG/TB,max}$ information bits and, if $N^{CBG/TB}<N_{HARQ-ACK}^{CBG/TB,max}$ for a transport block, the UE generates a NACK value for the last $N_{HARQ-ACK}^{CBG/TB,max}$ information bits for the transport block in the HARQ-ACK codebook.

If the UE generates a HARQ-ACK codebook in response to a retransmission of a transport block, corresponding to a same HARQ process as a previous transmission of the transport block, the UE generates an ACK for each CBG that the UE correctly decoded in a previous transmission of the transport block.

If a UE correctly detects each of the $N_{HARQ-ACK}^{CBG/TB}$ CBGs and does not correctly detect the transport block for the $N_{HARQ-ACK}^{CBG/TB}$ CBGs, the UE generates a NACK value for each of the $N_{HARQ-ACK}^{CBG/TB}$ CBGs.

This clause applies if the UE is configured with pdsch-HARQ-ACK-Codebook=semi-static.

A UE (such as the UE 116) does not expect to be configured with pdsch-HARQ-ACK-Codebook=semi-static for a codebook if a UE is provided subslotLength-For-PUCCH for the codebook.

A UE reports HARQ-ACK information for a corresponding PDSCH reception or SPS PDSCH release only in a HARQ-ACK codebook that the UE transmits in a slot indicated by a value of a PDSCH-to-HARQ_feedback timing indicator field in a corresponding DCI format. The UE reports NACK value(s) for HARQ-ACK information bit(s) in a HARQ-ACK codebook that the UE transmits in a slot not indicated by a value of a PDSCH-to-HARQ_feedback timing indicator field in a corresponding DCI format.

If a UE is not provided pdsch-HARQ-ACK-OneShotFeedback, the UE does not expect to receive a PDSCH scheduled by a DCI format that the UE detects in any PDCCH monitoring occasion and includes a PDSCH-to-HARQ_feedback timing indicator field providing an inapplicable value from dl-DataToUL-ACK-r16.

If the UE is provided pdsch-AggregationFactor-r16 in SPS-Config or pdsch-AggregationFactor in PDSCH-Config and no entry in pdsch-TimeDomainAllocationList and pdsch-TimeDomainAllocationListDCI-1-2 includes repetitionNumber in PDSCH-TimeDomainResourceAllocation-r16, $N_{PDSCH}^{repeat,max}$ is a maximum value of pdsch-AggregationFactor-r16 in SPS-Config or pdsch-AggregationFactor in PDSCH-Config; otherwise $N_{PDSCH}^{repeat,max}=1$. The UE reports HARQ-ACK information for a PDSCH reception (i) from DL slot $n_D$-$N_{PDSCH}^{repeat}+1$ to DL slot $n_D$, if $N_{PDSCH}^{repeat}$ is provided by pdsch-AggregationFactor or pdsch-AggregationFactor-r16 [6, REF4], or (ii) from DL slot $n_D$-repetitionNumber+1 to DL slot $n_D$, if the time domain resource assignment field in the DCI format scheduling the PDSCH reception indicates an entry containing repetitionNumber, or (iii) in DL slot $n_D$, otherwise only in a HARQ-ACK codebook that the UE includes in a PUCCH or PUSCH transmission in slot n+k, where n is a UL slot overlapping with the end of the PDSCH reception in DL slot $n_D$ and k is a number of slots indicated by the PDSCH-to-HARQ_feedback timing indicator field in a corresponding DCI format or provided by dl-DataToUL-ACK if the PDSCH-to-HARQ_feedback timing indicator field is not present in the DCI format. If the UE reports HARQ-ACK information for the PDSCH reception in a slot other than slot n+k, the UE sets a value for each corresponding HARQ-ACK information bit to NACK.

If a UE reports HARQ-ACK information in a PUCCH only for (i) a SPS PDSCH release indicated by DCI format 1_0 with counter DAI field value of 1, or (ii) a PDSCH reception scheduled by DCI format 1_0 with counter DAI field value of 1 on the PCell, or (iii) SPS PDSCH reception(s), then the $M_{A,C}$ occasions for candidate PDSCH receptions as determined in clause 9.1.2.1, the UE determines a HARQ-ACK codebook only for the SPS PDSCH release or only for the PDSCH reception or only for one SPS PDSCH reception according to corresponding $M_{A,c}$ occasion(s) on respective serving cell(s), where the value of counter DAI in DCI format 1_0 is according to Table (2) and HARQ-ACK information bits in response to more than one SPS PDSCH receptions that the UE is configured to receive are ordered according to the following pseudo-code, denoted as Syntax (1); otherwise, the procedures for a HARQ-ACK codebook determination apply.

responding HARQ-ACK information in a PUCCH or PUSCH transmission in a slot that is indicated by a value of a PDSCH-to-HARQ_feedback timing indicator field in the second DCI format, otherwise, the UE does not multiplex the corresponding HARQ-ACK information in a PUCCH or PUSCH transmission. Here, if the UE is not provided pdsch-HARQ-ACK-Codebook-r16, the UE detects the second DCI format in any PDCCH monitoring occasion after the first one, and where the slot indicated by the value of the PDSCH-to-HARQ_feedback timing indicator field in the second DCI format is no later than a slot for HARQ-ACK information in response to a SPS PDSCH reception, if any, received after the PDSCH scheduled by the first DCI format. If the UE is provided pdsch-HARQ-ACK-Codebook-r16, the UE detects the second DCI format in any PDCCH monitoring occasion after the first one, and the second DCI format indicates a HARQ-ACK information report for a same PDSCH group index as indicated by the first DCI format as described in clause 9.1.3.3, and where the slot

```
Syntax                                        (1)
Set N_cells^DL to the number of serving cells configured to the UE
Set N_c^SPS to the number of SPS PDSCH configuration configured to the UE for serving cell c
Set N_c^DL to the number of DL slots for SPS PDSCH reception on serving cell c with HARQ-
ACK information multiplexed on the PUCCH
Set j = 0 - HARQ-ACK information bit index
Set c = 0 - serving cell index: lower indexes correspond to lower RRC indexes of
corresponding cell
    while c < N_cells^DL
    Set s = 0 - SPS PDSCH configuration index: lower indexes correspond to lower RRC
        indexes of corresponding SPS configurations
        while s < N_c^SPS
            Set n_D = 0 - slot index
                while n_D < N_c^DL
                    if {
                        a UE is configured to receive SPS PDSCHs from slot n_D - N_PDSCH^repeat + 1 to
                        slot n_D for SPS PDSCH configuration s on serving cell c, excluding SPS
                        PDSCHs that are not required to be received in any slot among overlapping
                        SPS PDSCHs, if any according to [6, REF4], or based on a UE capability
                        for a number of PDSCH receptions in a slot according to [6, REF4], or due
                        to overlapping with a set of symbols indicated as uplink by tdd-UL-DL-
                        ConfigurationCommon or by tdd-UL-DL-ConfigurationDedicated where
                        N_PDSCH^repeat is provided by pdsch-AggregationFactor-r16 in sps-Config or, if
                        pdsch-AggregationFactor-r16 is not included in sps-Config, by pdsch-
                        AggregationFactor in pdsch-config, and
                        HARQ-ACK information for the SPS PDSCH is associated with the
                        PUCCH
                    }
                    õ_j^ACK = HARQ-ACK information bit for this SPS PDSCH reception
                    j = j + 1;
                end if
                n_D = n_D + 1;
            end while
            s = s + 1;
        end while
        c = c + 1;
    end while
```

This clause applies if the UE is configured with pdsch-HARQ-ACK-Codebook=dynamic or with pdsch-HARQ-ACK-Codebook-r16. Unless stated otherwise, a PDSCH-to-HARQ_feedback timing indicator field provides an applicable value.

A UE does not expect to multiplex in a Type-2 HARQ-ACK codebook HARQ-ACK information that is in response to a detection of a DCI format that does not include a counter DAI field.

If a UE receives a first DCI format that the UE detects in a first PDCCH monitoring occasion and includes a PDSCH-to-HARQ_feedback timing indicator field providing an inapplicable value from dl-DataToUL-ACK-r16, if the UE detects a second DCI format, the UE multiplexes the corindicated by the value of the PDSCH-to-HARQ_feedback timing indicator field in the second DCI format is no later than a slot for HARQ-ACK information in response to a SPS PDSCH reception, if any, received after the PDSCH scheduled by the first DCI format. If the UE is provided pdsch-HARQ-ACK-Codebook-r16, the UE receives the second DCI format later than the slot for HARQ-ACK information in response to a SPS PDSCH reception received after the PDSCH scheduled by the first DCI format, and the second DCI format indicates a HARQ-ACK information report for a same PDSCH group index as indicated by the first DCI format as described in clause 9.1.3.3. If the UE is provided pdsch-HARQ-ACK-OneShotFeedback, the first DCI format does not indicate SPS PDSCH release or SCell dormancy, the UE detects the second DCI format in any PDCCH monitoring occasion after the first one, and the second DCI format includes a One-shot HARQ-ACK request field with value 1, the UE includes the HARQ-ACK information in a Type-3 HARQ-ACK codebook, as described in clause 9.1.4, and where the slot indicated by the value of the PDSCH-to-HARQ_feedback timing indicator field in the second DCI format is no later than a slot for HARQ-ACK information in response to a SPS PDSCH reception, if any, received after the PDSCH scheduled by the first DCI format. If the UE is provided pdsch-HARQ-ACK-OneShotFeedback-r16, the first DCI format does not indicate SPS PDSCH release or SCell dormancy, and the UE receives the second DCI format later than the slot for HARQ-ACK information in response to a SPS PDSCH reception received after the PDSCH scheduled by the first DCI format, and the second DCI format includes a One-shot HARQ-ACK request field with value 1, the UE includes the HARQ-ACK information in a Type-3 HARQ-ACK codebook, as described in clause 9.1.4. Otherwise, the UE does not multiplex the corresponding HARQ-ACK information in a PUCCH or PUSCH transmission.

A UE constructs a Type-2 HARQ-ACK codebook in PUCCH as follows.

In certain embodiments, a UE (such as the UE 116) determines monitoring occasions for PDCCH with DCI format scheduling PDSCH receptions or SPS PDSCH release or indicating SCell dormancy on an active DL BWP of a serving cell c, and for which the UE transmits HARQ-ACK information in a same PUCCH in slot n based on (i) PDSCH-to-HARQ_feedback timing indicator field values for PUCCH transmission with HARQ-ACK information in slot n in response to PDSCH receptions, SPS PDSCH release or SCell dormancy indication and (ii) slot offsets $K_0$ [REF4] provided by time domain resource assignment field in a DCI format scheduling PDSCH receptions and by pdsch-AggregationFactor, or pdsch-AggregationFactor-r16, or repetitionNumber, when provided.

The set of PDCCH monitoring occasions for a DCI format scheduling PDSCH receptions or SPS PDSCH release or indicating SCell dormancy is defined as the union of PDCCH monitoring occasions across active DL BWPs of configured serving cells. PDCCH monitoring occasions are indexed in an ascending order of their start times. The cardinality of the set of PDCCH monitoring occasions defines a total number M of PDCCH monitoring occasions.

A value of the counter downlink assignment indicator (DAI) field in DCI formats denotes the accumulative number of {serving cell, PDCCH monitoring occasion}-pair(s) in which PDSCH reception(s), SPS PDSCH release or SCell dormancy indication associated with the DCI formats is present up to the current serving cell and current PDCCH monitoring occasion, (i) first, if the UE indicates by type2-HARQ-ACK-Codebook support for more than one PDSCH reception on a serving cell that are scheduled from a same PDCCH monitoring occasion, in increasing order of the PDSCH reception starting time for the same {serving cell, PDCCH monitoring occasion} pair, (ii) second in ascending order of serving cell index, and (iii) third in ascending order of PDCCH monitoring occasion index m, where 0≤m<M.

If, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the value of the counter DAI is in the order of the first CORESETs and then the second CORESETs for a same serving cell index and a same PDCCH monitoring occasion index.

The value of the total DAI, when present [REF2], in a DCI format denotes the total number of {serving cell, PDCCH monitoring occasion}-pair(s) in which PDSCH reception(s), SPS PDSCH release or SCell dormancy indication associated with DCI formats is present, up to the current PDCCH monitoring occasion m and is updated from PDCCH monitoring occasion to PDCCH monitoring occasion. If, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the total DAI value counts the {serving cell, PDCCH monitoring occasion}-pair(s) for both the first CORESETs and the second CORESETs.

Denote by $N_{C\text{-}DAI}^{DL}$ the number of bits for the counter DAI and set $T_D = 2^{N_{C\text{-}DAI}^{DL}}$. Denote by $V_{C\text{-}DAI,c,m}^{DL}$ the value of the counter DAI in a DCI format scheduling PDSCH reception, SPS PDSCH release or SCell dormancy indication on serving cell c in PDCCH monitoring occasion m according to Table (2), above, or Table (2A), below. Denote by $V_{T\text{-}DAI,m}^{DL}$ the value of the total DAI in a DCI format in PDCCH monitoring occasion m according to Table 3. The UE assumes a same value of total DAI in all DCI formats that include a total DAI field in PDCCH monitoring occasion m. A UE does not expect to multiplex, in a same Type-2 HARQ-ACK codebook, HARQ-ACK information that is in response to detection of DCI formats with different number of bits for the counter DAI field.

If the UE transmits HARQ-ACK information in a PUCCH in slot n and for any PUCCH format, the UE determines the $\tilde{o}_0^{ACK}, \tilde{o}_1^{ACK}, \ldots \tilde{o}_{O_{ACK}-1}^{ACK}$, for a total number of $O_{ACK}$ HARQ-ACK information bits, according to the following pseudo-code denoted as, denoted as Syntax (2).

Syntax (2)

Set m = 0 – PDCCH with DCI format scheduling PDSCH reception, SPS PDSCH release or
  SCell dormancy indication monitoring occasion index: lower index corresponds to earlier
  PDCCH monitoring occasion
Set j = 0
Set $V_{temp}$ = 0
Set $Vt_{emp2}$ = 0
Set $V_s$ = ∅
Set $N_{cells}^{DL}$ to the number of serving cells configured by higher layers for the UE
  if, for an active DL BWP of a serving cell, the UE is not provided coresetPoolIndex or is
  provided coresetPoolIndex with value 0 for one or more first CORESETs and is provided
  coresetPoolIndex with value 1 for one or more second CORESETs, and is provided
  ACKNackFeedbackMode = JointFeedback, the serving cell is counted two times where the -continued Syntax (2)

first time corresponds to the first CORESETs and the second time corresponds to the second CORESETs
if the UE indicates type2-HARQ-ACK-Codebook, a serving cell is counted $N_{PDSCH}^{MO}$ times where $N_{PDSCH}^{MO}$ is the number of PDSCH receptions that can be scheduled for the serving cell by DCI formats in PDCCH receptions at a same PDCCH monitoring occasion based on the reported value of type2-HARQ-ACK-Codebook
Set M to the number of PDCCH monitoring occasion(s)
while m < M
   Set c = 0 − serving cell index: lower indexes correspond to lower RRC indexes of corresponding cell
   while c < $N_{cells}^{DL}$
     if PDCCH monitoring occasion m is before an active DL BWP change on serving cell c or an active UL BWP change on the PCell and an active DL BWP change is not triggered in PDCCH monitoring occasion m
       c = c + 1;
     else
       if there is a PDSCH on serving cell c associated with PDCCH in PDCCH monitoring occasion m, or there is a PDCCH indicating SPS PDSCH release or SCell dormancy on serving cell c
         if $V_{C-DAI,c,m}^{DL} \leq V_{temp}$
           j = j + 1
         end if
           $V_{temp} = V_{C-DAI,c,m}^{DL}$
         if $V_{T-DAI,m}^{DL} = \emptyset$
           $V_{temp,2} = V_{C-DAI,c,m}^{DL}$
         else
           $V_{temp,2} = V_{T-DAI,m}^{DL}$
         end if
         if harq-ACK-SpatialBundlingPUCCH is not provided and the UE is configured by maxNrofCodeWordsScheduledByDCI with reception of two transport blocks for at least one configured DL BWP of at least one serving cell,
           $\tilde{o}^{ACK}_{2 \cdot T_D \cdot j + 2(V_{C-DAI,c,m}^{DL} - 1)}$ = HARQ−ACK
         information bit corresponding to the first transport block of this cell
           $\tilde{o}^{ACK}_{2 \cdot T_D \cdot j + 2(V_{C-DAI,c,m}^{DL} - 1)+1}$ = HARQ−ACK
         information bit corresponding to the second transport block of this cell
         $V_s = V_s \cup \{2 \cdot T_D \cdot j + 2(V_{C-DAI,c,m}^{DL} - 1), 2 \cdot T_D \cdot j + 2(V_{C-DAI,c,m}^{DL} - 1)+1\}$
         elseif harq-ACK-SpatialBundlingPUCCH is provided to the UE and m is a monitoring occasion for PDCCH with a DCI format that supports PDSCH reception with two transport blocks and the UE is configured by maxNrofCodeWordsScheduledByDCI with reception of two transport blocks in at least one configured DL BWP of a serving cell,
           $\tilde{o}^{ACK}_{T_D \cdot j + V_{C-DAI,c,m}^{DL} - 1}$ = binary AND
         operation of the HARQ-ACK information bits corresponding to the first and second transport blocks of this cell
           $V_s = V_s \cup \{T_D \cdot j + 2(V_{C-DAI,c,m}^{DL} - 1)\}$
         else
           $\tilde{o}^{ACK}_{T_D \cdot j + V_{C-DAI,c,m}^{DL} - 1}$ = HARQ−ACK
           information bit of this cell
           $V_s = V_s \cup \{T_D \cdot j + 2(V_{C-DAI,c,m}^{DL} - 1)\}$
         end if
       end if
           c = c + 1
     end if
   end while
           m = m + 1
end while $$V_{temp} = \left(j \bmod \left(\frac{4}{T_D}\right)\right) \times \left(\frac{4}{T_D}\right) + V_{temp}$$

if UE does not set $V_{temp2} = V_{T-DAI}^{UL}$ and $T_D = 2$
       $V_{temp2} = V_{temp}$
end if $$j = \left\lfloor \frac{j \times T_D}{4} \right\rfloor$$

if $V_{temp2} < V_{temp}$
       j = j + 1
end if
if harq-ACK-SpatialBundlingPUCCH is not provided to the UE and the UE is configured by maxNrofCodeWordsScheduledByDCI with reception of two transport blocks for at least one configured DL BWP of a serving cell,
       $O^{ACK} = 2 \cdot (4 \cdot j + V_{temp2})$
else
       $O^{ACK} = 4 \cdot j + V_{temp2}$ -continued Syntax (2)

end if
$\tilde{o}_i^{ACK}$ = NACK for any i ∈{0, 1, . . . , $O^{ACK}$ – 1}\$V_s$ If a UE is configured to receive SPS PDSCH and the UE multiplexes HARQ-ACK information for one activated SPS PDSCH reception in the PUCCH in slot n, the UE generates one HARQ-ACK information bit associated with the SPS PDSCH reception and appends it to the $O^{ACK}$ HARQ-ACK information bits.

If a UE is configured to receive SPS PDSCH and the UE multiplexes HARQ-ACK information for multiple activated SPS PDSCH receptions in the PUCCH in slot n, the UE generates the HARQ-ACK information as described in clause 9.1.2 and appends it to the $O^{ACK}$ HARQ-ACK information bits.

For a PDCCH monitoring occasion with DCI format scheduling PDSCH reception or SPS PDSCH release or indicating SCell dormancy in the active DL BWP of a serving cell, when a UE receives a PDSCH with one transport block or a SPS PDSCH release or indicating SCell dormancy and the value of maxNrofCodeWordsScheduledByDCI is 2, the HARQ-ACK information is associated with the first transport block and the UE generates a NACK for the second transport block if harq-ACK-SpatialBundling-PUCCH is not provided and generates HARQ-ACK information with value of ACK for the second transport block if harq-ACK-SpatialBundlingPUCCH is provided.

If a UE is not provided PDSCH-CodeBlockGroupTransmission for each of the $N_{cells}^{DL}$ serving cells, or for PDSCH receptions scheduled by a DCI format that does not support CBG-based PDSCH receptions, or for SPS PDSCH reception, or for SPS PDSCH release, or for SCell dormancy indication, and if $O_{ACK}+O_{SR}+O_{CSI} \le 11$, the UE determines a number of HARQ-ACK information bits $n_{HARQ-ACK}$ for obtaining a transmission power for a PUCCH as $$n_{HARQ-ACK} = n_{HARQ-ACK,TB} = ((V_{DAI,m_{last}}^{DL} - \sum_{c=0}^{N_{cells}^{DL}-1} U_{DAI,c}) \bmod(T_D) N_{TB,max}^{DL} + \sum_{c=0}^{N_{cells}^{DL}-1} (\sum_{m=0}^{M-1} N_{m,c}^{received} + N_{SPS,c}))  \quad (1)$$

Here, if $N_{cells}^{DL}=1$, $V_{DAI,m_{last}}^{DL}$ is the value of the counter DAI in the last DCI format scheduling PDSCH reception or indicating SPS PDSCH release or indicating SCell dormancy, for any serving cell c that the UE detects within the M PDCCH monitoring occasions. If $N_{cells}^{DL}>1$ and if the UE does not detect any DCI format that includes a total DAI field in a last PDCCH monitoring occasion within the M PDCCH monitoring occasions where the UE detects at least one DCI format scheduling PDSCH reception, indicating SPS PDSCH release or indicating SCell dormancy for any serving cell c, $V_{DAI,m_{last}}^{DL}$ is the value of the counter DAI in a last DCI format the UE detects in the last PDCCH monitoring occasion. If $N_{cells}^{DL}>1$ and if the UE detects at least one DCI format that includes a total DAI field in a last PDCCH monitoring occasion within the M PDCCH monitoring occasions where the UE detects at least one DCI format scheduling PDSCH reception, indicating SPS PDSCH release or indicating SCell dormancy for any serving cell c, $V_{DAI,m_{last}}^{DL}$ is the value of the total DAI in the at least one DCI format that includes a total DAI field. Additionally, $V_{DAI,m_{last}}^{DL}=0$ if the UE does not detect any DCI format scheduling PDSCH reception, indicating SPS PDSCH release or indicating SCell dormancy for any serving cell c in any of the M PDCCH monitoring occasions.

$U_{DAI,c}$ is the total number of a DCI format scheduling PDSCH reception, indicating SPS PDSCH release or indicating SCell dormancy that the UE detects within the M PDCCH monitoring occasions for serving cell c. $U_{DAI,c}=0$ if the UE does not detect any DCI format scheduling PDSCH reception, indicating SPS PDSCH release or indicating SCell dormancy for serving cell c in any of the M PDCCH monitoring occasions. $N_{TB,max}^{DL}=2$ if the value of maxNrofCodeWordsScheduledByDCI is 2 for any serving cell c and harq-ACK-SpatialBundlingPUCCH is not provided; otherwise, $N_{TB,max}^{DL}=1$. $N_{m,c}^{received}$ is the number of transport blocks the UE receives in a PDSCH scheduled by a DCI format that the UE detects in PDCCH monitoring occasion m for serving cell c if harq-ACK-SpatialBundlingPUCCH is not provided, or the number of PDSCH scheduled by a DCI format that the UE detects in PDCCH monitoring occasion m for serving cell c if harq-ACK-SpatialBundlingPUCCH is provided, or the number of DCI format that the UE detects and indicate SPS PDSCH release in PDCCH monitoring occasion m for serving cell c, or the number of DCI format that the UE detects and indicate SCell dormancy in PDCCH monitoring occasion m for serving cell c. $N_{SPS,c}$ is the number of SPS PDSCH receptions by the UE on serving cell c for which the UE transmits corresponding HARQ-ACK information in the same PUCCH as for HARQ-ACK information corresponding to PDSCH receptions within the M PDCCH monitoring occasions.

If a UE is (i) provided PDSCH-CodeBlockGroupTransmission for $N_{cells}^{DL,CBG}$ serving cells; and (ii) is not provided PDSCH-CodeBlockGroupTransmission, for $N_{cells}^{DL,TB}$ serving cells where $N_{cells}^{DL,TB}+N_{cells}^{DL,CBG}=N_{cells}^{DL}$, then the UE determines the $\tilde{o}_0^{ACK}$, $\tilde{o}_1^{ACK}$, . . . , $\tilde{o}_{O_{ACK}-1}^{ACK}$ according to the previous pseudo-code with the following modifications. A first medication, $N_{cells}^{DL}$ is used for the determination of a first HARQ-ACK sub-codebook for (i) SPS PDSCH release, (ii) SPS PDSCH reception, (iii) DCI format 1_1 indicating SCell dormancy, and (iv) for TB-based PDSCH receptions on the $N_{cells}^{DL,CBG}$ serving cells and on the $N_{cells}^{DL,TB}$ serving cells. For another medication, $N_{cells}^{DL}$ is replaced by $N_{cells}^{DL,CBG}$ for the determination of a second HARQ-ACK sub-codebook corresponding to the $N_{cells}^{DL,CBG}$ serving cells for CBG-based PDSCH receptions. For another medication, if, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the serving cell is counted as two times where the first time corresponds to the first CORESETs and the second time corresponds to the second CORESETs. Additionally, instead of generating one HARQ-ACK information bit per transport block for a serving cell from the $N_{cells}^{DL,CBG}$ serving cells, the UE generates $N_{HARQ\_ACK,max}^{CBG/TB,max}$ HARQ-ACK information bits, where $N_{HARQ\_ACK,max}^{CBG/TB,max}$ is the maximum value of $N_{TB,c}^{DL} \cdot N_{HARQ\_ACK,c}^{CBG/TB,max}$ across all $N_{cells}^{DL,CBG}$ serving cells and $N_{TB,c}^{DL}$ is the value of maxNrofCodeWordsScheduledByDCI for serving cell c. If for a serving cell c it is $N_{TB,c}^{DL}$. $N_{HARQ-ACK,c}^{CBG/TB,max}<$ $N_{HARQ\_ACK,max}^{CBG/TB,max}$, the UE generates NACK for the last $N_{HARQ-ACK,max}^{CBG/TB,max} - N_{TB,c}^{DL}$. $N_{HARQ-ACK,c}^{CBG/TB,max}$ information bits for serving cell c. For another medication, the pseudo-code operation when harq-ACK-SpatialBundlingPUCCH is provided is not applicable. For another medication, the counter DAI value and the total DAI value apply separately for each HARQ-ACK sub-codebook. For yet another medication, The UE generates the HARQ-ACK codebook by appending the second HARQ-ACK sub-codebook to the first HARQ-ACK sub-codebook.

If $O_{ACK} + O_{SR} + O_{CSI} \leq 11$, the UE also determines $n_{HARQ-ACK} = n_{HARQ-ACK,TB} + n_{HARQ-ACK,CBG}$ for obtaining a PUCCH transmission power with $$n_{HARQ-CK,CBG} = ((V_{DAI,m_{last}}^{DL} - \Sigma_{c=0}^{N_{cells}^{DL,CBG}-1} U_{DAI,c}^{CBG}) \mod(T_D)) N_{HARQ-ACK,max}^{CBG/TB,max} + \Sigma_{c=0}^{N_{cells}^{DL}-1} \Sigma_{m=0}^{M-1} N_{m,c}^{received,CBG} \quad (2)$$

Here, if $N_{cells}^{DL} = 1$, $V_{DAI,m_{last}}^{DL}$ is the value of the counter DAI in the last DCI format scheduling CBG-based PDSCH reception for any serving cell c that the UE detects within the M PDCCH monitoring occasions. If $N_{cells}^{DL} > 1$, $V_{DAI,m_{last}}^{DL}$ is the value of the total DAI in the last DCI format scheduling CBG-based PDSCH reception for any serving cell c that the UE detects within the M PDCCH monitoring occasions. $V_{DAI,m_{last}}^{DL} = 0$, if the UE does not detect any DCI format scheduling CBG-based PDSCH reception for any serving cell c in any of the M PDCCH monitoring occasions. $U_{DAI,c}^{CBG}$ is the total number of DCI formats scheduling CBG-based PDSCH receptions that the UE detects within the M PDCCH monitoring occasions for serving cell c. $U_{DAI,c}^{CBG} = 0$ if the UE does not detect any DCI format scheduling CBG-based PDSCH reception for serving cell c in any of the M PDCCH monitoring occasions. $N_{m,c}^{received,CBG}$ is the number of CBGs the UE receives in a PDSCH scheduled by a DCI format that supports CBG-based PDSCH reception that the UE detects in PDCCH monitoring occasion m for serving cell c and the UE reports corresponding HARQ-ACK information in the PUCCH.

Table (2), below, describes a value of counter DAI (C-DAI) for $N_{C-DAI}^{DL} = 2$ and of total DAI.

TABLE (2)

| DAI MSB, LSB | $V_{C-DAI}^{DL}$ or $V_{T-DAI}^{DL}$ | Number of {serving cell, PDCCH monitoring occasion}-pair(s) in which PDSCH transmission(s) associated with PDCCH or PDCCH indicating SPS PDSCH release or DCI format 1_1 indicating SCell dormancy is present, denoted as Y and Y ≥ 1 |
|---|---|---|
| 0, 0 | 1 | (Y − 1) mod $T_D$ + 1 = 1 |
| 0, 1 | 2 | (Y − 1) mod $T_D$ + 1 = 2 |
| 1, 0 | 3 | (Y − 1) mod $T_D$ + 1 = 3 |
| 1, 1 | 4 | (Y − 1) mod $T_D$ + 1 = 4 |

Table (2A), below, describes value of counter DAI (C-DAI) for $N_{c-DAI}^{DL} = 1$.

TABLE (2A)

| DAI | $V_{C-DAI}^{DL}$ | Number of {serving cell, PDCCH monitoring occasion}-pair(s) in which PDSCH transmission(s) associated with PDCCH or PDCCH indicating SPS PDSCH release is present, denoted as Y and Y ≥ 1 |
|---|---|---|
| 0 | 1 | (Y − 1) mod $T_D$ + 1 = 1 |
| 1 | 2 | (Y − 1) mod $T_D$ + 1 = 2 |

A UE constructs a Type-2 HARQ-ACK codebook in PUSCH as follows.

If a UE would multiplex HARQ-ACK information in a PUSCH transmission that is not scheduled by a DCI format or is scheduled by a DCI format that does not include a DAI field, then (i) if the UE has not received any PDCCH within the monitoring occasions for DCI formats scheduling PDSCH receptions, or SPS PDSCH release, or DCI format 1_1 indicating SCell dormancy on any serving cell c and the UE does not have HARQ-ACK information in response to a SPS PDSCH reception, or in response to a detection of a DCI format 1_1 indicating SCell dormancy, to multiplex in the PUSCH, the UE does not multiplex HARQ-ACK information in the PUSCH transmission; (ii)

else, the UE generates the HARQ-ACK codebook as described for a Type-2 HARQ-ACK codebook in physical uplink control channel, except that harq-ACK-SpatialBundlingPUCCH is replaced by harq-ACK-SpatialBundlingPUSCH.

If a UE multiplexes HARQ-ACK information in a PUSCH transmission that is scheduled by a DCI format that includes a DAI field, the UE generates the HARQ-ACK codebook as described in clause 9.1.3.1, with the following modifications: For the pseudo-code for the HARQ-ACK codebook generation for a Type-2 HARQ-ACK codebook in physical uplink control channel, after the completion of the c and m loops, the UE sets $V_{temp2} = V_{T-DAI}^{UL}$ where $V_{T-DAI}^{DL}$ is the value of the DAI field according to Table (3), below. For the case of first and second HARQ-ACK sub-codebooks, the DCI format includes a first DAI field corresponding to the first HARQ-ACK sub-codebook and a second DAI field corresponding to the second HARQ-ACK sub-codebook harq-ACK-SpatialBundlingPUCCH is replaced by harq-ACK-SpatialBundlingPUSCH.

If a UE is not provided PDSCH-CodeBlockGroupTransmission and the UE is scheduled for a PUSCH transmission by DCI format that includes a DAI field with value $V_{T-DAI}^{UL} = 4$ and the UE has not received any PDCCH within the monitoring occasions for PDCCH with DCI format scheduling PDSCH receptions or SPS PDSCH release or indicating SCell dormancy on any serving cell c and the UE does not have HARQ-ACK information in response to a SPS PDSCH reception to multiplex in the PUSCH, the UE does not multiplex HARQ-ACK information in the PUSCH transmission.

If a UE is provided PDSCH-CodeBlockGroupTransmission and the UE is scheduled for a PUSCH transmission by DCI format that includes a DAI field with first value $V_{T-DAI}^{UL} = 4$ or with second value $V_{T-DAI}^{UL} = 4$ and the UE has not received any PDCCH within the monitoring occasions for PDCCH with DCI format scheduling PDSCH receptions or SPS PDSCH release, or DCI format 1_1 indicating SCell dormancy, on any serving cell c and the UE does not have HARQ-ACK information in response to a SPS PDSCH reception to multiplex in the PUSCH, the UE does not multiplex HARQ-ACK information for the first sub-codebook or for the second sub-codebook, respectively, in the PUSCH transmission.

Table (3), below, describes Value of T-DAI.

TABLE (3)

| DAI MSB, LSB | $V_{T-DAI}^{UL}$ | Number of {serving cell, PDCCH monitoring occasion}-pair(s) in which PDSCH transmission(s) associated with PDCCH or PDCCH indicating SPS PDSCH release or DCI format 1_1 indicating SCell dormancy is present, denoted as X and X ≥ 1 |
|---|---|---|
| 0, 0 | 1 | (X − 1) mod 4 + 1 = 1 |
| 0, 1 | 2 | (X − 1) mod 4 + 1 = 2 |
| 1, 0 | 3 | (X − 1) mod 4 + 1 = 3 |
| 1, 1 | 4 | (X − 1) mod 4 + 1 = 4 |

A UE generates a Type-3 HARQ-ACK codebook determination as follows.

If a UE is provided pdsch-HARQ-ACK-OneShotFeedback, the UE determines $\tilde{o}_0^{ACK}, \tilde{o}_1^{ACK}, \ldots \tilde{o}_{O_{ACK}-1}^{ACK}$ HARQ-ACK information bits, for a total number of $O_{ACK}$ HARQ-ACK information bits, of a Type-3 HARQ-ACK codebook according to the following procedure, denoted as Syntax (3).

Syntax (3)

Set $N_{cells}^{DL}$ to the number of configured serving cells
Set $N_{HARQ, c}^{DL}$ to the value of nrofHARQ-ProcessesForPDSCH for serving cell c, if provided; else, set $N_{HARQ, c}^{DL} = 8$
Set $N_{TB, c}^{DL}$ to the value of maxNrofCodeWordsScheduledByDCI for serving cell c if harq-ACK-SpatialBundlingPUCCH is provided and $NDI_{HARQ} = 0$, or if harq-ACK-SpatialBundlingPUCCH is not provided, or if maxCodeBlockGroupsPerTransportBlock is provided for serving cell c; else, set $N_{TB, c}^{DL} = 1$
Set $N_{HARQ-ACK, c}^{CBG/TB, max}$ to the number of HARQ-ACK information bits per TB for PDSCH receptions on serving cell c as described in clause 9.1.1 if maxCodeBlockGroupsPerTransportBlock is provided for serving cell c and pdsch-HARQ-ACK-OneShotFeedbackCBG is provided; else, set $N_{HARQ-ACK, c}^{CBG/TB, max} = 0$
Set $NDI_{HARQ} = 0$ if pdsch-HARQ-ACK-OneShotFeedbackNDI is provided; else set $NDI_{HARQ} = 1$
Set c = 0 - serving cell index
Set h = 0 - HARQ process number
Set t = 0 - TB index
Set g = 0 - CBG index
Set j = 0
   while c < $N_{cells}^{DL}$
      while h < $N_{HARQ, c}^{DL}$
         if $NDI_{HARQ} = 0$
            if $N_{HARQ-ACK,c}^{CBG/TB, max} > 0$
               while t < $N_{TB, c}^{DL}$
                  while g < $N_{HARQ-ACK, c}^{CBG/TB, max}$
                     $\tilde{o}_j^{ACK}$ = HARQ-ACK information bit for CBG g of TB t for HARQ process number h of serving cell c, if any; else, $\tilde{o}_j^{ACK} = 0$
                     j = j + 1
                     g = g + 1
                end while
               $\tilde{o}_j^{ACK}$ = NDI value indicated in the DCI format corresponding to the HARQ-ACK information bit(s) for TB t for HARQ process number h on serving cell c, if any; else, $\tilde{o}_j^{ACK} = 0$
               g = 0
               j = j + 1
               t = t + 1
            end while
         else
            while t < $N_{TB, c}^{DL}$
               $\tilde{o}_j^{ACK}$ = HARQ-ACK information bit for TB t for HARQ process h of serving cell c, if any; else, $\tilde{o}_j^{ACK} = 0$
               j = j + 1
               $\tilde{o}_j^{ACK}$ = value indicated in the DCI format corresponding to the HARQ-ACK information bit(s) for TB t for HARQ process number h on serving cell c, if any; else, $\tilde{o}_j^{ACK} = 0$
               j = j + 1
               t = t + 1
            end while
         end if
            t = 0
        else
           if $N_{HARQ-ACK, c}^{CBG/TB, max} > 0$
              while t < $N_{TB, c}^{DL}$
                if UE has obtained HARQ-ACK information for TB t for HARQ process number h on serving cell c corresponding to a PDSCH reception and has not reported the HARQ-ACK information corresponding to the PDSCH reception
                 while g < $N_{HARQ-ACK, c}^{CBG/TB, max}$
                     $\tilde{o}_j^{ACK}$ = HARQ-ACK information bit for CBG g of TB t for HARQ process number h of serving cell c
                     j = j + 1
                     g = g + 1
                end while
               else
                 while g < $N_{HARQ-ACK, c}^{CBG/TB, max}$ -continued

```
            õ_j^ACK = NACK
                        j = j + 1
                        g = g + 1
            end while
          end if
                        g = 0
                        t = t + 1
        end while
      else
        while t < N_{TB, c}^{DL}
          if UE has obtained HARQ-ACK information for TB t for HARQ process
            number h on serving cell c corresponding to a PDSCH reception and has not
            reported the HARQ-ACK information corresponding to the PDSCH
            reception
            if harq-ACK-SpatialBundlingPUCCH is not provided
              õ_j^ACK = HARQ-ACK information bit for TB t for HARQ process h of
                serving cell c
            else
              õ_j^ACK = binary AND operation of the HARQ-ACK information bits
                corresponding to first and second transport blocks for HARQ process h
                of serving cell c. If the UE receives one transport block, the UE assumes
                ACK for the second transport block
            end if
                        j = j + 1
                        t = t + 1
          else
            õ_j^ACK = NACK
                        j = j + 1
                        t = t + 1
          end if
        end while
      end if
                        t = 0
      end if
                        h = h + 1
    end while
                        h = 0
                        c = c + 1
  end while
```

If $N_{TB,c}^{DL} > 1$, when a UE receives a PDSCH with one transport block, the HARQ-ACK information is associated with the first transport block.

If a UE receives a SPS PDSCH, or a PDSCH that is scheduled by a DCI format that does not support CBG-based PDSCH receptions for a serving cell c and if maxCodeBlockGroupsPerTransportBlock is provided for serving cell c, and pdsch-HARQ-ACK-OneShotFeedbackCBG is provided, the UE repeats $N_{HARQ-ACK,c}^{CBG/TB,max}$ times the HARQ-ACK information for the transport block in the PDSCH.

If a UE detects a DCI format that includes a One-shot HARQ-ACK request field with value 1, the UE determines a PUCCH or a PUSCH to multiplex a Type-3 HARQ-ACK codebook for transmission in a slot. The UE multiplexes only the Type-3 HARQ-ACK codebook in the PUCCH or the PUSCH for transmission in the slot.

If (i) a UE detects a DCI format that includes a One-shot HARQ-ACK request field with value 1, and (ii) the CRC of the DCI is scrambled by a C-RNTI or an MCS-C-RNTI, and (iii) resourceAllocation=resourceAllocationType0 and all bits of the frequency domain resource assignment field in the DCI format are equal to 0, or (iv) resourceAllocation=resourceAllocationType1 and all bits of the frequency domain resource assignment field in the DCI format are equal to 1, or (v) resourceAllocation=dynamicSwitch and all bits of the frequency domain resource assignment field in the DCI format are equal to 0 or 1, then the DCI format provides a request for a Type-3 HARQ-ACK codebook report and does not schedule a PDSCH reception. The UE is expected to provide HARQ-ACK information in response to the request for the Type-3 HARQ-ACK codebook after N symbols from the last symbol of a PDCCH providing the DCI format, where the value of N for µ=0, 1, 2 is provided in clause 10.2 by replacing "SPS PDSCH release" with "DCI format".

If a UE multiplexes HARQ-ACK information in a PUSCH transmission, the UE generates the HARQ-ACK codebook as described in this clause except that harq-ACK-SpatialBundlingPUCCH is replaced by harq-ACK-SpatialBundlingPUSCH.

UCI types reported in a PUCCH include HARQ-ACK information, SR, link recovery request (LRR), and CSI. UCI bits include HARQ-ACK information bits, if any, SR information bits, if any, LRR information bit, if any, and CSI bits, if any. The HARQ-ACK information bits correspond to a HARQ-ACK codebook. For the remaining of this clause, any reference to SR is applicable for SR and/or for LRR.

A UE may transmit one or two PUCCHs on a serving cell in different symbols within a slot. When the UE transmits two PUCCHs in a slot and the UE is not provided ackNackFeedbackMode=separate, at least one of the two PUCCHs uses PUCCH format 0 or PUCCH format 2.

If a UE is provided ackNackFeedbackMode=separate, the UE may transmit up to two PUCCHs with HARQ-ACK information in different symbols within a slot.

A UE assumes 11 CRC bits if a number of respective UCI bits is larger than or equal to 360; otherwise, the UE determines a number of CRC bits based on the number of respective UCI bits as described in [REF2].

If a UE does not have dedicated PUCCH resource configuration, provided by PUCCH-ResourceSet in PUCCH- Config, a PUCCH resource set is provided by pucch-ResourceCommon through an index to a row of [Table 9.2.1-1, REF3] for transmission of HARQ-ACK information on PUCCH in an initial UL BWP of $N_{BWP}^{size}$ PRBs.

The PUCCH resource set includes sixteen resources, each corresponding to a PUCCH format, a first symbol, a duration, a PRB offset $RB_{BWP}^{offset}$, and a cyclic shift index set for a PUCCH transmission.

The UE transmits a PUCCH using frequency hopping if not provided useInterlacePUCCH-PUSCH in BWP-UplinkCommon; otherwise, the UE transmits a PUCCH without frequency hopping.

An orthogonal cover code with index 0 is used for a PUCCH resource with PUCCH format 1 in [Table 9.2.1-1, REF3].

The UE transmits the PUCCH using the same spatial domain transmission filter as for a PUSCH transmission scheduled by a random-access response (RAR) UL grant.

If a UE is not provided any of pdsch-HARQ-ACK-Codebook, pdsch-HARQ-ACK-Codebook-r16, or pdsch-HARQ-ACK-OneShotFeedback, the UE generates at most one HARQ-ACK information bit.

If the UE provides HARQ-ACK information in a PUCCH transmission in response to detecting a DCI format scheduling a PDSCH reception or a SPS PDSCH release, the UE determines a PUCCH resource with index $r_{PUCCH}$, $0 \le r_{PUCCH} \le 15$, as $$r_{PUCCH} = \left\lfloor \frac{2 \cdot n_{CCE,0}}{N_{CCE}} \right\rfloor + 2 \cdot \Delta_{PRI},$$

where $N_{CCE}$ is a number of CCEs in a CORESET of a PDCCH reception with the DCI format, $n_{CCE,0}$ is the index of a first CCE for the PDCCH reception, and $\Delta_{PRI}$ is a value of the PUCCH resource indicator field in the DCI format.

If $\lfloor r_{PUCCH}/8 \rfloor = 0$ and a UE is provided a PUCCH resource by pucch-ResourceCommon and is not provided useInterlacePUCCH-PUSCH in BWP-UplinkCommon then (i) the UE determines the PRB index of the PUCCH transmission in the first hop as $RB_{BWP}^{offset} + \lfloor r_{PUCCH}/N_{CS} \rfloor$ and the PRB index of the PUCCH transmission in the second hop as $N_{BWP}^{size} - 1 - RB_{BWP}^{offset} - \lfloor r_{PUCCH}/N_{CS} \rfloor$, where $N_{CS}$ is the total number of initial cyclic shift indexes in the set of initial cyclic shift indexes, and (ii) the UE determines the initial cyclic shift index in the set of initial cyclic shift indexes as $r_{PUCCH}$ mod $N_{CS}$.

If $\lfloor r_{PUCCH}/8 \rfloor = 1$ and a UE is provided a PUCCH resource by pucch-ResourceCommon and is not provided useInterlacePUCCH-PUSCH in BWP-UplinkCommon (i) the UE determines the PRB index of the PUCCH transmission in the first hop as $N_{BWP}^{size} - 1 - RB_{BWP}^{offset} - \lfloor (r_{PUCCH}-8)/N_{CS} \rfloor$ and the PRB index of the PUCCH transmission in the second hop as $RB_{BWP}^{offset} + \lfloor (r_{PUCCH}-8)/N_{CS} \rfloor$, and (ii) the UE determines the initial cyclic shift index in the set of initial cyclic shift indexes as $(r_{PUCCH}-8)$ mod $N_{CS}$.

If a UE is provided a PUCCH resource by pucch-ResourceCommon and is provided useInterlacePUCCH-PUSCH in BWP-UplinkCommon then the following occurs. First, the UE determines for the PUCCH resource an interlace index m as $m=(m_0 + \lfloor r_{PUCCH}/N_{CS} \rfloor)$ mod M where M is a number of interlaces [REF1] and $m_0 = RB_{BWP}^{offset}$ is an interlace index offset and $RB_{BWP}^{offset}$ is as given in [Table 9.2.1-1, REF3]. Second, the UE determines an initial cyclic shift index in a set of initial cyclic shift indexes as $r_{PUCCH}$ mod $N_{CS}$, where $N_{CS}$ is the total number of initial cyclic shifts indexes in the set of initial cyclic shifts indexes in [Table 9.2.1-1, REF3]. Third, if pucch-ResourceCommon indicates, then (i) index 0: the first symbol is 9 for a PUCCH resource with PUCCH format 0 if $r_{PUCCH} \ge 10$, (ii) index 1 or 2: the first symbol is 9 for a PUCCH resource with PUCCH format 0 if $r_{PUCCH} = 15$, and (iii) index 3, 7, or 11: an orthogonal cover code with index 1 is used for a PUCCH resource with PUCCH format 1 if $r_{PUCCH} \ge 10$. Fourth, the UE does not expect pucch-ResourceCommon to indicate index 15.

A UE can be configured up to four sets of PUCCH resources in a PUCCH-Config. A PUCCH resource set is provided by PUCCH-ResourceSet and is associated with a PUCCH resource set index provided by pucch-ResourceSetId, with a set of PUCCH resource indexes provided by resourceList that provides a set of pucch-ResourceId used in the PUCCH resource set, and with a maximum number of UCI information bits the UE can transmit using a PUCCH resource in the PUCCH resource set provided by maxPayloadSize. For the first PUCCH resource set, the maximum number of UCI information bits is 2. A maximum number of PUCCH resource indexes for a set of PUCCH resources is provided by maxNrofPUCCH-ResourcesPerSet. The maximum number of PUCCH resources in the first PUCCH resource set is 32 and the maximum number of PUCCH resources in the other PUCCH resource sets is 8.

If the UE transmits $O_{UCI}$ UCI information bits, that include HARQ-ACK information bits, the UE determines a PUCCH resource set to be one of the following. A first set of PUCCH resources with pucch-ResourceSetId=0 if $O_{UCI} \le 2$ including 1 or 2 HARQ-ACK information bits and a positive or negative SR on one SR transmission occasion if transmission of HARQ-ACK information and SR occurs simultaneously. A second set of PUCCH resources with pucch-ResourceSetId=1, if provided by higher layers, if $2 < O_{UCI} \le N_2$ where $N_2$ is equal to maxPayloadSize if maxPayloadSize is provided for the PUCCH resource set with pucch-ResourceSetId=1; otherwise $N_2$ is equal to 1706. A third set of PUCCH resources with pucch-ResourceSetId=2, if provided by higher layers, if $N_2 < O_{UCI} \le N_3$ where $N_3$ is equal to maxPayloadSize if maxPayloadSize is provided for the PUCCH resource set with pucch-ResourceSetId=2; otherwise $N_3$ is equal to 1706. A fourth set of PUCCH resources with pucch-ResourceSetId=3, if provided by higher layers, if $N_3 < O_{UCI} \le 1706$.

If the UE is provided SPS-PUCCH-AN-List and transmits $O_{UCI}$ UCI information bits that include only HARQ-ACK information bits in response to one or more SPS PDSCH receptions and SR, if any, the UE determines a PUCCH resource to be one of the following four options. First, a PUCCH resource provided by sps-PUCCH-AN-ResourceID obtained from the first entry in sps-PUCCH-AN-List if $O_{UCI} \le 2$ including 1 or 2 HARQ-ACK information bits and a positive or negative SR on one SR transmission occasion if transmission of HARQ-ACK information and SR occurs simultaneously. Second, a PUCCH resource provided by sps-PUCCH-AN-ResourceID obtained from the second entry in sps-PUCCH-AN-List, if provided, if $2 < O_{UCI} \le N_{1,SPS}$ where $N_{1,SPS}$ is either provided by maxPayloadSize obtained from the second entry in sps-PUCCH-AN-List or is otherwise equal to 1706. Third a PUCCH resource provided by sps-PUCCH-AN-ResourceID obtained from the third entry in sps-PUCCH-AN-List, if provided, if $N_{1,SPS} < O_{UCI} \le N_{2,SPS}$ where $N_{2,SPS}$ is either provided by maxPayloadSize obtained from the third entry in sps-PUCCH-AN-List or is otherwise equal to 1706. Fourth, a PUCCH resource provided by sps-PUCCH-AN-ResourceID obtained from the fourth entry in sps-PUCCH-AN-List, if provided, if $N_{2,SPS} < O_{UCI} \leq N_{3,SPS}$ where $N_{3,SPS}$ is equal to 1706.

UE procedure for reporting HARQ-ACK is as follows.

A UE does not expect to transmit more than one PUCCH with HARQ-ACK information in a slot per priority index, if the UE is not provided ackNackFeedbackMode=separate.

For DCI format 1_0, the PDSCH-to-HARQ_feedback timing indicator field values map to {1, 2, 3, 4, 5, 6, 7, 8}. For a DCI format, other than DCI format 1_0, scheduling a PDSCH reception or a SPS PDSCH release, the PDSCH-to-HARQ_feedback timing indicator field values, if present, map to values for a set of number of slots provided by dl-DataToUL-ACK, dl-DataToUL-ACK-r16, or dl-DataToUL-ACKForDCIFormat1_2, as defined in Table (4).

For a SPS PDSCH reception ending in slot n, the UE transmits the PUCCH in slot n+k where k is provided by the PDSCH-to-HARQ_feedback timing indicator field, if present, in a DCI format activating the SPS PDSCH reception.

If the UE detects a DCI format that does not include a PDSCH-to-HARQ_feedback timing indicator field and schedules a PDSCH reception or activates a SPS PDSCH reception ending in slot n, the UE provides corresponding HARQ-ACK information in a PUCCH transmission within slot n+k where k is provided by dl-DataToUL-ACK, or dl-DataToUL-ACK-r16, or dl-DataToUL-ACKForDCIFormat1_2.

With reference to slots for PUCCH transmissions, if the UE detects a DCI format scheduling a PDSCH reception ending in slot n or if the UE detects a DCI format indicating a SPS PDSCH release or indicating SCell dormancy through a PDCCH reception ending in slot n, or if the UE detects a DCI format that requests Type-3 HARQ-ACK codebook report and does not schedule a PDSCH reception through a PDCCH reception ending in slot n, the UE provides corresponding HARQ-ACK information in a PUCCH transmission within slot n+k, where k is a number of slots and is indicated by the PDSCH-to-HARQ_feedback timing indicator field in the DCI format, if present, or provided by dl-DataToUL-ACK, dl-DataToUL-ACK-r16, or dl-DataToUL-ACKForDCIFormat1_2. k=0 corresponds to the last slot of the PUCCH transmission that overlaps with the PDSCH reception or with the PDCCH reception in case of SPS PDSCH release or in case of SCell dormancy indication or in case of the DCI format that requests Type-3 HARQ-ACK codebook report and does not schedule a PDSCH reception.

A PUCCH transmission with HARQ-ACK information is subject to the limitations for UE transmissions described in clause 11.1 and clause 11.1.1 of [REF3].

Table (4), below, describes mapping of PDSCH-to-HARQ_feedback timing indicator field values to numbers of slots

TABLE (4)

| PDSCH-to-HARQ_feedback timing indicator | | | |
|---|---|---|---|
| 1 bit | 2 bits | 3 bits | Number of slots k |
| '0' | '00' | '000' | $1^{st}$ value provided by dl-DataToUL-ACK, dl-DataToUL-ACK-r16, or dl-DataToUL-ACKForDCIFormat1_2 |
| '1' | '01' | '001' | $2^{nd}$ value provided by dl-DataToUL-ACK, dl-DataToUL-ACK-r16, or dl-DataToUL-ACKForDCIFormat1_2 |

TABLE (4)-continued

| PDSCH-to-HARQ_feedback timing indicator | | | |
|---|---|---|---|
| 1 bit | 2 bits | 3 bits | Number of slots k |
| | '10' | '010' | $3^{rd}$ value provided by dl-DataToUL-ACK, dl-DataToUL-ACK-r16, or dl-DataToUL-ACKForDCIFormat1_2 |
| | '11' | '011' | $4^{th}$ value provided by dl-DataToUL-ACK, dl-DataToUL-ACK-r16, or dl-DataToUL-ACKForDCIFormat1_2 |
| | | '100' | $5^{th}$ value provided by dl-DataToUL-ACK, dl-DataToUL-ACK-r16, or dl-DataToUL-ACKForDCIFormat1_2 |
| | | '101' | $6^{th}$ value provided by dl-DataToUL-ACK, dl-DataToUL-ACK-r16, or dl-DataToUL-ACKForDCIFormat1_2 |
| | | '110' | $7^{th}$ value provided by dl-DataToUL-ACK, dl-DataToUL-ACK-r16, or dl-DataToUL-ACKForDCIFormat1_2 |
| | | '111' | $8^{th}$ value provided by dl-DataToUL-ACK, dl-DataToUL-ACK-r16, or dl-DataToUL-ACKForDCIFormat1_2 |

For a PUCCH transmission with HARQ-ACK information, a UE determines a PUCCH resource after determining a set of PUCCH resources for $o_{UCI}$ HARQ-ACK information bits, as described in clause 9.2.1. The PUCCH resource determination is based on a PUCCH resource indicator field [5, REF2], if present, in a last DCI format, among the DCI formats that have a value of a PDSCH-to-HARQ_feedback timing indicator field, if present, or a value of dl-DataToUL-ACK, or dl-DataToUL-ACK-r16, or dl-DataToUL-ACKForDCIFormat1_2, indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. For indexing DCI formats within a serving cell for a same PDCCH monitoring occasion, if the UE is not provided coresetPoolIndex or is provided coresetPoolIndex with value 0 for one or more first CORESETs and is provided coresetPoolIndex with value 1 for one or more second CORESETs on an active DL BWP of a serving cell, and with ackNackFeedbackMode=joint for the active UL BWP, detected DCI formats from PDCCH receptions in the first CORESETs are indexed prior to detected DCI formats from PDCCH receptions in the second CORESETs.

The PUCCH resource indicator field values map to values of a set of PUCCH resource indexes, as defined in Table (5) for a PUCCH resource indicator field of 3 bits, provided by resourceList for PUCCH resources from a set of PUCCH resources provided by PUCCH-ResourceSet with a maximum of eight PUCCH resources. If the PUCCH resource indicator field includes 1 bit or 2 bits, the values map to the first two values or the first four values, respectively, of Table (5). If the last DCI format does not include a PUCCH resource indicator field, the first value of Table (5) is used.

For the first set of PUCCH resources and when the size $R_{PUCCH}$ of resourceList is larger than eight, when a UE provides HARQ-ACK information in a PUCCH transmission in response to detecting a last DCI format in a PDSCH reception, among DCI formats with a value of the PDSCH-to-HARQ_feedback timing indicator field, if present, or a value of dl-DataToUL-ACK, or dl-DataToUL-ACK-r16, or dl-DataToUL-ACKForDCIFormat1_2, indicating a same slot for the PUCCH transmission, the UE determines a PUCCH resource with index $r_{PUCCH}$, $0 \leq r_{PUCCH} \leq R_{PUCCH} - 1$, as:

$$r_{PUCCH} = \begin{cases} \left\lfloor \frac{N_{CCE,p} \cdot \lceil R_{PUCCH}/8 \rceil}{N_{CCE,p}} \right\rfloor + \Delta_{PR1} \left\lceil \frac{R_{PUCCH}}{8} \right\rceil & \text{if } \Delta_{PR1} < R_{PUCCH} \bmod 8 \\ \left\lfloor \frac{N_{CCE,p} \cdot \lceil R_{PUCCH}/8 \rceil}{N_{CCE,p}} \right\rfloor + \Delta_{PR1} \left\lceil \frac{R_{PUCCH}}{8} \right\rceil + & \text{if } \Delta_{PR1} \geq R_{PUCCH} \bmod 8 \\ R_{PUCCH} \bmod 8 & \end{cases} \quad (3)$$

Here, $N_{CCE,p}$ is a number of CCEs in CORESET p of the PDCCH reception for the DCI format as described in clause 10.1, $N_{CCE,p}$ is the index of a first CCE for the PDCCH reception, and $\Delta_{PRI}$ is a value of the PUCCH resource indicator field in the DCI format. If the DCI format does not include a PUCCH resource indicator field, $\Delta_{PRI}=0$.

Table (5), below, describes mapping of PUCCH resource indication field values to a PUCCH resource in a PUCCH resource set with maximum 8 PUCCH resources.

TABLE (5)

| PUCCH resource indicator | | | |
|---|---|---|---|
| 1 bit | 2 bits | 3 bits | PUCCH resource |
| '0' | '00' | '000' | 1st PUCCH resource provided by pucch-ResourceId obtained from the 1st value of resourceList |
| '1' | '01' | '001' | 2nd PUCCH resource provided by pucch-ResourceId obtained from the 2nd value of resourceList |
| | '10' | '010' | 3rd PUCCH resource provided by pucch-ResourceId obtained from the 3rd value of resourceList |
| | '11' | '011' | 4th PUCCH resource provided by pucch-ResourceId obtained from the 4th value of resourceList |
| | | '100' | 5th PUCCH resource provided by pucch-ResourceId obtained from the 5th value of resourceList |
| | | '101' | 6th PUCCH resource provided by pucch-ResourceId obtained from the 6th value of resourceList |
| | | '110' | 7th PUCCH resource provided by pucch-ResourceId obtained from the 7th value of resourceList |
| | | '111' | 8th PUCCH resource provided by pucch-ResourceId obtained from the 8th value of resourceList |

If a UE determines a first resource for a PUCCH transmission with HARQ-ACK information corresponding only to a PDSCH reception without a corresponding PDCCH or detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE does not expect to multiplex HARQ-ACK information corresponding to the second DCI format in a PUCCH resource in the slot if the PDCCH reception that includes the second DCI format is not earlier than $N_3 \cdot (2048+144) \cdot \kappa \cdot 2^{-\mu} \cdot T_c$ from the beginning of a first symbol of the first resource for PUCCH transmission in the slot where, κ and $T_c$ are defined in clause 4.1 of [REF1] and μ corresponds to the smallest SCS configuration among the SCS configurations of the PDCCHs providing the DCI formats and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for μ=0, $N_3=4.5$ for μ=1, $N_3=9$ for μ=2; otherwise, $N_3=8$ for μ=0, $N_3=10$ for μ=1, $N_3=20$ for μ=3.

If a UE is not provided SPS-PUCCH-AN-List and transmits HARQ-ACK information corresponding only to a PDSCH reception without a corresponding PDCCH, a PUCCH resource for corresponding PUCCH transmission with HARQ-ACK information is provided by n1PUCCH-AN.

Throughout this present disclosure, embodiments are described in terms of multiple PDSCHs or multiple PUSCHs that are jointly scheduled on multiple serving cells, such as a subset/set of cells from among one or more sets of co-scheduled cells.

The embodiments are generic and can apply to various other scenarios such as when a UE is jointly scheduled to receive/transmit multiple PDSCHs/PUSCHs: (i) from/to multiple transmission-reception points (TRPs) or other communication entities, such as multiple distributed units (DUs) or multiple remote radio heads (RRHs) and so on, for example, in a distributed MIMO operation, wherein TRPs/DUs/RRHs can be associated with one or more cells; (ii) in multiple time units, such as multiple slots or multiple transmission time intervals (TTIs); (iii) on multiple BWPs associated with one or more cells/carriers/TRPs, including multiple BWPs of a single serving cell/carrier for a UE with a capability of reception/transmission on multiple active BWPs; (iv) on one or more TRPs/cells, wherein the UE can receive/transmit more than one PDSCH/PUSCH on each co-scheduled TRP/cell; (v) for multiple transport blocks (TBs), or for multiple codewords (CWs) corresponding to single TB or multiple TBs; or (iv) for multiple semi-persistently scheduled PDSCHs (SPS PDSCHs) or for multiple configured grant PUSCHs (CG PUSCHs) that are jointly activated on one or multiple TRPs/cells.

Accordingly, any reference to "co-scheduled cells" can be replaced with/by "co-scheduled TRPs/DUs/RRHs", or "co-scheduled slots/TTIs", or "co-scheduled BWPs", or "co-scheduled PDSCHs/PUSCHs", or "co-scheduled TBs/CWs", or "co-scheduled SPS-PDSCHs/CG-PUSCHs", and so on. Similar for other related terms, such as "multi-cell scheduling", and so on.

Various embodiments provide reception of multiple PDSCHs or transmission of multiple PUSCHs on respective cells, including carriers of a same cell such as on an UL carrier (also referred to as, a normal UL (NUL) carrier) or a supplemental UL (SUL) carrier. The embodiments also apply to cases where scheduling is for a mixture of PDSCHs and PUSCHs. For example, the UE can receive first PDSCHs on respective first cells and can transmit second PUSCHs on respective second cells, wherein the first PDSCHs and the second PUSCHs are jointly scheduled.

Throughout the disclosure, the phrase "a UE configured with multi-cell scheduling" refers to a UE that is configured joint scheduling for at least one set of co-scheduled cells.

Throughout the disclosure, the phrase "scheduled PDSCH" refers to a PDSCH that is scheduled/indicated by a DCI format, regardless of whether the PDSCH is received or not yet.

The following embodiments of the present disclosure, describe multi-cell scheduling operation. This is described in the following examples and embodiments.

A UE can be provided a number of sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described in embodiments, described below. Additionally, the UE can be indicated via a DCI format in a PDCCH or via a MAC CE in a PDSCH a subset of a set of co-scheduled cells, wherein cells of the subset can change across different PDCCH monitoring occasions, for example, as indicated by a corresponding DCI format.

In one example, multi-cell scheduling can also include operations related to DL/UL transmissions such as reporting HARQ-ACK information, beam/CSI measurement or reporting, transmission or reception of UL/DL reference signals, and so on.

In one example, the UE can be configured by higher layers, such as by a UE-specific RRC configuration, a number of sets of co-scheduled cells. For example, the UE can be configured a first set of cells, such as {cell #0, cell #1, cell #4, cell #7} and a second set {cell #2, cell #3, cell #5, cell #6}. The multiple sets of co-scheduled cells can be scheduled from a same scheduling cell or from different scheduling cells.

In one example, a set of co-scheduled cells can include a primary cell (PCell/PSCell) and one or more SCells. In another example, a set of co-scheduled cells can include only SCells. In one example, a scheduling cell can belong to a set of co-scheduled cells. In another example, the UE does not expect that a scheduling cell belongs to a set of co-scheduled cells.

In one example, per specifications of the system operation, a set of co-scheduled cells is defined as a set that includes all scheduled cells having a same scheduling cell, and additional higher layer configuration is not required for indication of the set of co-scheduled cells. Accordingly, a DCI format for multi-cell scheduling, or other complementary methods, can jointly schedule any number of scheduled cells that have a same scheduling cell.

In another example, a set of co-scheduled cells can have two or more scheduling cells. For example, a UE can receive a DCI format for scheduling multiple co-scheduled cells on a first scheduling cell in a first PDCCH monitoring occasion, or on a second scheduling cell in a second PDCCH monitoring occasion. The DCI format can be associated with any search space set or can be restricted to be associated with USS sets. For example, the DCI format can be associated with multicast scheduling and have CRC scrambled by a group-RNTI (G-RNTI) and PDCCH candidates monitored according to common search space (CSS) sets or can be associated with unicast scheduling and have CRC scrambled by a C-RNTI and PDCCH candidates monitored according to USS sets. Such PDCCH monitoring from two scheduling cells can be simultaneous, for example in a same span of symbol or in a same slot, or can be non-overlapping, such as in different slots (per higher layer configuration, or per indication in a PDCCH or via a MAC CE). The UE may or may not expect that both the first scheduling cell and the second scheduling cell can schedule, through PDCCH transmissions in a same time interval such as a span or a slot, transmissions or receptions on a same cell. The UE can also monitor PDCCH for detection of a DCI format providing scheduling only on one cell from the set of co-scheduled cells (single-cell scheduling DCI format).

A UE can report one or more of: a maximum number of sets of co-scheduled cells, or a maximum number of cells within a set of co-scheduled cells, or a maximum total number of co-scheduled cells across different sets, or a maximum number of co-scheduled cells per PDCCH monitoring occasion, as capability to the gNB. In one example, that capability can depend on an operating frequency band or on a frequency range such as above or below 6 GHz.

Multi-cell scheduling can be an optional UE feature with capability signaling that can additionally be separate for PDSCH receptions and for PUSCH transmissions. For example, a UE can report a capability for a maximum number of {2, 4, 8, 16} co-scheduled cells for the DL and a maximum of {2, 4} co-scheduled cells for the UL.

A UE (such as the UE 116) can also be configured a number of cells that do not belong to any of set of co-scheduled cells. For example, the UE can be configured a cell #8 that does not belong to either the first set or the second set of co-scheduled cells in the previous example.

In one example, restrictions can apply for co-scheduled cells and a UE can expect that co-scheduled cells in a corresponding set: (i) have a same numerology (SCS configuration and CP); or (ii) have a same numerology for respective active DL/UL BWPs; or (iii) have a same duplex configuration, for example, all cells have frequency division duplexing (FDD) configuration or all cells have time division duplexing (TDD) configuration and, in case of a TDD configuration, also have a same UL-DL configuration; or (iv) are within a same frequency band (intra-band CA).

A serving cell (such as BS 102) can belong only to a single set of co-scheduled cells so that the sets of co-scheduled cells do not include any common cell or can belong to multiple sets of co-scheduled cells to enable larger scheduling flexibility to a serving gNB. For example, a serving cell can belong to a first set of co-scheduled cells and to a second set of co-scheduled cells, when cells in the first and second sets of co-scheduled cells have a common feature such as a common numerology, duplex configuration, operating frequency band/range, and so on. Also, a serving cell can belong to both a first set of co-scheduled cells and to a second set of co-scheduled cells, when the serving cell has a first common feature with cells in the first set of co-scheduled cells and a second common feature with cells in the second set of co-scheduled cells, wherein the first common feature can be different from the second common feature.

In a first approach, a UE expects to be provided multi-cell scheduling for all cells in a set of co-scheduled cells. For example, for a first set of co-scheduled cells including cells {cell #0, cell #1, cell #4, cell #7}, a DCI format schedules PDSCH receptions or PUSCH transmissions on all four cells in the first set of co-scheduled cells {cell #0, cell #1, cell #4, cell #7}.

In another approach, the UE can be provided multi-cell scheduling for a subset of a set of co-scheduled cells. For example, a DCI format can schedule PDSCH receptions or PUSCH transmissions on only two cells, such as {cell #0, cell #4}, from the first set of cells.

For example, the subset of cells can be indicated by a MAC CE. Such a MAC CE command can include one or more of: an indication for activation or deactivation/release of a subset of cells; an indication for a number of sets of co-scheduled cells; or an indication for a number of subsets of co-scheduled cells from a corresponding number of sets of co-scheduled cells.

For example, a MAC CE activates a first subset of a set of co-scheduled cells and subsequent DCI format(s) for multi-cell scheduling apply to the first subset of cells activated by the MAC CE. The UE can receive another MAC CE command that deactivates the first subset of co-scheduled cells, or activates a second subset of co-scheduled cells, wherein the second subset can be a subset of the same set of co-scheduled cells or a subset of a different set of co-scheduled cells. If a UE receives a MAC CE that deactivates the first subset of co-scheduled cells, but does not activate a second subset of co-scheduled cells, in one alternative, the UE does not expect to receive a DCI format for multi-cell scheduling, and the UE may not monitor PDCCH according to respective search space sets, until the UE receives a new MAC CE that activates a second subset of co-scheduled cells. In another alternative, the UE can receive DCI format(s) for multi-cell scheduling even before receiving a new MAC CE that activates a second subset of co-scheduled cells, but the UE expects to be provided an indication for a subset of co-scheduled cells by the DCI format(s), or by using complementary methods, such as those described in embodiments herein, for multi-cell scheduling.

For example, the subset of the set of co-scheduled cells can be provided by a DCI format in a PDCCH/PDSCH. The subset of cells can change between PDCCH monitoring occasions (MOs) for PDSCH/PUSCH scheduling as indicated by a corresponding DCI format. For example, a first DCI format in a first PDCCH MO indicates scheduling on a first subset of cells, while a second DCI format in a second PDCCH MO indicates scheduling on a second subset of cells.

In one example, a DCI format for multi-cell scheduling provides an index for a subset of cells that are co-scheduled such as a CIF value that corresponds to a subset of one or more cells from a set of co-scheduled cells. For example, UE-specific RRC signaling can indicate first/second/third/fourth indexes and corresponding first/second/third/fourth subsets that include one or more cells from a set of co-scheduled cells, wherein a subset can also include all cells from the set of co-scheduled cells. Then, a CIF field of 2 bits in a DCI format can provide a value that indicates the subset of scheduled cells.

In another example, a DCI format can include a 1-bit flag field to indicate whether the DCI format is for single-cell scheduling or for multi-cell scheduling in order for a UE to accordingly interpret fields of the DCI format that may also include the CIF field. Then, for single-cell scheduling, the CIF field can be interpreted as in case of single-cell cross-carrier scheduling while for multi-cell scheduling the CIF field can be interpreted as indicating a subset from the set of co-scheduled cells.

In another example, a DCI format for multi-cell scheduling provides a number of co-scheduled cells, and the indexes of the co-scheduled cells are provided by additional methods, such as by an additional DCI format (or an additional part/stage of a same DCI format) or by higher layer signaling as described in herein.

In another example, a CIF field in a DCI format for multi-cell scheduling can be a bitmap mapping to the individual cells or subsets of cells from the set of co-scheduled cells. When the DCI format is applicable to all cells in the set of co-scheduled cells, the DCI format may not include a CIF.

For example, a UE can implicitly determine indexes for co-scheduled cells without need for explicit gNB indication. For example, the UE can determine indexes for co-scheduled cells based on a PDCCH monitoring parameter, such as: (i) a CORESET index; or (ii) a search space set index, or a carrier indicator parameter n_CI corresponding to the search space set index; or (iii) a set of CCEs in the search space set or a first/last CCE in the search space set. It is noted that the UE received a PDCCH providing the DCI format for multi-cell scheduling.

Herein, the UE can be configured a mapping among values for PDCCH monitoring parameters, such as search space sets, and a number of co-scheduled cells or indexes of the co-scheduled cells. In one example, first and second values for parameter n_CI in a search space set can respectively indicate first and second subsets of co-scheduled cells. According to this example, the parameter n_CI can correspond to a single cell or can correspond to a group of cells, such as a subset/set of co-scheduled cells.

Receptions or transmissions on a respective subset of cells that are jointly scheduled by a single DCI format, or by using complementary methods such as those described herein, can refer to PDSCHs or PUSCHs that may or may not overlap in time. For example, the UE can be indicated to receive PDSCHs or to transmit PUSCHs on respective co-scheduled cells wherein all receptions/transmissions are in a same slot or at least one reception/transmission is in a different slot than the remaining ones.

A UE that is configured for multi-cell scheduling can be provided a first set of cell-common parameters whose values apply for scheduling on all co-scheduled cells, and a second set of cell-specific parameters whose values apply for scheduling on each corresponding co-scheduled cell. The UE can determine cell-common and cell-specific scheduling information parameters based on the specifications of the system operation or based on higher layer configuration. For some cell-specific scheduling information parameters, the UE can be provided differential values compared to a reference value wherein the reference value can correspond, for example, to a first scheduled cell from a set of scheduled cells.

For a UE that is configured a number of sets of co-scheduled cells, a DCI format for multi-cell scheduling can provide complete or partial information for cell-common or cell-specific scheduling parameters, for multiple PDSCH receptions or multiple PUSCH transmissions on respective multiple co-scheduled cells. When the DCI format for multi-cell scheduling provides partial information for a scheduling parameter, the UE can determine remaining information from UE-specific RRC signaling or by other complementary methods.

The following embodiments of the present disclosure describe various mechanisms for multi-cell scheduling. This is described in the following examples and embodiments.

The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format, or by a dedicated CORESET and associated search space sets.

For a UE (such as the UE 116) that is configured a set of co-scheduled cells, a DCI format for multi-cell scheduling can provide full or partial information for values of cell-common and cell-specific fields for scheduling PDSCH receptions or PUSCH transmissions on respective two or more cells from the set of co-scheduled cells. When the DCI format provides partial information, the UE can determine remaining information from RRC signaling or by using other complementary methods.

In one approach, referred to as concatenated DCI format for multi-cell scheduling, a DCI format for multi-cell scheduling can provide separate values of fields for each of the multiple co-scheduled cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This approach can be beneficial, for example, for co-scheduling cells that have different channel characteristics or configurations, such as for inter-band CA operation, or for co-scheduling a PDSCH reception and a PUSCH transmission.

In another approach, referred to as multi-cell scheduling via multi-cell mapping, a UE can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values for respective cells that are applied to a reference value indicated by the DCI format. For example, the field can be an MCS field wherein a value indicated in the DCI format can be for a PDSCH reception on a first cell and a value for a PDSCH reception on a second cell can be determined from the first value and a configured offset value. This approach can be beneficial, for example, for co-scheduling cells that have several similar physical channel characteristics or configurations, such as for intra-band CA operation.

In another approach, referred to as single-cell DCI pointing to a PDSCH with multi-cell scheduling, a UE can be provided information for multi-cell scheduling using a single-cell scheduling DCI format, namely a DCI format that schedules a first PDSCH on a first cell, wherein the first PDSCH includes scheduling information for reception of second PDSCH(s) or transmission of second PUSCH(s) on a subset from one or more sets of co-scheduled cells. This approach can be beneficial, for example, for co-scheduling several (such as 4-8) cells that have different channel characteristics or configurations, such as for inter-band CA operation.

For example, the first PDSCH includes a MAC CE that provides scheduling information for the number of PDSCH(s) or PUSCH(s). Accordingly, the MAC CE can include a number of modified DCIs (M-DCIs), wherein each M-DCI includes full or partial scheduling information for a PDSCH/PUSCH from the number of PDSCH(s)/PUSCH(s).

For example, multi-cell scheduling information is multiplexed as M-DCI in a PDSCH. The UE receives a first PDSCH that is scheduled by a single-cell scheduling DCI format, and the UE receives additional scheduling information for one or more PDSCH(s)/PUSCH(s) on one or more respective co-scheduled cell(s). The UE allocates the coded modulation symbols for M-DCIs to time/frequency resources within the first PDSCH, for example in a frequency-first, time-second manner, except for reserved resources corresponding to reference signals or other cell-level broadcast transmissions. The UE can start receiving the M-DCIs in a first symbol of the first PDSCH, or in a first symbol after first symbols with DM-RS REs, in the first PDSCH. The M-DCIs can be jointly coded and include a single CRC.

For example, physical layer processing of M-DCI(s) that are included in the first PDSCH can be same as that for a DCI in a PDCCH, such as for the DCI scheduling the first PDSCH, or can be same as that for data information/transport block in the first PDSCH. Herein, physical layer processing refers to, for example, modulation, coding, scrambling, and so on. In addition, the UE can determine a number of coded modulation symbols corresponding to multi-scheduling information, such as M-DCIs, that are multiplexed in a first PDSCH scheduled by a single-cell scheduling DCI format, based on a scaling factor $\beta_{offset}^{PDSCH}=\beta_{offset}^{M-DCI}$ applied to a total (coded) payload size for the M-DCIs. Such scaling factor determines an effective channel coding rate of M-DCIs multiplexed on the first PDSCH, for flexible link adaptation and improved reliability of the M-DCIs according to physical channel conditions.

In another, referred to as multi-stage PDCCHs/DCIs for multi-cell scheduling, a UE can be provided information for multi-cell scheduling of multiple PDSCHs/PDCCHs on multiple respective cells using a multi-stage DCI method, such as a 2-stage DCI wherein a first-stage DCI format includes a set of cell-common fields, and a second-stage DCI format includes cell-specific fields. The UE receives the first-stage DCI format in a first PDCCH and the second-stage DCI format in a second PDCCH. This approach can be beneficial, for example, for co-scheduling several cells that have several common physical characteristics, such as a time-domain resource allocation or a frequency-domain resource allocation, without incurring latency and without having a DCI format size that is too large (that would result if the first-stage and second-stage DCI formats were combined into a single DCI format) for receiving cell-specific parameters when the second PDCCH is received in a same slot as the first PDCCH. The first-stage DCI format can also indicate a location for a PDCCH providing the second-stage DCI format, such as a PDCCH candidate for a corresponding CCE aggregation level, so that the UE can interpret the contents of the second-stage DCI format or reduce a number of PDCCH receptions. A UE can determine an association among a number of linked multi-stage PDCCHs/DCIs, such as two PDCCHs/DCIs, that provide multi-cell scheduling information based on parameters of the linked DCI formats, such as size(s) of the DCI format(s), or RNTI(s) associated with the DCI format(s), or by an explicit indication in some field(s) in the DCI format(s), or based on PDCCH monitoring parameters, such as CORESET, search space, CCEs, or monitoring occasions in which the UE receives the first and the second linked PDCCHs.

The following embodiments of the present disclosure describe PDCCH monitoring for multi-cell scheduling. This is described in the following examples and embodiments.

The UE (such as the UE 116) can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format, or by a dedicated CORESET and associated search space sets. There can be two cases for monitoring a DCI format for multi-cell scheduling: a first case based on search space set(s) dedicated to multi-cell scheduling, and a second case based on search space set(s) shared by both single-cell scheduling and multi-cells scheduling.

In one embodiment, a search space set for multi-cell scheduling is associated only with DCI format(s) for multi-cell scheduling on a set of co-scheduled cells. Such search space sets can correspond to a set-level n_CI value, which can be separate from n_CI values corresponding to search space sets for single-cell scheduling. By monitoring the search space set, the UE can detect a DCI format for scheduling on all scheduled cells or only a subset of scheduled cells from the set of co-scheduled cells. Accordingly, the detected DCI format can include a CIF value that is same as or different from an n_CI value corresponding to the search space set for multi-cell scheduling. The search space set can be commonly configured, thereby linked, on the scheduling cell and on all scheduled cells from the set of co-scheduled cells. The UE can monitor the search space set for multi-cell scheduling when linked search spaces sets on the scheduling cell and at least one scheduled cell from the set co-scheduled cells is configured on corresponding active DL BWPs of the scheduling cell and the at least one scheduled cell.

In another embodiment, a search space set for multi-cell scheduling is associated with DCI format(s) both for multi-cell scheduling on a set of co-scheduled cells and for single cell scheduling on a first scheduled cell from the set of co-scheduled cells. Such search space sets correspond to an existing cell-level n_CI value corresponding to the first scheduled cell. By monitoring the search space set, the UE can detect a DCI format for single-cell scheduling on the first scheduled cell with a CIF value that is same as the n_CI value corresponding to the first scheduled cell, or can detect a DCI format for multi-cell scheduling on all scheduled cells or only a subset of scheduled cells from the set of co-scheduled cells, with a set-level CIF value that is different from the n_CI value corresponding to the first scheduled cell. The search space set is commonly configured, thereby linked, on the scheduling cell and only the first scheduled cell, and the UE monitors the linked search space sets when both are configured on active DL BWPs of the scheduling cell and the first scheduled cell.

The following embodiments of the present disclosure describe general provisions for HARQ-ACK codebook for multi-cell scheduling. This is described in the following examples and embodiments.

A UE (such as the UE 116) configured with multi-cell scheduling for a set of co-scheduled cells expects that all cells in the set of co-scheduled cells belong to a same PUCCH group, and also that the UE is provided configuration for a HARQ-ACK codebook, such as Type-1 or Type-2 or Type-3 codebook. HARQ codebook generation for multi-cell scheduling can depend on configuration of a set of K1 values provided for each cell for multi-cell scheduling. The UE can be provided a dedicated K1 configuration for multi-cell scheduling for a set of co-scheduled cells, or the UE can implicitly determine a K1 configuration for multi-cell scheduling based on intersection (or union) of corresponding configurations for single cell scheduling among the set of co-scheduled cells. A value of K1 can be with respect to an SCS configuration of a corresponding cell with PUCCH configuration (such as the PCell).

When a UE (such as the UE 116) is configured two or multiple PUCCH groups, and the UE is also configured with a set of co-scheduled cells, the UE expects that all serving cells in the set of co-scheduled cells belong to a same PUCCH group. For example, if a UE is configured a PUCCH-SCell, and a corresponding secondary PUCCH group, the UE expects that all serving cells in a configured set of co-scheduled cells belong to either the primary PUCCH group or the secondary PUCCH group, and not both. In another example, if a UE is configured a master cell group (MCG) and a secondary cell group (SCG), the UE expects that all serving cells in a configured set of co-scheduled cells belong to either the MCG or the SCG (that is, only one cell group), and not both.

A UE (such as the UE 116) configured with multi-cell scheduling expects to be configured a HARQ-ACK codebook, for example using a parameter 'pdsch-HARQ-ACK-Codebook'. The HARQ-ACK CB can be, for example, one of Type-1 CB, also referred to as semi-static CB, or Type-2 CB, also referred to as dynamic CB, or enhanced Type-2 CB, also referred to as enhanced dynamic CB, or a Type-3 CB, and so on, as described in TS 38.213 v16.5.0. Accordingly, the UE does not expect to provide/report separate HARQ-ACK feedback for each PDSCH from a number of co-scheduled PDSCHs on a set/subset of co-scheduled cells.

The UE multiplexes HARQ-ACK feedback information corresponding to the number of co-scheduled PDSCH receptions on a set/subset of co-scheduled cells, based on a HARQ-ACK codebook configuration, and transmits a PUCCH with the HARQ-ACK CB in a same PUCCH resource, or multiplexes the HARQ-ACK CB in a same PUSCH transmission.

In one realization, a UE can generate different HARQ-ACK CBs for MC-DCI and SC-DCI formats. For example, the UE can generate a Type-2 HARQ-ACK CB for MC-DCI formats (for example, DAI is set by single scheduler), and generate a Type-1 HARQ-ACK CB for SC-DCI formats (for example, for self-scheduling). For example, the UE can be provided two separate RRC parameters or two values for an RRC parameter, such as 'pdsch-HARQ-ACK-Codebook', with a first parameter/value corresponding to HARQ-ACK codebook Type for SC-DCI formats and with a second parameter/value corresponding to HARQ-ACK codebook Type for MC-DCI formats. In one example, if the UE does not receive any S-DCI, or if it receives one S-DCI and the fallback conditions for single A/N bit hold, the UE provides HARQ-ACK based on Type-2. In another example, if the UE receives more than one S-DCI (or the fallback conditions do not hold), it provides HARQ-ACK based on Type-1.

In one example, a UE configured with multi-cell scheduling can provide HARQ-ACK information for a first number of co-scheduled cells in a first PUCCH using a first PUCCH resource and provide HARQ-ACK information feedback for a second number of co-scheduled cells in a second PUCCH using a second PUCCH resource, wherein the first and second numbers of co-scheduled cells are indicated/scheduled by a same DCI format. This can be beneficial, for example, for reducing latency of HARQ retransmission for co-scheduled cells.

In one example, a UE does not expect to be configured priority levels for HARQ-ACK information corresponding to sets of co-scheduled cells. In another example, a UE expect to be configured a same priority level for HARQ-ACK information corresponding to different sets of co-scheduled cells. In yet another example, a UE can be configured a first priority level for HARQ-ACK information corresponding to a first set of co-scheduled cells, and a second priority level for HARQ-ACK information corresponding to a second set of co-scheduled cells. For example, the UE does not expect to be configured different priority levels for HARQ-ACK information corresponding to different cells in a same set of co-scheduled cells.

In one realization, a UE can be configured: (i) a first group/number of serving cell that are configured with single-cell scheduling only, and (ii) a second group/number of serving cells that are configured with multi-cell scheduling only, and (iii) a third group/number of serving cells that are configured with both single-cell scheduling and multi-cell scheduling.

At least one of the first and second and third groups/numbers of serving cells is non-empty. In one example, the second group of serving cells can be empty, so that any serving cell can be configured with single-cell scheduling, while some other serving cells (from the third group) can be additionally configured with multi-cell scheduling.

In one example, the UE expects that a serving cell with multi-cell scheduling is included in only one configured set of co-scheduled cells. Therefore, the UE does not expect to be configured multiple overlapping sets of co-scheduled cells. Accordingly, the UE determines only one TDRA/K0/K1 configuration (for HARQ-ACK codebook generation) for a serving cell with multi-cell scheduling configuration, as described next. In another example, a serving cell with multi-cell scheduling can be included in multiple configured sets of co-scheduled cells.

In one example, a UE can receive a first DCI format for multi-cell scheduling in a first PDCCH monitoring occasion that indicates joint scheduling for a first subset from the configured set of co-scheduled cells, and receive a second DCI format for multi-cell scheduling in a second PDCCH monitoring occasion that indicates joint scheduling for a second subset from the (same) configured set of co-scheduled cells, wherein the first subset and the second subset can be separate, but potentially with non-empty overlap. In another example, a UE can receive a first DCI format for multi-cell scheduling in a first PDCCH monitoring occasion that indicates joint scheduling for a first configured set of co-scheduled cells, and receive a second DCI format for multi-cell scheduling in a second PDCCH monitoring occasion that indicates joint scheduling for a second configured set of co-scheduled cells, wherein the first and second sets of co-scheduled cells can be separate.

In one example, a DCI format for multi-cell scheduling can indicate scheduling on only a single serving cell. In one example, single-cell scheduling is provided as a fallback operation for any serving cell that is configured with multi-cell scheduling, without any explicit configuration for single-cell scheduling.

HARQ-ACK codebook generation for multi-cell scheduling can depend on configuration of a TDRA table, a set of K0 values, and/or a set of K1 values provided for multi-cell scheduling. Various methods for configuration of TDRA/K0/K1 for multi-cell scheduling is provided below, and potential relationships with corresponding configurations for single-cell scheduling are also provided.

In one example, a serving cell that belongs to a set of co-scheduled cells, can be configured a first TDRA table (including a first set of K0 values) or a first set of K1 values for single-cell scheduling, and a second TDRA table (including a second set of K0 values) or a second set of K1 values for multi-cell scheduling, wherein the first TDRA/K0/K1 configuration can be separate from the second TDRA/K0/K1 configuration. In one example, a set of PDSCH or HARQ time (K1) values is independent of a scheduling DCI, such as a DCI format for single-cell scheduling or a DCI format for multi-cell scheduling. For example, the UE is configured a set of K1 values (for example, as part of PUCCH configuration) that are applicable to any downlink DCI format scheduling one or more PDSCHs on one or more cells.

For example, the UE expects that first TDRA tables or a set of K1 values for multi-cell scheduling are same as corresponding ones for multi-cell scheduling. For example, the UE expects that the first TDRA tables or the set of K1 values for multi-cell scheduling on a set of co-scheduled cells are subsets of corresponding ones for single-cell scheduling on each cell from the set of co-scheduled cells. For example, a subset of a first TDRA table can refer to a number of rows/entries of the first TDRA table. For example, the UE can determine the second TDRA table to include rows/entries that are common/same among first TDRA tables.

In one example, a set of K1 values are specific to a DCI format. For example, the UE receives a first set of K1 values for a first DCI format and a second set of K1 values for a second DCI formats. For example, the UE can be provided first sets of K1 values for single-cell scheduling DCI (SC-DCI) formats and a second set of K1 values for multi-cell scheduling DCI (MC-DCI) formats. In one example, the second set of K1 values for multi-cell scheduling can be same as the first sets of K1 values for single-cell scheduling, such as a union of the first sets of K1 values among different SC-DCI formats configured for cells from the set of co-scheduled cells. For example, the second set of K1 values for multi-cell scheduling can be a subset of the first sets of K1 values for single-cell scheduling, such as a subset of a union of the first sets of K1 values among different SC-DCI formats configured for cells from the set of co-scheduled cells.

In another example, when a UE is configured a first set and a second set of co-scheduled cells, and a serving cell belongs to both the first set and the second set, the serving cell can be associated with a first TDRA table/K0 set/K1 set corresponding to the first set of co-scheduled cells, and a second TDRA table/K0 set/K1 set corresponding to the second set of co-scheduled cells. Such configurations are beneficial, for example, in order to improve scheduling flexibility. In one example, a set of K1 values can be common to the first and second sets of co-scheduled cells, and different TDRA tables or K0 values can be configured for a same cell when configured to be scheduled with different (for example, first and second) multi-cell scheduling DCI formats corresponding to different (for example, first and second) sets of co-scheduled cells.

In another example, the TDRA/K0/K1 configuration can be simplified, for example, in order to reduce UE complexity. In one realization, a UE can be configured a same TDRA table/K0 set/K1 set for a serving cell, regardless of whether the UE belongs to a single set or multiple sets of co-scheduled cells. For example, the UE uses a same TDRA table/K0 set/K1 set for multi-cell scheduling DCI formats that the UE uses for single-cell scheduling DCI formats. In another realization, all cells within a same set of co-scheduled cells can be configured a same TDRA table/K0 set/K1 set. For example, the UE expects that co-scheduled PDSCHs start in a same slot, with respect to slots/SCS for a corresponding cell with PUCCH configuration. For example, the UE expects that co-scheduled cells have a same SCS and a same CP. For example, the UE expects that co-scheduled PDSCHs have a same K0 value. For example, the UE can be provided separate TDRA table/K0 set/K1 set for single-cell scheduling of cells in a set of co-scheduled cells, and provided a different TDRA table/K0 set/K1 set for multi-cell scheduling on the set of co-scheduled cells that is commonly applied to cells within the set of co-scheduled cells. For example, the UE expects to be provided a same/identical TDRA table/K0 set/K1 set that is applicable to both single-cell scheduling and multi-cell scheduling for all cells within a same set of co-scheduled cells. In a further realization, all cells with multi-cell scheduling configuration, regardless of whether they belong to a same set or different sets of co-scheduled cells, are configured a same TDRA table/K0 set/K1 set.

In yet another example, the UE is not provided any dedicated configuration for TDRA table/K0 set/K1 set for the case of multi-cell scheduling. Instead, the UE determines an applicable configuration for TDRA table/K0 set/K1 set for multi-cell scheduling based on the corresponding configuration for single-cell scheduling. For example, the UE determines a TDRA table/K0 set/K1 set for multi-cell scheduling on a set of co-scheduled cells based on intersection or union of all TDRA tables/K0 sets/K1 sets for single-cell scheduling corresponding to all serving cells that belong to the set of co-scheduled cells. According to these examples, and when the intersection operation is used, the UE determines that entries of TDRA tables or K0 values or K1 values, configured for a cell from a set of co-scheduled cells, that do not belong to the intersection of TDRA tables/K0 sets/K1 sets, are used only for single-cell scheduling for the corresponding cell. For example, the UE determines an applicable set of K0 values for multi-cell scheduling for a set of co-scheduled cells as the intersection of sets of K0 values corresponding to cells in the set of co-scheduled cells. For example, the UE determines applicable TDRA configuration for multi-cell scheduling for the set of co-scheduled cells to include entries from TDRA tables corresponding to single-cell scheduling, wherein the entries are shared for cells in a set of co-scheduled cells (that is, same K0, SLIV, and PDSCH mapping type values), in same or different rows index in corresponding TDRA tables. For example, the UE determines applicable TDRA configuration for multi-cell scheduling for the set of co-scheduled cells to include entries from TDRA tables corresponding to single-cell scheduling, wherein a K0 value for the entry is included the applicable set of K0 values for multi-cell scheduling (that is, the K0 value is shared by TDRA tables for single-cell scheduling for cells in the set of co-scheduled cells, and the SLIV or PDSCH mapping type can be same/shared or different for the cells). For example, when an entry of a TDRA table for single-cell scheduling for a cell in the set of co-scheduled cells does not belong to such intersection, the UE applies such entry only for single-cell scheduling and does not expect to receive indication of such entry in a multi-cell scheduling DCI format. For example, the UE can receive separate TDRA fields for co-scheduled cells. For example, a second TDRA table for multi-cell scheduling/MC-DCI formats on a set of co-scheduled cells can be an intersection of first TDRA tables for single-cell scheduling/SC-DCI formats among cells from the set of co-scheduled cells.

For example, if K1={0, 1, 2, 3} for a first cell and K1={1, 2, 3, 4} for a second cell, then the UE considers: (i) K1=0 is used only for single-cell scheduling of the first cell; and (ii) K1=4 is only for single-cell scheduling of the second cell; and (iii) K1={1,2,3} can be used for both single-cell scheduling and multi-cell scheduling on the first cell and the second cell. Similar example can be used for K0 values.

In one example, a TDRA field in a DCI format for multi-cell scheduling can be a cell-common field that commonly applies to all co-scheduled cells by the DCI format. Such TDRA field will point to an entry in a TDRA table, wherein the entry includes a K0 value, an SLIV, and an indication for a PDSCH mapping type, which applies commonly to all co-scheduled PDSCHs on the set/subset of co-scheduled cells. Herein, the TDRA table is a TDRA table for multi-cell scheduling that the UE determines based on one of the methods described above.

In one example, when all co-scheduled cells have a common/same SCS, the K0 value determined from the TDRA field of the DCI format for multi-cell scheduling applies commonly to all co-scheduled PDSCHSs based on the common SCS value.

In another example, when the co-scheduled cells have different SCSs, the UE applies the K0 value for each PDSCH on each serving cell from the set of co-scheduled cells based on: (i) an SCS configuration of an active DL/UL BWP of corresponding serving cell, or (ii) a largest (or smallest) SCS configuration among (corresponding active DL/UL BWPs of) the set/subset of co-scheduled cells, or (iii) an SCS configuration of an active DL/UL BWP of a corresponding scheduling cell, or (iv) an SCS configuration provided by higher layers, such as one provided with the TDRA table, or (v) a predetermined SCS configuration, such as 30 kHz for FR1, and 120 kHz for FR2.

For example, assuming the method in the first bullet point above is used, if a DCI format jointly schedules PDSCHs on a first cell with SCS=15 kHz and a second cell with SCS=30 kHz, and the DCI format indicates K0=1, the UE determines a slot for a first PDSCH on the first cell with an offset equal to 1 slot w.r.t. SCS=15 kHz, and a slot for a second PDSCH on the second cell with an offset equal to 1 slot w.r.t. SCS=30 kHz, wherein the offsets are w.r.t. a slot where the multi-cell scheduling DCI format ends.

In one example, a TDRA field in a DCI format for multi-cell scheduling can be based on a "multi-cell mapping" to provide cell-specific TDRA for each of the co-scheduled cells. For example, a TDRA table for multi-cell scheduling on a set of M serving cells can include a number of entries, wherein each entry includes a number of up to M sets of K0/SLIV/mapping types corresponding to the set of M serving cells. For each PDSCH from the co-scheduled PDSCHs on a serving cell from the set of co-scheduled cells, the UE applies the set of K0/SLIV/mapping type corresponding to the serving cell, from the number of sets of K0/SLIV/mapping types that is included in the TDRA entry which is indicated by the DCI format for multi-cell scheduling. According to this example, each K0 value provided for each serving cell from the set of co-scheduled cells is w.r.t. an SCS configuration of the corresponding serving cell. For example, a joint multi-cell TDRA table can include TDRA configuration for all cells with multi-cell scheduling configuration (associated with a same scheduling cell), that is, any cell that is included in at least one configured set of co-scheduled cells. For example, each entry of a joint multi-cell TDRA table can include a number of up to $M\_co,max$ sets of K0/SLIV/mapping types, wherein each set of K0/SLIV/mapping type corresponds to a cell with multi-cell scheduling configuration. When a multi-cell scheduling DCI (MC-DCI) format indicates/schedules a set of co-scheduled cells including M serving cells, and a TDRA field in the MC-DCI format indicates an index of a row in the joint multi-cell TDRA table, the UE applies M sets of K0/SLIV/mapping types, from the $M\_co,max$ sets of K0/SLIV/mapping types provided in the TDRA table, that correspond to the M serving cells.

When a DCI format for multi-cell scheduling is a two-stage DCI format with a $2^{nd}$-stage DCI provided by a PDSCH or PDCCH, as described herein, the UE determines K0 relative to a $2^{nd}$-stage DCI, at least for any PDSCHs whose scheduling information is at least partially provided by the $2^{nd}$-stage DCI. Accordingly, the UE determines a slot for a PDSCH from co-scheduled PDSCHs to be a slot that is K0 slots from/after a last slot that includes the $2^{nd}$-stage DCI format, wherein the UE determines the K0 value and an SCS configuration for determination of K0 slots based on one of the various methods described in the previous examples. In one example, if scheduling information for a first PDSCH from a set of co-scheduled PDSCHs is fully provided in a $1^{st}$-stage DCI, the UE determines a slot for the first PDSCH to be a slot that is K0 slots from/after a last slot that includes the $1^{st}$-stage DCI format, wherein the UE determines the K0 value and an SCS configuration for determination of K0 slots based on one of the various methods described in the previous examples. For example, the first PDSCH can be a PDSCH in which the $2^{nd}$-stage DCI is multiplexed.

In one realization, when a UE is configured with multi-cell scheduling, the UE expects to be provided a single PUCCH resource for transmitting a PUCCH with HARQ-ACK information corresponding to co-scheduled PDSCHs on a set of co-scheduled cells.

In one example, a PDSCH-to-HARQ_feedback timing indicator field (K1) in a DCI format for multi-cell scheduling is with respect to a corresponding cell with PUCCH configuration (such as the PCell). For example, the UE determines K1 based on an SCS configuration of the corresponding cell with PUCCH configuration (such as the PCell). According to this example, a K1 timing for transmitting a PUCCH with HARQ-ACK information is relative to a last DL slot of a last PDSCH from co-scheduled PDSCHs on a set/subset of co-scheduled cells, w.r.t. a slot/SCS for the cell with PUCCH configuration (such as the PCell). Herein, the last PDSCH can refer to a PDSCH that: (i) starts or ends in a latest slot/symbol, among the co-scheduled PDSCHs, w.r.t. the SCS for the PUCCH cell (such as the PCell), or (ii) corresponds to a cell, among the co-scheduled cells, with a largest cell index or largest CIF (or a smallest cell index or CIF), or (iii) corresponds to a cell, among the co-scheduled cells, with a largest (or smallest) SCS, or (iv) corresponds to a cell, among the co-scheduled cells, that is indicated last in the DCI format for multi-cell scheduling, if the DCI format includes an ordered indication for the set of co-scheduled cells.

Supporting K1 relative to a last scheduled or received PDSCH can be beneficial, for example, when the co-scheduled PDSCHs can start in different slots (for example, due to different K0 values) or when the co-scheduled cells have different SCSs. For example, K1 can be relative to a last received PDSCH from co-scheduled cells, therefore, when the UE does not receive a last scheduled PDSCH from the co-scheduled cells (for example, due to collision with UL symbols or slots) and the UE receives a second last scheduled PDSCH from the co-scheduled PDSCHs, the UE determines the K1 value relative to the second last scheduled PDSCH (which is the last received PDSCH). In another example, the UE determines the K1 value relative a last scheduled PDSCHs from co-scheduled PDSCHs, even if the UE does not receive the last scheduled PDSCH (for example, due to collision with UL symbols or slots). Similar methods and example are provided for other options to determine the reference PDSCH for PUCCH timing determination. For example, when K1 timing is relative a PDSCH with largest index cell, the UE can determine such PDSCH only among the received PDSCHs (so discard a scheduled PDSCH on a cell with largest cell index that is not received, and provide a PDSCH on another cell with second largest cell index that is received), or the UE can determine such PDSCH among co-scheduled cell, regardless of whether the UE received the PDSCH on the cell with largest cell index or not.

In another example, a K1 field in a DCI format for multi-cell scheduling can provide a cell-common value that applies commonly to all co-scheduled cells. Therefore, the UE applies a same K1 value to each PDSCH from the co-scheduled PDSCHs, wherein the K1 value is w.r.t. the SCS of the cell with PUCCH configuration (such as the PCell). Such operation can be beneficial, for example, when all co-scheduled PDSCHs start in a same slot (for example, due to same K0 value), and all co-scheduled cells have a same SCS.

In one example, K1 can start from the last DL slot (of a corresponding PDSCH) that overlaps with a PUCCH slot (that corresponds to K1=0). For Type-2 HARQ-ACK CB, K1 is always w.r.t. PCell (cell of PUCCH). If there is a second stage DCI in a PDSCH, the K1 values of those DCIs can be w.r.t. the overlapping slot of the PCell for the PDSCH reception.

In one realization, a UE with multi-cell scheduling configuration can be provided with a single value for each of TDRA, K1, and PRI parameters, but the UE interprets the fields separately for each cell from the set of co-scheduled cells, that is, a cell-specific interpretation. For example, based on a single/same indication for TDRA/K0/K1/PRI, the UE determines a first TDRA/K0 value for a first PDSCH with a corresponding HARQ-ACK feedback to be provided using a first PUCCH in a first PUCCH resource and with a slot timing based on a first K1, while the UE determines a second TDRA/K0 value for a second PDSCH with a corresponding HARQ-ACK feedback to be provided using a second PUCCH in a second PUCCH resource and with a slot timing based on a second K1. Herein, the first and second values for each of the corresponding TDRA/K0/K1/PRI parameters can be different. Such UE behavior can be realized, for example, based on corresponding configurations for single-cell scheduling, that is, without need for any dedicated configuration(s) for multi-cell scheduling. Construction of Type-1 HARQ-ACK codebooks for such a scenario can follow procedure applied to each PDSCH from co-scheduled PDSCHs on the set of co-scheduled cells as described in TS 38.213 v16.5.0.

In various realizations, the following options are provided for determination of a TDRA table for multi-cell scheduling on a number of sets of co-scheduled cells: in a first option, the UE is provided first TDRA tables only for single-cell scheduling, and the UE determines second TDRA table(s) for multi-cell scheduling to be same as the first TDRA tables. For example, all TDRA tables from the first TDRA tables can be identical/same, or different TDRA tables from the first TDRA tables can be different. For example, a TDRA field in an MC-DCI format can include a single value that is commonly applicable to all co-scheduled cells. In a second option, the UE is provided first TDRA tables only for single-cell scheduling, and the UE determines second TDRA table(s) for multi-cell scheduling based on the first TDRA tables. For example, second TDRA table(s) can be union or intersection of the first TDRA tables. For example, second TDRA table(s) can include rows/entries from the first TDRA tables that have a same K0 value among cells from the set of co-scheduled cells. For example, a TDRA field in an MC-DCI format can include a single value that is commonly applicable to all co-scheduled cells or can include multiple values that are applied separately for the co-scheduled cells. In a third option, the UE can be provided first TDRA tables for single-cell scheduling for each cell from a set of co-scheduled cells, and the UE can be also provided a single second TDRA table for multi-cell scheduling that is commonly applicable to all cells from the set of co-scheduled cells, and can be separate from the first TDRA tables. For example, a TDRA field in an MC-DCI format can include a single value that is commonly applicable to all co-scheduled cells. For example, different TDRA tables can be provided for different sets of co-scheduled cells, wherein each of the different TDRA tables applies commonly to all cells a corresponding set of co-scheduled cells. In a fourth option, the UE can be provided first TDRA tables for single-cell scheduling and also separately provided multiple TDRA tables for multi-cell scheduling for cells from a set of co-scheduled cells. For example, the UE can be provided, for a given cell from the set of co-scheduled cells, two TDRA tables including a TDRA tables from the first TDRA tables for single-cell scheduling using SC-DCI formats, and another TDRA table from the second TDRA tables for multi-cell scheduling using MC-DCI formats. For example, an MC-DCI format can include multiple TDRA fields/values that are applied separately for the co-scheduled cells. In a fifth option, the UE can be provided first TDRA tables for single-cell scheduling for cells from a set of co-scheduled cells, and can be also provided multiple second TDRA tables corresponding to cells from the set of co-scheduled cells, wherein the UE operates, for multi-cell scheduling with a same row index from the second TDRA tables. For example, an MC-DCI format can include a single TDRA field/value that is commonly applied for cells from the co-scheduled cells, wherein the TDRA value points, for each cell from the set of co-scheduled cells, to a same row from each of the multiple second TDRA tables. For example, the multiple second TDRA tables can be provided separately. For example, the multiple second TDRA tables can be provided jointly, such as by a joint multi-cell TDRA table that include, for each row, multiple columns/entries corresponding to multiple cells from the set of co-scheduled cells. For example, the UE can be provided a single reference TDRA table for multi-cell scheduling, along with multiple K0 values (or K0 offset value) for the multiple co-scheduled cells. Accordingly, the UE can determine multiple second TDRA tables for multi-cell scheduling on the multiple co-scheduled cells by applying the corresponding K0 values (or K0 offset value) to the single reference TDRA table. When a cell belongs to multiple sets of co-scheduled cells, the UE can apply (or expects) a same TDRA for multi-cell scheduling for the cell, regardless of the different sets of co-scheduled cells, or the UE can be provided different TDRA tables for multi-cell scheduling for the cell, corresponding to the different sets of co-scheduled cells.

The following embodiments of the present disclosure describe enhancements to Type-2 (dynamic) HARQ-ACK codebook for multi-cell scheduling. This is described in the following examples and embodiments.

For a UE (such as the UE 116) configured with multi-cell scheduling, the UE can generate (and then append) a same Type-2 HARQ-ACK codebook for both single-cell scheduling and multi-cell scheduling or can generate separate Type-2 sub-codebooks corresponding to each of single-cell scheduling and multi-cell scheduling. The UE determines to generate a same Type-2 CB or separate Type-2 CBs based on the specifications for system operation or based on network configuration. The design of DL DAI in a downlink DCI format for multi-cell scheduling (and in some examples, also for DCI formats for single-cell scheduling), as well as UL DAI in uplink DCI formats (for single-cell scheduling or for multi-cell scheduling) can be different based on whether the UE generates same or separate Type-2 CBs for single-cell scheduling and multi-cell scheduling. For example, a DAI in the DCI format for multi-cell PDSCH scheduling can be cell-common among co-scheduled cells (that is, per DCI), or can be cell-specific among co-scheduled cells (that is, per PDSCH from co-scheduled PDSCHs).

In one example, the specifications for system operation support only one method for Type-2 CB generation, such as a same Type-2 CB for both single-cell scheduling and multi-cell scheduling. In another example, the specifications for system operation supports both methods, namely, a same Type-2 CB and separate Type-2 sub-CBs. Then, the UE determines which method to use based on: (i) predetermined conditions provided in the specifications for system operation, such as: using a same Type-2 CB when a configured set of co-scheduled cells is of size ≤4 (or a size provided by higher layers), and using separate Type-2 sub-CBs when a configured set of co-scheduled cells is of size>4; or using a same Type-2 CB when a configured DCI format for multi-cell scheduling is a two-stage DCI format, and using separate Type-2 sub-CBs when a configured DCI format for multi-cell scheduling has only one stage; or (ii) higher layer configuration, that can be commonly provided for all sets of co-scheduled cells, or can be provided separately for each set of co-scheduled cells.

A list of example methods for Type-2 HARQ-ACK codebook is provided below.

One example method for Type-2 HARQ-ACK codebook, referred to as Method 1, is based on same CB for single-cell scheduling and multi-cell scheduling, and with DAI in DL DCI formats counted per DCI.

Another example method for Type-2 HARQ-ACK codebook, referred to as Method 2, uses a same CB for single-cell scheduling and multi-cell scheduling, and with DAI in DL DCI formats counted per DCI, and "multi-cell" HARQ bundling.

Another example method for Type-2 HARQ-ACK codebook, referred to as Method 3, uses a same CB for single-cell scheduling and multi-cell scheduling, with DAI in DL DCI formats counted per PDSCH.

Another example method for Type-2 HARQ-ACK codebook, referred to as Method 4, uses separate sub-CBs for single-cell scheduling and multi-cell scheduling, with DAI in DL DCI formats counted per PDSCH.

Another example method for Type-2 HARQ-ACK codebook, referred to as Method 5, uses separate sub-CBs for single-cell scheduling and multi-cell scheduling, with DAI in DL DCI formats counted per DCI.

In another method, the UE accumulates/processes a DAI per group of scheduled PDSCHs, wherein the UE can be provided a configuration for a number of groups or a number of scheduled PDSCHs in a group.

The UE procedure for generation of a same Type-2 CBs (based on method 3 above) is described herein, and the UE procedure for generation of separate Type-2 CBs (based on methods 4 and 5 above) is described herein. Handling of CBG operation in presence of multi-cell scheduling is described herein.

A brief comparison of methods 3, 4, and 5 is provided in Table (6).

TABLE (6)

|  | Method 3 | Method 4 | Method 5 |
| --- | --- | --- | --- |
| CB(s) for single-cell and multi-cell scheduling | Same | Separate | Separate |
| DL DAI | Per PDSCH | Per PDSCH | Per DCI |
| Size of DL DAI | Increased by $\lceil \log_2 N_{max,\,mc} \rceil$ bits | Increased by $\lceil \log_2 N_{max,\,mc} \rceil$ bits | Same as legacy |
| Impact on DCI for single-cell scheduling | Increased by $\lceil \log_2 N_{max,\,mc} \rceil$ bits | Same as legacy | Same as legacy |

A selection, if applicable, among the three above methods can be based on, for example, requirements or target values for UCI size versus DCI size, and UE complexity aspects, such as the "3+1" budget for DCI format sizes, in view of different sizes of DL and UL DCI formats according to these three methods, and possibly the specification impact.

In one example, serving cells can be configured in subsets and multi-cell PDSCH scheduling can be per sub-set. Then, a UE procedure for HARQ-ACK CB generation, such as for Type-2 CB, applies with "cell" is replaced by "subset of cells".

A UE determines monitoring occasions for PDCCH with a DCI format scheduling PDSCH receptions or SPS PDSCH release or indicating SCell dormancy on an active DL BWP of a serving cell c, as described in clause 10.1 of [REF3], and for which the UE transmits HARQ-ACK information in a same PUCCH in slot n based on (i) PDSCH-to-HARQ_feedback timing indicator field values for PUCCH transmission with HARQ-ACK information in slot n in response to PDSCH receptions, SPS PDSCH release or SCell dormancy indication and (ii) slot offsets $K_0$, as described in [REF4], provided by time domain resource assignment field in a DCI format scheduling PDSCH receptions and by pdsch-AggregationFactor, or pdsch-AggregationFactor-r16, or repetitionNumber, when provided.

The set of PDCCH monitoring occasions for a DCI format scheduling PDSCH receptions or SPS PDSCH release or indicating SCell dormancy is defined as the union of PDCCH monitoring occasions across active DL BWPs of configured serving cells. PDCCH monitoring occasions are indexed in an ascending order of their start times. The cardinality of the set of PDCCH monitoring occasions defines a total number M of PDCCH monitoring occasions.

In the following embodiments for Type-2 CB generation in presence of multi-cell scheduling, with regards to a number of HARQ-ACK feedback information bits (ACK or NACK), the following options can be provided.

In a first option, the UE expects a same configuration for generation of HARQ-ACK information bits for any cell with multi-cell configuration. For example, for serving cells with multi-cell configuration, the UE expects to be provided a same configuration for parameters such as: (i) maxNrofCodeWordsScheduledByDCI, and/or (ii) harq-ACK-SpatialBundlingPUCCH, and/or (iii) harq-ACK-SpatialBundlingPUSCH, regardless of whether the serving cells belong to a same set or different sets of co-scheduled cells. For example, the UE generates M=N HARQ-ACK information bits, when all serving cells are configured one TB per PDSCH or all serving cells are configured with two TBs per PDSCH and with spatial bundling. For example, the UE generates M=2N HARQ-ACK information bits, when all serving cells are configured two TBs per PDSCH and are not configured with spatial bundling. Herein, N refers to a number of actually co-scheduled PDSCHs/cells, as in embodiments herein, or refers to a size $N_{max,mc}$ of a largest (possible) set of co-scheduled cells, as in embodiments herein. This option can be beneficial, for example, to ensure that redundant bits are avoided in a corresponding Type-2 CB, and therefore, a size of the Type-2 CB for a UE with multi-cell scheduling configuration is reduced.

In a second option, the UE can be provided different configurations for generation of HARQ-ACK information bits for different cells with multi-cell configuration, such as different configuration for parameters maxNrofCodeWordsScheduledByDCI, or harq-ACK-SpatialBundlingPUCCH, or harq-ACK-SpatialBundlingPUSCH. According to this option, the UE generates the HARQ-ACK information bits based on a configuration that leads to a largest size for a Type-2 CB.

For example, the UE generates $M_{max,mc}$=2N HARQ-ACK information bits (that is, 2N ACK/NACK values) corresponding to a DCI format for multi-cell scheduling when the UE is configured by maxNrofCodeWordsScheduledByDCI with reception of two transport blocks in at least one configured DL BWP of a serving cell (with multi-cell scheduling configuration). Herein, N refers to a number of actually co-scheduled PDSCHs/cells, as in embodiments herein, or refers to a size $N_{max,mc}$ of a largest (possible) set of co-scheduled cells, as in embodiments herein. In another example, the UE generates M HARQ-ACK information bits (that is, M ACK/NACK values), wherein M is a total number of TBs (without spatial bundling) configured for PDSCH receptions across all cells in a set of co-scheduled cells. For example, the set of cells can include first and second cells, wherein the first cell is configured with one TB and the second cell is configured with two TBs, and the UE is not configured spatial bundling for the second cell. For example, the UE can provide 2*2=4 bits of HARQ-ACK information for first and second PDSCHs on the set of co-scheduled cells. In another example, the UE can provide 1+2=3 bits of HARQ-ACK information for first and second PDSCHs on the set of co-scheduled cells. For example, the UE can determine the total configured number of TBs (without spatial bundling) for each configured set of co-scheduled cells, and then determine a number of $M_{max,mc}$ bits for the HARQ-ACK information by taking a maximum over all sets of co-scheduled cells.

In another example, the UE generates N HARQ-ACK feedback information bits (that is, N ACK/NACK values) corresponding to a DCI format for multi-cell scheduling when: (i) the UE is configured by maxNrofCodeWordsScheduledByDCI with reception of only one transport block in all configured DL BWPs of all serving cells (with multi-cell scheduling configuration); or (ii) the UE is configured by harq-ACK-SpatialBundlingPUCCH or harq-ACK-SpatialBundlingPUSCH with spatial HARQ bundling in all configured DL BWPs of all serving cells (with multi-cell scheduling configuration).

Herein, N is defined as above.

In a further example, the UE generates one HARQ-ACK information bits (that is, one ACK/NACK value) corresponding to a DCI format for multi-cell scheduling when the UE is configured by parameters such as harq-ACK-MultiCellBundlingPUCCH or harq-ACK-MultiCellBundlingPUSCH with "multi-cell" HARQ-ACK bundling in all configured DL BWPs of all serving cells with multi-cell scheduling configuration. Herein, multi-cell HARQ-ACK bundling refers to performing logical 'AND' operation on HARQ-ACK values corresponding to co-scheduled PDSCHs on a set/subset of co-scheduled cells.

The following embodiments of the present disclosure describe generating a same Type-2 CB for single-cell scheduling and multi-cell scheduling (assuming no CBG configuration for any cell). This is described in the following examples and embodiments, such as those of FIG. 6.

Figure 6:
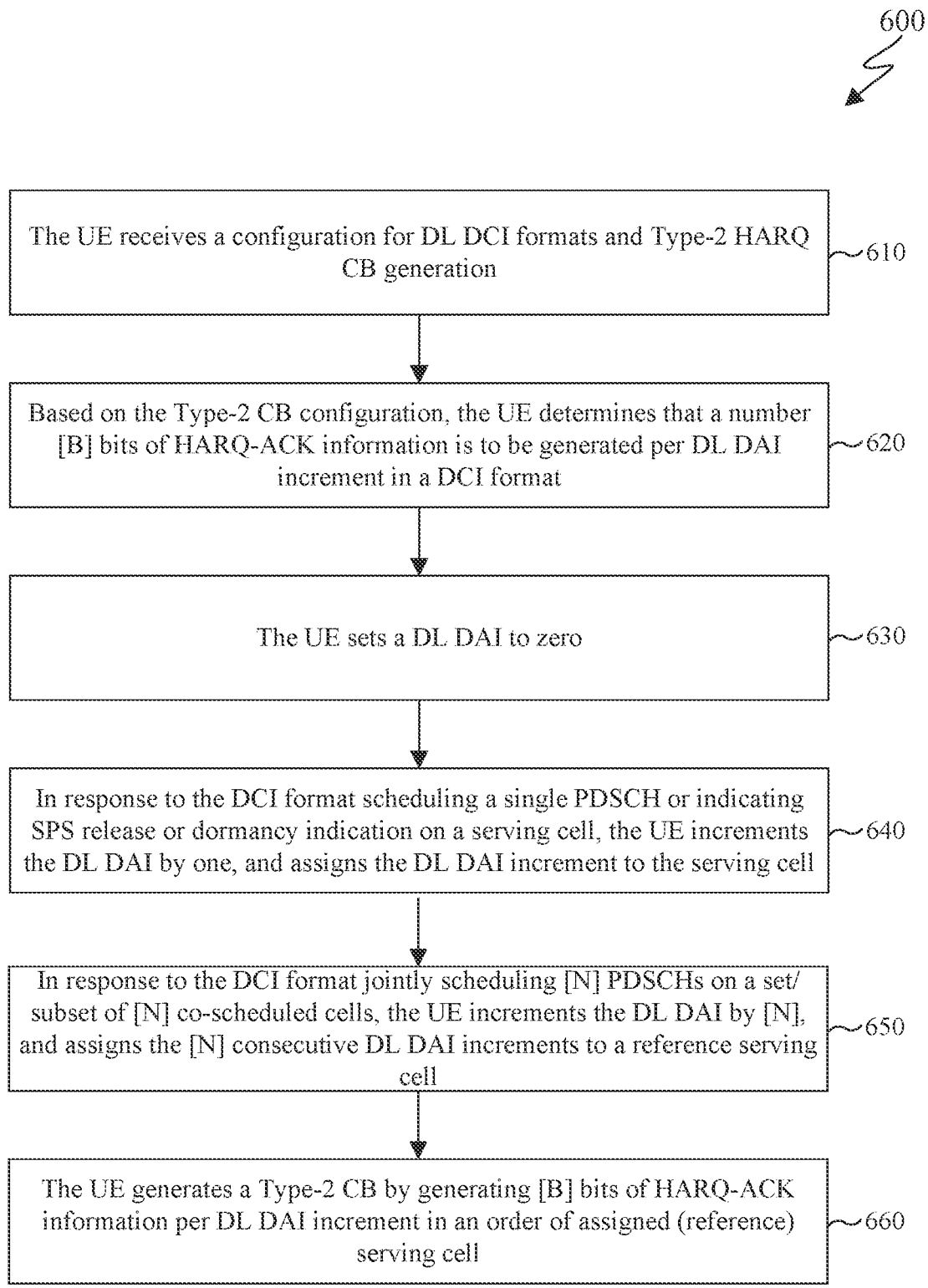
FIG. 6 illustrates an example method for generating a same Type-2 HARQ-ACK CB for both single-cell scheduling and multi-cell scheduling according to embodiments of the present disclosure.

FIG. 6 illustrates an example method 600 for generating a same Type-2 HARQ-ACK CB for both single-cell scheduling and multi-cell scheduling according to embodiments of the present disclosure. The steps of the method 600 of FIG. 6 can be performed by any of the UEs 111-116 of FIG. 1, such as the UE 116 of FIG. 3. The method 600 is for illustration only and other embodiments can be used without departing from the scope of the present disclosure.

For a UE configured with multi-cell scheduling and not configured CBG-based PDSCH reception for any serving cells in a corresponding PUCCH group, when the UE generates a same Type-2 CB corresponding to both single-cell scheduling and multi-cell scheduling, the UE is provided DL DAI field(s) in DL DCI formats, including a DCI format for multi-cell scheduling of PDSCHs, that is counted per scheduled PDSCH. DL DAI fields can include counter DAI (c-DAI) and total DAI (t-DAI). The UE generates the Type-2 HARQ-ACK codebook based on an ascending order of DAI, which is in turn based on an ascending order of PDSCHs. Various methods are provided for ordering co-scheduled PDSCHs, for example, based on corresponding cell index or CIF.

This method can be beneficial, for example, when a size of a set of co-scheduled cells is large (such as 4-8), and it is possible/likely that only few cells from a configured set of co-scheduled cells (or a configured set of co-scheduled cells with few cells) are indicated in a DCI format for multi-cell scheduling. Therefore, instead of a fixed size for a HARQ-ACK feedback report, such as 4-8 bits regardless of the actual number of co-scheduled cells, the UE provides HARQ-ACK feedback for an exact number of actually co-scheduled cells.

Impact on DL counter DAI:

The UE determines a value of counter DAI in a DCI format for single-cell scheduling as described in [REF3], since the DCI format scheduled only one PDSCH.

In order for DL DAI to accommodate counting of PDSCHs (instead of counting DCI formats) in case of DCI formats for multi-cell scheduling, an update is needed for definition of DL DAI, as provided in the following.

The UE determines a value of counter DAI in a DCI format for multi-cell scheduling based on a number of actually co-scheduled PDSCHs. For example, if a configured set of co-scheduled cells includes 4 cells, and a DCI format for multi-cell scheduling indicates only 2 PDSCHs on 2 cells out of the 4 cells, the counter DAI value is increased by 2.

When a UE receives a DCI format for multi-cell scheduling of a number N co-scheduled PDSCHs, and when counter DAI is incremented based on a number of PDSCHs (instead of DCI formats), the UE expects that a number N of counter DAI values corresponding to the N co-scheduled PDSCHs are consecutive values. This can be beneficial for Type-2 HARQ-ACK codebook generation, for example, when missing a DCI for multi-cell scheduling, since such design would prevent any interaction among DAI values in different DL DCI formats.

The UE can determine a number N consecutive counter DAI values (for example, N=2 DAI values in the previous example) corresponding to a number N co-scheduled PDSCHs indicated in a DCI format for multi-cell scheduling, by receiving: (i) in a first method, a number N of counter DAI fields corresponding to the N co-scheduled PDSCHs; (ii) in a second method, only two counter DAI fields corresponding to a first PDSCH and a last PDSCH among the co-scheduled PDSCHs; (iii) in a third method, one counter DAI field corresponding to a last (or a first) PDSCH among the co-scheduled PDSCHs.

The last co-scheduled PDSCH is described earlier in embodiments herein. The first PDSCH can be first based on ordering of co-scheduled PDSCH/cells, such as those described in embodiments herein. For example, the first PDSCH can be a PDSCH with smallest cell index or smallest CIF or a PDSCH with smallest K0 or a PDSCH with an earliest starting or ending slot/symbol based on a reference SCS, among co-scheduled cells. In the third method, the UE determines the number N of consecutive counter DAI values based on an indication of a number of co-scheduled cells/PDSCHs in the DCI format for multi-cell scheduling.

Accordingly, when a UE is configured multi-cell scheduling, two issues need to be resolved regarding accumulation of counter DAI value in a DCI format for multi-cell scheduling. A first issue is that, in the definition of counter DAI as accumulative number of {serving cell, PDCCH monitoring occasion}-pair(s), to which serving cell a DCI for multi-cell scheduling should be assigned; that is, for example, when a first DCI format for multi-cell scheduling indicates co-scheduled PDSCHs on serving cells #1 and #3, and a second DCI format for single-cell scheduling indicates a PDSCH on serving cell #2, and the UE receives the first and second DCI formats in a same/simultaneous PDCCH monitoring occasion or slot; for instance, in the example above, the UE can assign the DCI format and corresponding DAI value(s) for multi-cell scheduling to cell #1 (that is, the cell with the smallest cells index). For example, when assigning DAI per PDSCH, the UE can determine counter DAI values m and m+1 for the two co-scheduled PDSCHs on the serving cells #1 and #3 (and assign counter DAI value m+2 for the PDSCH on the serving cell #2). Alternatively, the UE can assign the DCI format for multi-cell scheduling and corresponding DAI value(s) to cell #3 (that is, the cell with the largest cell index). For example, when assigning DAI per PDSCH, the UE can determine counter DAI values m+1 and m+2 for the two co-scheduled PDSCHs on the serving cells #1 and #3 and assign counter DAI value m for the PDSCH on the serving cell #2. A second issue is that, how the consecutive values of counter DAI corresponding to co-scheduled PDSCHs indicated by a DCI format for multi-cell scheduling should be ordered; that is, how to order co-scheduled PDSCHs indicated by a DCI format for multi-cell scheduling (and associate them with counter DAI values).

In a first approach, a solution to the first issue can be independent of a solution to the second issue, so that the UE assigns a DCI format for multi-cell scheduling to a reference cell which the UE determines irrespective of an ordering of co-scheduled PDSCHs. For example, the reference serving cell for assigning a counter DAI when a DCI format is for multi-cell scheduling, can be one of: (i) a scheduling cell corresponding to a set/subset of co-scheduled cells associated with the DCI format for multi-cell scheduling, or (ii) a serving cell with PUCCH configuration (such as the PCell) corresponding to the set/subset of co-scheduled cells, or (iii) a serving cell, among the set/subset of co-scheduled cells, and different from the corresponding scheduling cell, on which the UE monitors a PDCCH (for example, based on linked search space sets) and receives the DCI format for multi-cell scheduling.

Herein, the "set" of co-scheduled cells can refer to the RRC-configured set of co-scheduled cells, and the "subset" of co-scheduled cells can refer to the actually co-scheduled cells by the DCI format for multi-cell scheduling or can refer to another configured set of co-scheduled cells.

In a second approach, a solution to the first issue can be dependent on a solution to the second issue, so that the UE assigns a DCI format for multi-cell scheduling to a reference cell which can be a first (or last) serving cell according to an ordering of co-scheduled PDSCHs and corresponding co-scheduled cells.

An ordering of co-scheduled PDSCHs on a set/subset of co-scheduled cells can be: (i) in ascending order of serving cell indexes of the set/subset of co-scheduled cells; or (ii) in ascending order of CIF values of the set/subset of co-scheduled cells; or (iii) in ascending order of starting time or ending time for reception of co-scheduled PDSCHs, wherein, time can refer to a slot/symbol, with respect to (w.r.t.) a reference SCS (such as: an SCS configuration for a corresponding scheduling cell, or an SCS configuration for a corresponding PUCCH cell (such as the PCell), or a largest (or smallest) SCS configuration among the set/subset of co-scheduled cells); or (iv) in ascending order of SCS configurations of the set/subset of co-scheduled cells; or (v) in an ascending order (explicitly) provided in the DCI format; or (vi) a combination thereof (such as first in ascending order of SCS configuration, and then in ascending order of cell index/CIF).

Then, in the second approach, the reference cell, namely the first (or last) serving cell according to the ordering of co-scheduled PDSCHs and corresponding co-scheduled cells can be, for example, a serving cell, among the set/subset of co-scheduled cells: (i) with a smallest/largest serving cell index or smallest/largest CIF, or (ii) on which a PDSCH, from the co-scheduled PDSCHs, starts or ends in an earliest or latest slot/symbol, w.r.t. a reference SCS (such as: an SCS configuration for the corresponding scheduling cell, or an SCS configuration for the PUCCH cell (such as the PCell), or a largest (or smallest) SCS configuration among the set/subset of co-scheduled cells); (iii) with a largest (or smallest) SCS, or (iv) that is indicated first/last in the DCI format for multi-cell scheduling, if the DCI format includes an ordered indication for the set/subset of co-scheduled cells.

It is noted that, a UE needs an ordering of co-scheduled PDSCHs on a set/subset of co-scheduled cells to determine a placement of HARQ-ACK feedback information bits in a Type-2 HARQ-ACK codebook, regardless of whether the UE follows the first or second approach above.

The set of PDCCH monitoring occasions for a DCI format scheduling PDSCH receptions or SPS PDSCH release or indicating SCell dormancy is defined as the union of PDCCH monitoring occasions across active DL BWPs of configured serving cells. PDCCH monitoring occasions are indexed in an ascending order of their start times. The cardinality of the set of PDCCH monitoring occasions defines a total number M of PDCCH monitoring occasions.

In one example, a value of the counter downlink assignment (DAI) field in DCI formats denotes the accumulative number of {serving cell, PDCCH monitoring occasion}-pair(s) in which PDSCH reception(s), SPS PDSCH release or SCell dormancy indication associated with the DCI formats is present up to the current serving cell and current PDCCH monitoring occasion. First, if the UE indicates by type2-HARQ-ACK-Codebook support for more than one PDSCH reception on a serving cell that are scheduled from a same PDCCH monitoring occasion, in increasing order of the PDSCH reception starting time for the same {serving cell, PDCCH monitoring occasion} pair. Second in ascending order of serving cell index when a DCI format is for single-cell scheduling or SPS PDSCH release or SCell dormancy indication, and in ascending order of a reference serving cell when a DCI format is for multi-cell scheduling. Third in ascending order of PDCCH monitoring occasion index m, where 0≤m<M. Herein accumulation implies: (i) incrementing the value of counter DAI by one when a DCI format is for single-cell scheduling or SPS PDSCH release or SCell dormancy indication, and (ii) incrementing the value of counter DAI by a number of co-scheduled PDSCHs when a DCI format is for multi-cell scheduling.

The latter captures Method 3 above wherein a counter DAI value in a DCI format for multi-cell scheduling refers to a last PDSCH among co-scheduled PDSCHs.

In the above, a reference serving cell is as described in the first and second approaches above.

Ordering of HARQ-ACK Feedback Information Bits Corresponding to a DCI Format for Multi-Cell Scheduling Since a DCI format for multi-cell scheduling, with accumulation of DAI per scheduled PDSCH, triggers for example N or 2N or M (as discussed earlier) HARQ-ACK information bits that correspond to N co-scheduled PDSCHs on a set/subset of co-scheduled serving cells, the UE and the gNB need to share a same understanding on an ordering or placement of the N or 2N HARQ-ACK information bits in a Type-2 HARQ-ACK codebook.

The UE determines an ordering or placement of the N or 2N HARQ-ACK feedback information bits corresponding to the N co-scheduled PDSCHs on a set/subset of co-scheduled serving cells based on a same ordering that the UE uses for association of DAI values to the N co-scheduled PDSCHs. Various options for such an ordering were described above in the discussion for counter DAI.

Impact on DL Total DAI (t-DAI)

When a UE is configured multi-cell scheduling, and when the UE determines a counter DAI for co-scheduled PDSCHs indicated by a DCI format for multi-cell scheduling by accumulation of a number of PDSCHs (instead of DCI formats), the UE determines a value of total DAI by including a total number of scheduled PDSCHs across all serving cells in DCI formats received up to the current PDCCH monitoring occasion.

Accordingly, the value of the total DAI, when present, in a DCI format denotes the total number of {serving cell, PDCCH monitoring occasion}-pair(s) in which PDSCH reception(s), SPS PDSCH release or SCell dormancy indication associated with DCI formats is present, up to the current PDCCH monitoring occasion m and is updated from PDCCH monitoring occasion to PDCCH monitoring occasion, wherein a {serving cell, PDCCH monitoring occasion}-pair is counted: (i) once, when a DCI format for the serving cell in the PDCCH monitoring occasion is for single-cell scheduling or SPS PDSCH release or SCell dormancy indication, and (ii) N times, when a DCI format associated with the (reference) serving cell in the PDCCH monitoring occasion is for multi-cell scheduling of N co-scheduled PDSCHs on a set of co-scheduled cells.

Detection of Missed DCI

When a UE determines counter DAI values based on counting PDSCHs (instead of DCI formats), in order to ensure that a DCI format for multi-cell scheduling can provide a same reliability level for correct determination of HARQ-ACK codebook size as for single-cell scheduling, such as detecting up to 3 missed DCI formats, a size of a DAI field in a counter DCI format for multi-cell scheduling needs to increase compared to a size of counter DAI field in a DCI format for single-cell scheduling. When a UE is configured a parameter $N_{max,mc}$ for a maximum possible size of a set of co-scheduled cells, or when a UE determines $N_{max,mc}$ as a size of largest configured set(s) of co-scheduled cells, the UE expects to receive a counter DAI field with a size $2+\lceil \log_2 N_{max,mc} \rceil$ bits. For example, when $N_{max,mc}=8$, the UE expects to receive a counter DAI field with size 2+3=5 bits.

Accordingly, a size of a total DAI field in a DCI format for multi-cell scheduling also needs to increase based on a largest (possible) size $N_{max,mc}$ of configured set(s) of co-scheduled cells, in line with an increase in a size of a counter DAI field in the DCI format for multi-cell scheduling, and also to achieve a same reliability level for correct determination of HARQ-ACK codebook size compared to legacy UE, such as detecting up to 3 missed DCI formats. For example, a total DAI field can have a size of $2+\lceil \log_2 N_{max,mc} \rceil$ bits. For example, when $N_{max,mc}=8$, a total DAI field size is 2+3=5 bits.

Since values for counter DAI and total DAI are accumulated across different DCI formats for different serving cells, it is necessary that all DL DCI formats have a same size, in order for the UE to be able to determine missed DCIs. Therefore, for the case of a same Type-2 CB for both single-cell and multi-cell scheduling, the UE expects an increased size for both counter DAI and total DAI fields in all DL DCI formats for all serving cells.

Impact on UL DAI

When a UE is configured multi-cell scheduling, and when a UE multiplexes a same Type-2 HARQ-ACK codebook for single-cell scheduling and multi-cell scheduling on a PUSCH, the UE uses a value of total DAI in a DCI format that schedules the PUSCH (referred to as UL DAI), instead of a value of a DL total DAI in a last DL DCI format in a last PDCCH monitoring occasion that is associated with a slot in which the UE transmits the PUSCH with Type-2 CB (to determine $V_{temp2}$ in the pseudo-code in [REF3] for Type-2 CB).

In order to maintain a same reliability level for correct determination of HARQ-ACK codebook size compared to single-cell scheduling, such as detecting up to 3 missed DCI formats, and for consistency with counter DAI and total DAI fields in the DL DCI format for multi-cells scheduling, an UL total DAI field can have an increased size in an UL DCI format that includes a DAI field, compared to corresponding UL DCI format when multi-cell scheduling is not configured. Therefore, a total DAI field can have a size of $2+\lceil \log_2 N_{max,mc} \rceil$ bits. For example, when $N_{max,mc}=8$, an UL total DAI field has size of 2+3=5 bits.

When multiplexing HARQ-ACK feedback information on a PUSCH, the UE generates the Type-2 CB by determining parameter $V_{temp2}$ in a corresponding pseudo-code based on a value of an UL total DAI field, instead of a corresponding DL counter/total DAI.

The method 600, as illustrated in FIG. 6, describes an example method for generating a same Type-2 HARQ-ACK CB for both single-cell scheduling and multi-cell scheduling, wherein DL DAI accumulation is per scheduled PDSCH.

In step 610, a UE (such as the UE 116) receives a configuration for DL DCI formats and Type-2 HARQ CB generation. Based on the Type-2 CB configuration, the UE determines that a number [B] bits of HARQ-ACK information is to be generated per DL DAI increment in a DCI format (step 620). For example, the UE can determine [B]=1 or 2 based on configuration of maxNrofCodeWordsScheduledByDCI or based on spatial [or multi-cell] HARQ-ACK bundling. The UE sets a DL DAI to zero (Step 630). In response to the DCI format scheduling a single PDSCH or indicating SPS release or dormancy indication on a serving cell, the UE in step 640 increments the DL DAI by one and assigns the DL DAI increment to the serving cell. In response to the DCI format jointly scheduling [N] PDSCHs on a set/subset of [N] co-scheduled cells, the UE in step 650 increments the DL DAI by [N] and assigns the [N] consecutive DL DAI increments to a reference serving cell. Various options for defining a reference cell are described above. The UE generates a Type-2 CB by generating [B] bits of HARQ-ACK information per DL DAI increment in an order of assigned (reference) serving cell, (step 660).

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

The following embodiments of the present disclosure describe generating of separate Type-2 CBs for single-cell scheduling and multi-cell scheduling, with DAI counting per scheduled PDSCH (assuming no CBG configuration for any cell). This is described in the following examples and embodiments, such as those of FIG. 7.

Figure 7:
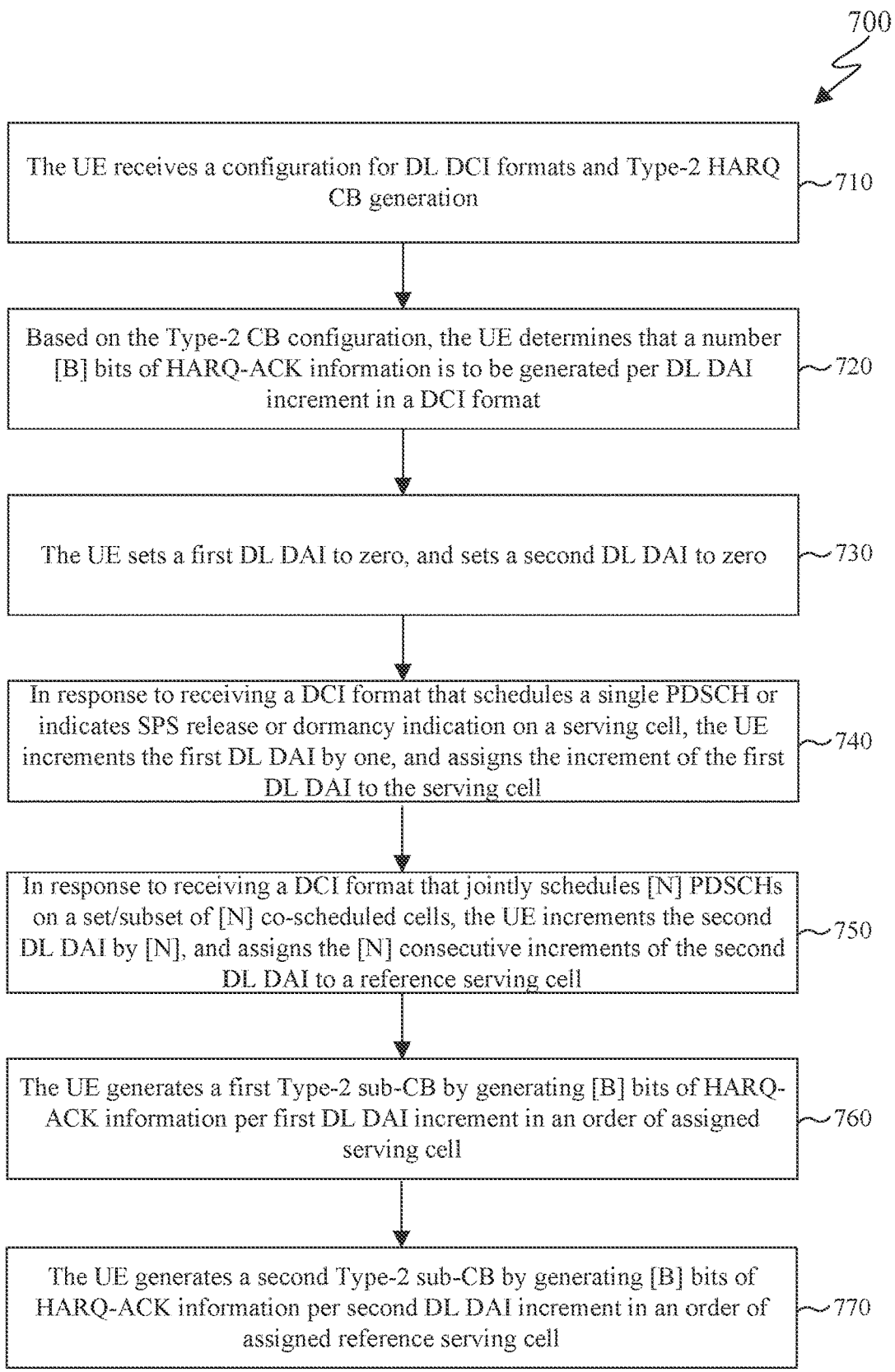
FIG. 7 illustrates an example method for generating separate Type-2 HARQ-ACK sub-CBs for single-cell scheduling and for multi-cell scheduling according to embodiments of the present disclosure.

FIG. 7 illustrates an example method 700 for generating separate Type-2 HARQ-ACK sub-CBs for single-cell scheduling and for multi-cell scheduling according to embodiments of the present disclosure. The steps of the method 700 of FIG. 7 can be performed by any of the UEs 111-116 of FIG. 1, such as the UE 116 of FIG. 3. The method 700 is for illustration only and other embodiments can be used without departing from the scope of the present disclosure.

For a UE configured with multi-cell scheduling and not configured CBG-based PDSCH reception for any serving cell in a corresponding PUCCH group, when the UE generates separate Type-2 sub-CBs corresponding to single-cell scheduling and multi-cell scheduling, the UE can be provided counter and total DL DAI fields in a DCI format for multi-cell scheduling of PDSCHs that count scheduled PDSCHs. Handling of DAI, such as increased size of DL/UL DAI fields and ordering of DL DAI values and corresponding HARQ-ACK information bits in the Type-2 CB, will be similar to the case of same Type-2 CB for both single-cell scheduling and multi-cell scheduling with DL DAI counting per scheduled PDSCH, as described herein. The difference is that DL DAI for multi-cell scheduling is (accumulated/processed) separate from DL DAI for single-cell scheduling, and a size of DL DAI fields in DL DCI formats for single-cell scheduling are not impacted. In addition, any UL DCI format will include two separate DAI fields or values, one field/value (2 bits) corresponding to the Type-2 sub-CB for single-cell scheduling, and another field with increased size (such as 5 bits) corresponding to the Type-2 sub-CB for multi-cell scheduling.

This method (Method 4) has two differences compared to the one or more methods described above, such as Method 3: Unlike the one or more methods described above, this method has no impact to size of DAI fields in DL DCI formats for single-cell scheduling, since separate DAIs are used for single-cell scheduling compared to multi-cell scheduling. A size of DAI field in UL DCI formats according to this method will be larger than that according to the one or methods described above. This is because, according to this method, the UL DAI field includes a first sub-field with 2 bits for single-cell scheduling, as well as a second sub-field with size $2+\lceil \log_2 N_{max,mc} \rceil$ bits for multi-cell scheduling.

Impact on Counter DAI in DL DCI Formats:

When a UE generates separate Type-2 sub-CBs for single-cell scheduling and multi-cell scheduling, the UE determines a first DL counter DAI corresponding to a first Type-2 sub-codebook, and a second DL counter DAI corresponding to a second Type-2 sub-codebook.

The UE determines a first total DAI as described in [REF3] for single-cell PDSCH scheduling, wherein the UE counts/accumulates a number of first DCI formats up to a current serving cell and a current PDCCH monitoring occasion, wherein the first DL DCI formats include: (i) DL DCI formats for single-cell PDSCH scheduling, and (ii) DL DCI formats for multi-cell PDSCH scheduling that indicate only a single PDSCH on a single serving cell from a corresponding set of co-scheduled cells, and (iii) DL DCI format(s) without scheduling information that require (a single-bit of) HARQ-ACK information, such as DCI format(s) for SPS release or for dormancy indication.

The UE determines a second counter DAI by counting/accumulating a number of scheduled PDSCHs up to a current reference serving cell, that are scheduled by second DL DCI formats up to a current PDCCH monitoring occasion, wherein the second DL DCI formats include: DL DCI formats for multi-cell scheduling that indicate more than one PDSCH on (one or) more than one cell from a corresponding set of co-scheduled cells.

A reference serving cell for co-scheduled PDSCHs is defined earlier.

In another variation, the first DL DCI formats exclude any DL DCI format for multi-cell scheduling, and the second DL DCI formats include all DL DCI formats for multi-cell scheduling (even if scheduling only one PDSCH on one cell).

A UE for determination of the second DL counter DAI is the same as a corresponding procedure for one or more embodiments described above (that is, for a single/same Type-2 CB with counter DAI per scheduled PDSCH), including: (i) definition of counter DAI per scheduled PDSCH (instead of DCI), (ii) using consecutive counter DAI values to co-scheduled PDSCHs, (iii) determination of a reference serving cell to which DL DAI (namely, the {serving cell, PDCCH monitoring occasion}-pair) is assigned, (iv) ordering co-scheduled PDSCHs for association to consecutive DAI values.

It is noted that, any DL DCI format from first DCI formats or second DCI formats includes a single field for the corresponding first counter DAI or second counter DAI.

Impact on Total DAI (t-DAI) in DL DCI Formats

When a UE generates separate Type-2 sub-CBs for single-cell scheduling and multi-cell scheduling, the UE determines a first total DAI corresponding to a first Type-2 sub-codebook, and a second total DAI corresponding to a second Type-2 sub-codebook.

The UE determines a first total DAI as described in [REF3], wherein the UE counts/accumulates a total number of first DL DCI formats across all serving cells up to a current PDCCH monitoring occasion. Herein, the first DL DCI formats are as defined above.

The UE determines a second total DAI by counting/accumulating a total number of scheduled PDSCHs across all serving cells, which are scheduled by second DL DCI format(s) up to a current PDCCH monitoring occasion. Herein, the second DL DCI formats are as defined above.

It is noted that, each DL DCI format from first DL DCI formats or second DL DCI formats includes a single field for the corresponding first total DAI or second total DAI.

Detection of Missed DCI

A size of a first counter DAI and total DAI (for first DCI formats as described earlier) can remain as in a DL DCI format used for single-cell scheduling, for example 2 bits.

A size of a second counter DAI and total DAI (for second DCI formats as described earlier) needs to increase based on a size $N_{max,mc}$ of a largest (possible) set of co-scheduled cells, since DAI counting/accumulation for the second Type-2 sub-CB is based on a number of scheduled PDSCHs. For example, the UE expects to receive the second counter DAI field and the second total DAI field each with a size $2+\lceil \log_2 N_{max,mc} \rceil$ bits.

Ordering of HARQ-ACK Information Bits

When a UE generates separate Type-2 sub-CBs for single-cell scheduling and multi-cell scheduling, the UE determines ordering/placement of HARQ-ACK information bits corresponding to: (i) the first Type-2 sub-CB according to procedure described in [REF3], based on an ordering of DCI formats and corresponding first counter/total DAI fields, and (ii) the second Type-2 sub-CB according to an ordering of co-scheduled PDSCHs and associated second counter/total DAI fields, using one of the various options described earlier.

Impact on DAI Field in UL DCI Formats

When a UE generates separate Type-2 sub-CBs for single-cell scheduling and multi-cell scheduling, the UE expects that an UL DCI format scheduling PUSCH transmission(s) includes a total DAI field two total DAI sub-fields or values, each sub-field or value corresponding to one of the two Type-2 sub-CBs.

A size of the first UL total DAI sub-field/value is same as that in a corresponding UL DCI format for single-cell scheduling, such as 2 bits.

A size of the second total DAI sub-field/value is same as a size of the second total DAI in second DL DCI formats, such as $2+\lceil \log_2 N_{max,mc} \rceil$ bits.

When multiplexing HARQ-ACK information on a PUSCH, the UE generates the two Type-2 sub-CBs by determining parameter $V_{temp2}$ in a corresponding pseudo-code, as described in [REF3], based on a value of a corresponding total DAI sub-field, instead of using a total DAI in DL DCI formats.

The method 700, as illustrated in FIG. 7, describes an example procedure for generating separate Type-2 HARQ-ACK sub-CBs for single-cell scheduling and for multi-cell scheduling, wherein DL DAI accumulation is per scheduled PDSCH.

In step 710, a UE (such as the UE 116) receives a configuration for DL DCI formats and Type-2 HARQ CB generation. Based on the Type-2 CB configuration, the UE determines that a number [B] bits of HARQ-ACK information is to be generated per DL DAI increment in a DCI format (step 720). For example, the UE can determine [B]=1 or 2 based on configuration of maxNrofCodeWordsScheduledByDCI or based on spatial [or multi-cell] HARQ-ACK bundling. The UE sets a first DL DAI to zero and sets a second DL DAI to zero (step 730). In response to receiving a DCI format that schedules a single PDSCH or indicates SPS release or dormancy indication on a serving cell, the UE increments the first DL DAI by one, and assigns the increment of the first DL DAI to the serving cell (step 740). In response to receiving a DCI format that jointly schedules [N] PDSCHs on a set/subset of [N] co-scheduled cells, the UE increments the second DL DAI by [N] and assigns the [N] consecutive increments of the second DL DAI to a reference serving cell (step 750). Various options for defining a reference serving cell are described earlier. The UE generates a first Type-2 sub-CB by generating [B] bits of HARQ-ACK information per first DL DAI increment in an order of assigned serving cell (step 760). The UE generates a second Type-2 sub-CB by generating [B] bits of HARQ-ACK information per second DL DAI increment in an order of assigned reference serving cell (step 770).

Although FIG. 7 illustrates the method 700 various changes may be made to FIG. 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

The following embodiments of the present disclosure describe generating separate Type-2 CBs for single-cell scheduling and multi-cell scheduling, with DAI counting per DCI (assuming no CBG configuration for PDSCH reception on any cell). This is described in the following examples and embodiments, such as those of FIG. 8.

Figure 8:
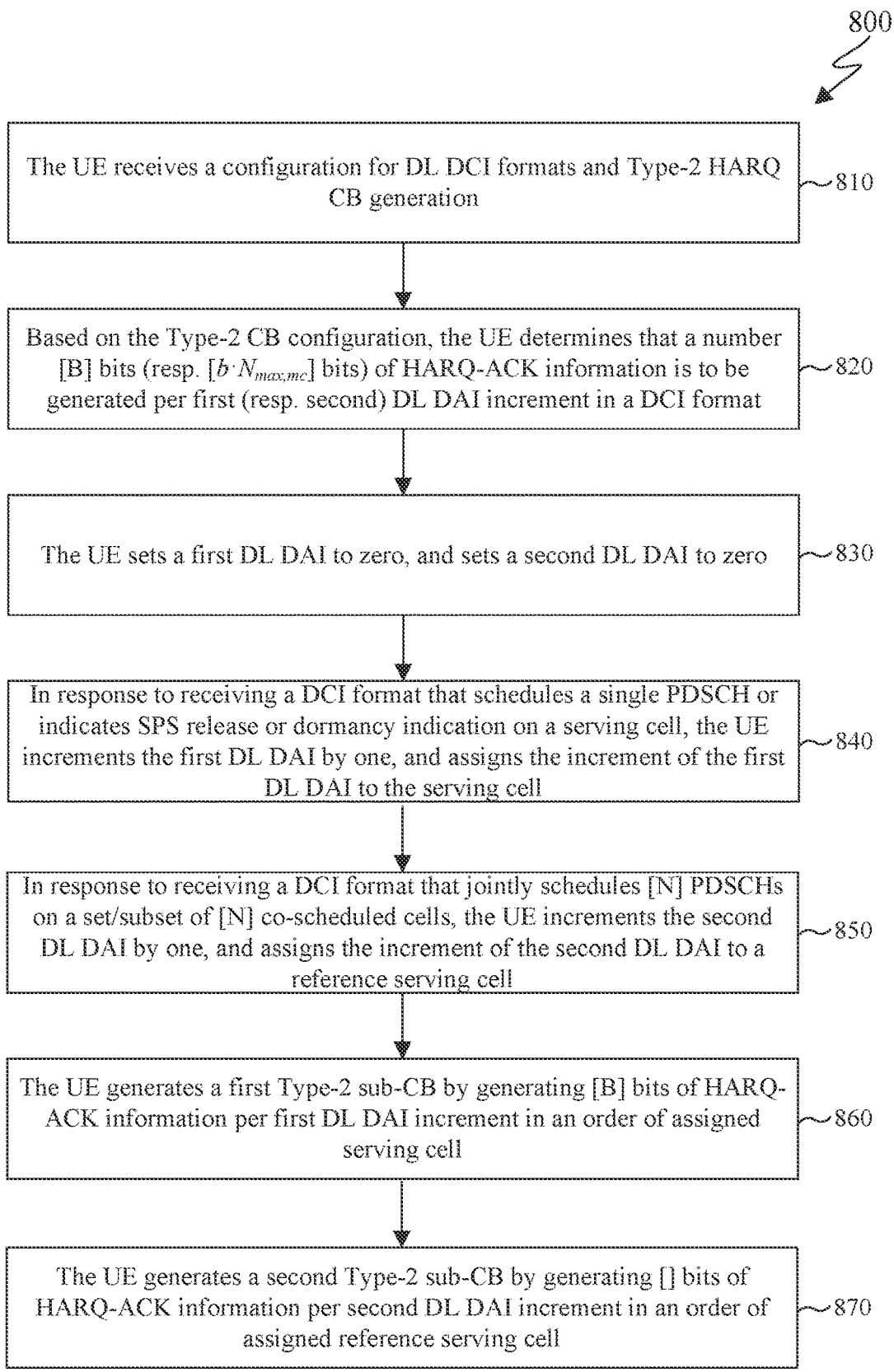
FIG. 8 illustrates an example method for generating separate Type-2 HARQ-ACK sub-CBs for single-cell scheduling and for multi-cell scheduling according to embodiments of the present disclosure.

FIG. 8 illustrates an example method 800 for generating separate Type-2 HARQ-ACK sub-CBs for single-cell scheduling and for multi-cell scheduling according to embodiments of the present disclosure. The steps of the method 800 of FIG. 8 can be performed by any of the UEs 111-116 of FIG. 1, such as the UE 116 of FIG. 3. The method 800 is for illustration only and other embodiments can be used without departing from the scope of the present disclosure.

For a UE (such as the UE 116) configured with multi-cell PDSCH scheduling and not configured CBG-based PDSCH reception on any serving cell in a corresponding PUCCH group, when the UE generates separate Type-2 sub-CBs corresponding to each of single-cell scheduling and multi-cell scheduling, the UE can be provided counter and total DAI fields in a DL DCI format for multi-cell scheduling of PDSCHs that are counted/accumulated per DL DCI format. Accordingly, the UE includes, in the second Type-2 CB, a fixed number of bits, such as $M_{max,mc}$ bits, for each DCI format for multi-cell scheduling, regardless of a number of actually co-scheduled cells (except when only one PDSCH on one cell is scheduled). Herein, $M_{max,mc}$ refers to a maximum (possible) size/number of HARQ-ACK information bits for any configured set(s) of co-scheduled cells. According to this method, there is no need to increase a size of counter/total DAI for multi-cell scheduling DCI formats, regardless of a (maximum possible) size o set(s) of co-scheduled cells. There is also no impact to size of other DL DCI formats, including for single-cell scheduling. For any UL DCI formats with an total DAI field, the DL DCI format can include two separate DAI sub-fields or values, corresponding to the two Type-2 sub-CBs, each with a size as for single-cell scheduling (such as 2 bits).

Impact on Counter DAI in DL DCI Formats:

When a UE generates separate Type-2 sub-CBs for single-cell scheduling and multi-cell scheduling, the UE determines a first counter DAI corresponding to a first Type-2 sub-CB, and a second counter DAI corresponding to a second Type-2 sub-CB. In this method, both counter DAIs are accumulated per DL DCI format, but separately for the corresponding sub-CBs.

The UE determines the first total DAI as for single-cell PDSCH scheduling, wherein the UE counts/accumulates a number of first DCI formats up to a current PDCCH monitoring occasion. Herein, the first DCI formats include: (i) DCI formats for single-cell scheduling, and (ii) DCI formats for multi-cell scheduling that indicate only a single PDSCH on a single serving cell from a corresponding set of co-scheduled cells, and (iii) DCI format(s) without scheduling information that require (a single-bit of) HARQ-ACK feedback information, such as DCI format(s) for SPS release or for dormancy indication and so on.

The UE determines the second counter DAI by counting/accumulating a number of second DCI formats up to a current PDCCH monitoring occasion. Herein, the second DCI formats include: DCI formats for multi-cell scheduling that indicate more than one PDSCH on (one or) more than one cell from a corresponding set of co-scheduled cells.

In particular, the second counter DAI is incremented only once for each DCI format for multi-cell scheduling, regardless of a number N of actually co-scheduled PDSCHs by the DCI format. Various options to define a reference serving cell in association with a DL DCI format for multi-cell PDSCH scheduling and corresponding DAI value is provided above.

It is noted that, any DL DCI format from first DCI formats or second DCI formats includes a single field for the corresponding first counter DAI or second counter DAI, respectively.

Impact on Total DAI (t-DAI) in DL DCI Formats

When a UE generates separate Type-2 sub-CBs for single-cell scheduling and multi-cell scheduling DCI formats, the UE determines a first total DAI corresponding to a first Type-2 sub-codebook, and a second total DAI corresponding to a second Type-2 sub-codebook.

The UE determines a first total DAI as for single-cell scheduling, wherein the UE counts/accumulates a total number of first DL DCI formats across all serving cells up to a current PDCCH monitoring occasion. Herein, the first DCI formats are as defined above.

The UE determines a second total DAI as for single-cell scheduling, wherein the UE counts/accumulates a total number of second DCI format(s) up to a current PDCCH monitoring occasion. Herein, the second DCI formats are as defined above.

It is noted that, each DCI format from first DCI formats or second DCI formats includes a single field for the corresponding first total DAI or second total DAI, respectively.

Detection of Missed DL DCI Formats

According to the method of this embodiment, both first and second counter/total DAI fields in corresponding DL DCI formats can reuse a same size as counter/total DAI fields as for single-cell scheduling (such as 2 bits) and maintain a same reliability level for correct determination of HARQ-ACK codebook size, such as detecting up to 3 missed DCI formats.

Number and Ordering of HARQ-ACK Information Bits

When a UE generates separate Type-2 sub-CBs for single-cell scheduling and multi-cell scheduling, and when the UE determines counter/total DAI values for both sub-CBs per DL DCI formats, the UE generates a single bit for each DL DCI format from the first DCI formats, and generates a fixed number of bits, such as N or 2N or M or $N_{max,mc}$ bits (as described earlier), for each DL DCI format from the second DCI formats (for multi-cell scheduling).

For the first sub-CB, the UE determines ordering/placement of HARQ-ACK information bits as for single-cell scheduling, based on ordering of DCI formats and corresponding first counter/total DAI fields.

For the second sub-CB, the UE determines $M_{max,mc}$ bits for each DCI format for multi-cell scheduling, regardless of a number $N \le N_{max,mc}$ of actually co-scheduled cells by the DCI format. The UE includes the $M_{max,mc}$ bits in the second Type-2 sub-CB in a position determined by the reference serving cell for the set of co-scheduled cells, and determines ordering/placement of M HARQ-ACK feedback information bits, corresponding to the N actually co-scheduled cells, within the $M_{max,mc}$ bits based on one of the following options: Option 1: The M HARQ-ACK information bits corresponding to N actually co-scheduled cells by the DCI format are placed first, where the M bits are placed based on the ordering of set/subset of co-scheduled cells, and then ($M_{max,mc}$−M) NACKs are included at the end. Option 2: The M HARQ-ACK information bits corresponding to N actually co-scheduled cells by the DCI format are placed in corresponding positions based on the ordering of set/subset of co-scheduled cells. Then, for each cell from the configured set of co-scheduled cells that are not indicated by the DCI format for multi-cell scheduling, NACK value(s) are inserted in the corresponding position based on the same ordering (potentially in between the M bits).

Various options for ordering of a set/subset of co-scheduled cells are already described herein.

Impact on DAI in UL DCI Formats

When a UE generates separate Type-2 sub-CBs for single-cell scheduling and multi-cell scheduling, and when the UE determines counter/total DAI values for both sub-CBs per DL DCI formats, an UL DCI format scheduling a PUSCH transmission includes a total DAI field with two DAI sub-fields or values, each sub-field/value corresponding to one of the two Type-2 sub-CBs, and each with a same size as for a DAI field as for single-cell scheduling, such as 2 bits. When multiplexing HARQ-ACK information on a PUSCH, the UE generates the two Type-2 sub-CBs by determining parameter $V_{temp2}$ in a corresponding pseudo-code based on a value of a corresponding total DAI sub-field, instead of corresponding total DAI in DL DCI formats.

With regards to placement of c-DAI and t-DAI in a two-stage DL DCI formats for multi-cell scheduling, in one option, the UE can receive the DAI fields in a $2^{nd}$-stage DCI. This can be beneficial, for example, to reduce a size of a $1'$-stage DCI format that is carried by a PDCCH and has more stringent size limitations (such as the "3+1" DCI format size budget), compared to a size of the $2^{nd}$-stage DCI that may be carried by a PDSCH.

In another option, the UE receives DAI fields in a $1^{st}$-stage DCI format, for example, when a UE receives (full) scheduling information for a first PDSCH from co-scheduled PDSCHs on the $1^{st}$-stage DCI format, or in order for the UE to be able to track the DAI values more accurately (when DCI formats are missed).

In one example, the UE can accumulate a counter DAI based on a number of scheduled PDSCHs, but accumulate a total DAI based on a number of DCI formats.

The method 800, as illustrated in FIG. 8, describes an example procedure for generating separate Type-2 HARQ-ACK sub-CBs for single-cell scheduling and for multi-cell scheduling, wherein DL DAI accumulation is per scheduled PDSCH.

In step 810, a UE (such as the UE 116) receives a configuration for DL DCI formats and Type-2 HARQ CB generation. Based on the Type-2 CB configuration, the UE determines that a number B bits (respectively, $M_{max,mc}$ bits) of HARQ-ACK information is to be generated per first (respectively, second) DAI increment in a DCI format (step 820). For example, the UE can determine B=1 or 2 based on configuration of maxNrofCodeWordsScheduledByDCI or based on spatial or multi-cell HARQ-ACK bundling. Also, $M_{max,mc}$ denotes a largest (possible) size of HARQ-ACK information bits corresponding to any set of co-scheduled cells. In step 830, the UE sets a first DL DAI to zero, and sets a second DL DAI to zero. In response to receiving a DCI format that schedules a single PDSCH or indicates SPS release or dormancy indication on a serving cell, the UE increments the first DAI by one, and assigns the increment of the first DAI to the serving cell (step 840). In response to receiving a DCI format that jointly schedules N PDSCHs on a set/subset of N co-scheduled cells, the UE increments the second DAI by one, and assigns the increment of the second DAI to a reference serving cell (step 850). Various options for defining a reference cell are described earlier. In step 860, the UE generates a first Type-2 sub-CB by generating B bits of HARQ-ACK information per first DAI increment in an order of assigned serving cell. In step 870, the UE generates a second Type-2 sub-CB by generating $M_{max,mc}$ bits of HARQ-ACK information per second DAI increment in an order of assigned reference serving cell.

Although FIG. 8 illustrates the method 800 various changes may be made to FIG. 8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

The following embodiments of the present disclosure describe generating Type-2 CB(s) in presence of both multi-cell scheduling and CBG configuration. This is described in the following examples and embodiments.

When a UE is configured with multi-cell scheduling, the UE may or may not be configured with codeblock group (CBG) operation for PDSCH reception. When CBG is not configured, the UE can generate a single Type-2 CB or two separate Type-2 sub-CBs, as described earlier. When CBG is configured, the UE can be configured with up to 4 Type-2 sub-CBs: a first sub-CB for cells with single-cell scheduling only without CBG, a second sub-CB for cells with single-cell scheduling only with CBG, a third sub-CB for cells with multi-cell scheduling without CBG, and a fourth sub-CB for cells with multi-cell scheduling with CBG. Depending on network restrictions for CBG configuration and/or DAI operation (for example, per DCI or per PDSCH), various cases are provided for joint operation of multi-cell scheduling and CBG operation, as provided in the following.

No CBG configuration in presence of multi-cell scheduling.

In a first case, when a UE is configured with multi-cell scheduling, the UE does not expect to be configured with CBG operation for any serving cell in a corresponding PUCCH group (regardless of whether the serving cell has single-cell scheduling or multi-cell scheduling configuration). Another scenario for Case #1 is when there are no restrictions by the specifications for system operation, but the network configuration is such that the UE is configured multi-cell scheduling at least for one set of co-scheduled cells, but not provided CBG configuration for any serving cells.

Here, the UE can generate a single Type-2 CB or two separate Type-2 sub-CBs, as described earlier.

CBG and Multi-Cell Scheduling not Applicable to a Same Cell

In a second case, joint multi-cell scheduling operation and CBG operation are possible, but they cannot apply to a same serving cell. Such separation can be achieved by higher layer configuration or based on DCI format design. Therefore, at least two scenarios are provided here.

In a one scenario, a UE can be configured multi-cell scheduling for a first number of cells, and configured CBG for a second number of cells, wherein the first number of cells is separate from the second number of cells (no common cells).

In another scenario, a UE can be configured CBG for any serving cell, regardless of single-cell scheduling or multi-cell scheduling configuration, but a DCI format for scheduling PDSCH(s) can provide only one the two operations, namely: (i) a DCI format for single-cell scheduling on a cell without multi-cell scheduling configuration can indicate CBG-based PDSCH reception, or (ii) a DCI format for multi-cell scheduling indicates only one PDSCH on one serving cell (with multi-cell scheduling) from a set of co-scheduled cells can indicate CBG-based PDSCH reception, or (iii) a DCI format for multi-cell scheduling indicates more than one PDSCHs on (one or) more than one co-scheduled cells can indicate TB-based PDSCH reception.

In various embodiments, several options are provided with two or three Type-2 sub-CBs.

In a one option, the UE can generate two separate Type-2 CBs: A first sub-CB for cells without CBG operation, including: (i) cells with single-cell scheduling configuration only, without CBG configuration, or (ii) cells with multi-cell scheduling configuration, without CBG configuration, or (iii) when a DCI format for multi-cell scheduling indicates more than one TB-based PDSCH reception on (one or) more than one cells from a set of co-scheduled cells, where the UE can be configured CBG-based reception for at least one cell from the (one or) more than one cells. A second sub-CB for cells with CBG operation, including: (i) cells with single-cell scheduling configuration only and with CBG configuration, or (ii) when a DCI format for multi-cell scheduling indicates a single CBG-based PDSCH reception on a single cell with multi-cell scheduling configuration.

In one example, a DCI format for multi-cell scheduling can include a 1-bit field to enable or disable CBG operation.

For example, the UE can generate the first Type-2 sub-CB as described herein to accommodate a same (sub-)CB for both single-cell scheduling and multi-cell scheduling. The UE needs to accumulate/process a first counter/total DAI per scheduled PDSCH (instead of per DCI format) to enable such a CB. Therefore, a size of the first counter/total DAI is increased by $\lceil \log_2 N_{max,mc} \rceil$ bits relative to a corresponding size for single-cell scheduling, such as 2 bits.

For example, the UE can generate the second Type-2 sub-CB as for single-cell scheduling for generating a Type-2 (sub-)CB for cells with CBG configuration. The UE treats a DCI format for multi-cell scheduling that indicates a single CBG-based PDSCH reception on a single cell with multi-cell scheduling configuration, in a same way as a DCI format for single-cell scheduling of a CBG-based PDSCH reception. The UE can accumulate/process a second counter/total DAI per DCI format (following legacy procedure). Therefore, a size of the first DL counter/total DAI is same as a corresponding size for single-cell scheduling, such as 2 bits.

For example, for any UL DCI format scheduling a PUSCH transmission that includes a total DAI field, the UE expects to receive two total DAI sub-fields or values, each corresponding to one of the two sub-CBs. A size of an UL total DAI sub-field is same as a size of a corresponding total DAI in DL DCI formats. When multiplexing HARQ-ACK feedback information on a PUSCH, the UE generates the two Type-2 sub-CBs by determining parameter $V_{temp2}$ in a corresponding pseudo-code based on a value of a corresponding total DAI sub-field, instead of corresponding DL counter/total DAI.

In a another option, the UE can generate three separate Type-2 CBs, including: (i) a first sub-CB for cells with single-cell scheduling configuration only without CBG, and (ii) a second sub-CB for cells with single-cell scheduling configuration only with CBG, or when a DCI format for multi-cell scheduling indicates a single CBG-based PDSCH reception on a single cell with multi-cell scheduling configuration, and (iii) a third sub-CB for cells with multi-cell scheduling without CBG, or when a DCI format for multi-cell scheduling indicates more than one TB-based PDSCH reception on (one or) more than one cells from a set of co-scheduled cells, where the UE can be configured CBG-based reception for at least one cell from the (one or) more than one cells.

For example, the UE generates the first and second sub-CBs based on procedure for single-cell scheduling for Type-2 CB generation in presence of CBG configuration. Herein, a DCI format for multi-cell scheduling that indicates a single CBG-based PDSCH reception on a single cell with multi-cell scheduling configuration can be treated in a same way as a DCI format for single-cell scheduling that indicates a CBG-based PDSCH reception. The UE generates the third sub-CB as described herein, with DAI accumulation per scheduled PDSCH or per DCI, respectively.

For example, the UE accumulates three separate counter/total DAIs corresponding to the three sub-CBs, wherein a size of the first and second counter/total DAIs are per procedure for single-cell scheduling, such as 2 bits each, while a size of the third counter/total DAI can be similar to that provided herein.

Herein, an UL DCI format can include three total DAI sub-fields or values, each corresponding to one of the three sub-CBs. A size of an UL total DAI sub-field/value is same as a size of a corresponding total DAI in DL DCI formats. When multiplexing HARQ-ACK information on a PUSCH, the UE generates the three Type-2 sub-CBs by determining parameter $V_{temp2}$ in a corresponding pseudo-code based on a value of a corresponding DAI sub-field/value, instead of corresponding total DAI in DL DCI formats.

CBG and Multi-Cell Scheduling can be Applicable to a Same Cell

In another example, both multi-cell scheduling operation and CBG operation are possible and can apply to a same serving cell or different serving cells. In particular, it is possible that the UE is provided CBG configuration for a first serving cell with multi-cell scheduling configuration, that is, when the first serving cell belongs to a set of co-scheduled cells. In addition, the UE can receive a DCI format for multi-cell scheduling that indicates more than one PDSCHs on (one or) more than one serving cells from the set of co-scheduled cells, wherein the first serving cell belongs to the set of co-scheduled cells.

For example, several options are provided with two or three or four Type-2 sub-CBs. In a first option (Option 3-1), the UE can generate two separate Type-2 CBs: a first sub-CB for cells without CBG operation, including: (i) cells with single-cell scheduling configuration only, without CBG configuration, or (ii) cells with multi-cell scheduling configuration, without CBG configuration, or (iii) when a DCI format for single-cell scheduling or for multi-cell scheduling does not support CBG-based PDSCH reception or indicates TB-based PDSCH reception, where at least one of the indicated serving cells(s) are provided CBG configuration. A second sub-CB for cells with CBG operation, including: (i) cells with single-cell scheduling configuration only and with CBG configuration, or (ii) cells with multi-cell scheduling configuration and with CBG configuration.

For example, the UE can generate the first Type-2 sub-CB as described herein. In particular, the UE treats a DCI format for single-cell scheduling or for multi-cell scheduling that does not support CBG-based PDSCH reception or indicates TB-based PDSCH reception, in a same way as when none of the corresponding serving cells are provided CBG configuration. The UE generates the first sub-CB based on a first counter/total DAI that is accumulated/processed per scheduled PDSCH (instead of per DCI format). Therefore, a size of the first counter/total DAI is increased by $\lceil \log_2 N_{max,mc} \rceil$ bits relative to a corresponding size for single-cell scheduling, such as 2 bits.

For example, the UE can generate the second Type-2 sub-CB based on a second counter/total DAI that is accumulated/processed per DL DCI format. The UE generates the second Type-2 sub-CB based on a worst-case assumption that leads to a largest CB size, namely, by treating a DCI format for single-cell scheduling with CBG-based PDSCH reception similar to a DCI format for multi-cell scheduling with multiple co-scheduled CBG-based PDSCH receptions. Let $N_{cells}^{DL,CBG}$ denote a number of serving cells with CBG configuration, with single-cell scheduling or multi-cell scheduling configuration. For each DCI format, the UE generates $N_{HARQ-C_{mc},max}^{CBG/TB,max}$ HARQ-ACK information bits, where $N_{HARQ-ACK,mc,max}^{CBG/TB,max}$ is the maximum value of $N_{max,mc} \cdot N_{TB,c}^{DL} \cdot N_{HARQ-ACK,c}^{CBG/TB,max}$ across all $N_{cells}^{DL,CBG}$ serving cells and $N_{TB,c}^{DL}$ is the value of maxNrofCodeWordsScheduledByDCI for serving cell c. If a DCI format indicates PDSCH reception on a set S of cells such that $\Sigma_{c \in S} N_{TB,c}^{DL} \cdot N_{HARQ-ACK,c}^{CBG/TB,max} < N_{HARQ-ACK,mc,max}^{CBG/TB,max}$, the UE generates NACK for the last $N_{HARQ-ACK,mc,max}^{CBG/TB,max} - \Sigma_{c \in S} N_{TB,c}^{DL} \cdot N_{HARQ-ACK,mc,max}^{CBG/TB,max}$ HARQ-ACK information bits.

For example, for any DCI format scheduling a PUSCH transmission that includes a DAI field, the UE expects to receive two DAI sub-fields or values, each corresponding to one of the two sub-CBs. A size of an DAI sub-field/values is the same as a size of a total DAI in a DL DCI format. When multiplexing HARQ-ACK feedback information on a PUSCH, the UE generates the two Type-2 sub-CBs by determining parameter $V_{temp2}$ in a corresponding pseudo-code based on a value of a corresponding DAI sub-field/value, instead of corresponding total DAI in DL DCI format.

In another option, the UE can generate three separate Type-2 CBs. A first sub-CB for cells without CBG operation, including: (i) cells with single-cell scheduling configuration only, without CBG configuration, or (ii) cells with multi-cell scheduling configuration, without CBG configuration, or (iii) when a DCI format for single-cell scheduling or for multi-cell scheduling does not support CBG-based PDSCH reception [or indicates TB-based PDSCH reception], where at least one of the indicated serving cells(s) are provided CBG configuration, and A second sub-CB for cells with single-cell scheduling configuration only and with CBG configuration. A third sub-CB for cells with multi-cell scheduling configuration and with CBG configuration.

For example, the UE generates the first Type-2 sub-CB as described herein and with DAI handling in DL DCI formats and generates the second Type-2 sub-CB as for single-cell scheduling. Furthermore, the UE generates the third Type-2 sub-CB similar to the second sub-CB, except that the UE includes a smaller number of redundant HARQ-ACK information bits, since only DCI formats for multi-cell scheduling that indicate multiple co-scheduled CBG-based PDSCH receptions are provided. The UE expects that any UL DCI format with a DAI field includes three UL total DAI sub-fields or values, corresponding to the three sub-CBs, and with sizes same as corresponding total DAI fields in DL DCI formats.

In another option, the UE can generate four separate Type-2 CBs: A first sub-CB for: (i) cells with single-cell scheduling configuration only, without CBG configuration, or (ii) DCI formats for single-cell scheduling that do not support CBG-based PDSCH reception (or indicate TB-based PDSCH reception), where the indicated serving cell is provided CBG configuration, or (iii) DCI formats for multi-cell scheduling that indicate a single PDSCH reception on a single cell from a corresponding set of co-scheduled cells, and that do not support CBG-based PDSCH reception (or indicate TB-based PDSCH reception), where the indicated serving cell is provided CBG configuration. A second sub-CB for: (i) cells with multi-cell scheduling configuration, without CBG configuration, or (ii) when a DCI format for multi-cell scheduling does not support CBG-based PDSCH reception (or indicates TB-based PDSCH reception), where at least one of the indicated serving cells(s) are provided CBG configuration. A third sub-CB for cells with single-cell scheduling configuration only and with CBG configuration, with DCI formats supporting/indicating CBG-based PDSCH reception. A fourth sub-CB for cells with multi-cell scheduling configuration and with CBG configuration, with DCI formats supporting/indicating CBG-based PDSCH reception for more than one PDSCH on (one or) more than one cells from a corresponding set of co-scheduled cells.

For example, the UE generates the first Type-2 sub-CB using the procedure for single-cell scheduling. In particular, the UE treats DCI formats for multi-cell scheduling that indicate a single TB-based PDSCH reception on a single cell in a same way as DCI formats for single-cell scheduling that indicate a single TB-based PDSCH reception. The first sub-CB is based on a first counter/total DAI, with size such as 2 bits.

For example, the UE generates the second Type-2 sub-CB as described herein, with a corresponding second counter/total DAI accumulation/processing per scheduled PDSCH or per DCI format, respectively. A size of the second DL DAI is increased by $\lceil \log_2 N_{max,mc} \rceil$ bits relative to a corresponding same size as for single-cell scheduling, such as 2 bits, when DAI accumulation is per scheduled PDSCH, but has a same size as for single-cell scheduling when DL DAI accumulation is per DCI format.

For example, the UE generates the third Type-2 sub-CB per legacy procedure and based on a third counter/total DAI, with same size as for single-cell scheduling, such as 2 bits.

For example, the UE generates the fourth Type-2 sub-CB in a same way as the third Type-2 sub-CB described herein. The fourth sub-CB is also associated with a fourth counter/total DAI with accumulation per DCI format, and therefore with a size as for single-cell PDSCH scheduling, such as 2 bits.

For example, the UE expects that any UL DCI format scheduling a PUSCH transmission with an DAI field includes four DAI sub-fields or values, corresponding to the four sub-CBs, and with sizes same as corresponding total DAI fields in corresponding DL DCI formats.

The following embodiments of the present disclosure describe handling search space sets for multi-cell scheduling in generation of Type-2 CB(s). This is described in the following examples and embodiments.

When a UE is configured with multi-cell scheduling, the UE determines PDCCH monitoring occasions (MOs) for DL DCI formats for multi-cell scheduling for which the UE transmits HARQ-ACK information in a same PUCCH in slot n according to search space sets for multi-cell scheduling. Herein, a search space set for multi-cell scheduling can be a legacy USS set for single-cell scheduling, or a new USS set dedicated to multi-cell scheduling (M-USS), as described herein. For example, an M-USS set can be configured and monitored only on one (reference) cell, or multiple linked M-USS sets can be configured and monitored on all co-scheduled cells.

For determination of a set of MOs associated with a Type-2 HARQ codebook transmitted in a PUCCH in slot n, for the case of multiple linked M-USS sets with identical configuration provided on multiple co-scheduled cells, in one option, the UE considers and counts all MOs on the multiple linked M-USS sets separately. In another option, when a DCI format is detected in an MO from a number of duplicated MOs, all corresponding/identical MOs in other linked M-USS sets are discarded, namely, all such MOs are counted as a single MO.

The following embodiments of the present disclosure describe other aspects of HARQ-ACK codebook generation in presence of multi-cell scheduling.

The following embodiments of the present disclosure describe Type-3 HARQ codebook in presence of multi-cell scheduling. This is described in the following examples and embodiments.

For a UE that is configured a number of sets of co-scheduled cells, when a DCI format for multi-cell scheduling includes a flag, such as a One-shot HARQ-ACK request field, that triggers generation of a Type-3 HARQ codebook (also referred to as, a "One-shot" CB), the UE can consider the DCI format for multi-cell scheduling as an implicit triggering state for the Type-3 HARQ codebook.

In one variation, the DCI format for multi-cell scheduling triggers generation of a Type-3 CB corresponding to all HARQ processes associated with a set of co-scheduled cells that correspond to the DCI format.

In another variation, the DCI format for multi-cell scheduling triggers generation of a Type-3 CB corresponding to all HARQ processes associated with a subset of serving cells on which co-scheduled PDSCH(s) are scheduled, as indicated by the DCI format.

The following embodiments of the present disclosure describe HARQ timeline in presence of two-stage multi-cell scheduling. This is described in the following examples and embodiments.

For a UE that is configured a two-stage DCI format for multi-cell scheduling, the UE determines a minimum PDCCH-to-HARQ (N3) timeline relative to a $2^{nd}$-stage DCI. In addition, when the UE receives a $2^{nd}$-stage DCI in a PDSCH, such as a first PDSCH that is scheduled by a corresponding $1^{st}$-stage DCI, the UE considers an SCS configuration of the (first) PDSCH when determining an SCS configuration for the N3 timeline. An N3/N2 timeline relative to a $2^{nd}$-stage DCI can also be used when the UE determines a minimum time until DL BWP switching.

If a UE determines a first resource for a PUCCH transmission with HARQ-ACK information corresponding only to a PDSCH reception without a corresponding PDCCH or detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE does not expect to multiplex HARQ-ACK information corresponding to the second DCI format in a PUCCH resource in the slot if the PDCCH reception that includes the second DCI format is not earlier than $N_3 \cdot (2048+144) \cdot \kappa \cdot 2^{-\mu} \cdot T_c$ from the beginning of a first symbol of the first resource for PUCCH transmission in the slot where, $\kappa$ and $T_c$ are defined in clause 4.1 of [REF1] and $\mu$ corresponds to the smallest SCS configuration among the SCS configurations of the PDCCHs providing the DCI formats and the SCS configuration of the PUCCH. If the second DCI format is a two-stage DCI format (for multi-cell scheduling), with a $1^{st}$-stage DCI in a first PDCCH, and a $2^{nd}$-stage DCI in a second PDCCH/PDSCH, the UE does not expect to multiplex HARQ-ACK information corresponding to the $2^{nd}$-stage DCI of the second DCI format in a PUCCH resource in the slot if the second PDCCH/PDSCH reception that includes the $2^{nd}$-stage DCI of the second DCI format is not earlier than $N_3 \cdot (2048+144) \cdot \kappa \cdot 2^{-\mu} \cdot T_c$ from the beginning of a first symbol of the first resource for PUCCH transmission in the slot where, $\kappa$ and $T_c$ are defined in clause 4.1 of [REF1] and $\mu$ corresponds to the smallest SCS configuration among the SCS configurations of the PDCCHs providing the DCI formats [including the first PDCCH, and the second PDCCH when applicable], and the SCS configuration of the second PDSCH when applicable, and the SCS configuration of the PUCCH. If processingType2Enabled of PDSCH-Serving-CellConfig is set to enable for the serving cell with the second DCI format and for all serving cells with corresponding HARQ-ACK information multiplexed in the PUCCH transmission in the slot, $N_3=3$ for $\mu=0$, $N_3=4.5$ for $\mu=1$, $N_3=9$ for $\mu=2$; otherwise, $N_3=8$ for $\mu=0$, $N_3=10$ for $\mu=1$, $N_3=17$ for $\mu=2$, $N_3=20$ for $\mu=3$.

A UE does not expect to detect a DCI format switching a DL BWP within $N_3$ symbols prior to a first symbol of a PUCCH transmission where the UE multiplexes HARQ-ACK information, where $N_3$ is defined in clause 9.2.3 [REF3]. If a DCI format is a two-stage DCI format (for multi-cell scheduling), with a $2^{nd}$-stage DCI in a second PDCCH/PDSCH, a UE does not expect to detect/receive the $2^{nd}$-stage DCI of the DCI format switching a DL BWP within $N_3$ symbols prior to a first symbol of a PUCCH transmission where the UE multiplexes HARQ-ACK information, where $N_3$ is defined in clause 9.2.3 of [REF3].

A UE does not expect to detect a DCI format switching a DL BWP within $N_2$ symbols prior to a first symbol of a PUSCH transmission where the UE multiplexes HARQ-ACK information, where $N_2$ is defined in [REF4]. If a DCI format is a two-stage DCI format (for multi-cell scheduling), with a $2^{nd}$-stage DCI in a second PDCCH/PDSCH, a UE does not expect to detect/receive the $2^{nd}$-stage DCI of the DCI format switching a DL BWP within $N_2$ symbols prior to a first symbol of a PUSCH transmission where the UE multiplexes HARQ-ACK information, where $N_2$ is defined in [REF4].

$N_2$ is based on $\mu$ of Table 6.4-1 and Table 6.4-2 of [REF4] for UE processing capability 1 and 2 respectively, where $\mu$ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and $\kappa$ is defined in clause 4.1 of [REF1]. If the PUSCH is (among a set of PUSCHs jointly) scheduled by a two-stage DCI format, with a $1^{st}$-stage DCI in a first PDCCH, and a $2^{nd}$-stage DCI in a second PDCCH/PDSCH, $\mu$ corresponds to the one of ($\mu_{DL1}$, $\mu_{DL2}$, $\mu_{UL}$) resulting with the largest $T_{proc,2}$, where the, $\mu_{DL1}$ corresponds to the subcarrier spacing of the downlink with which the first PDCCH carrying the $1^{st}$-stage of the DCI scheduling the PUSCH was transmitted, and, $\mu_{DL2}$ corresponds to the subcarrier spacing of the downlink with which the second PDCCH/PDSCH carrying the $2^{nd}$-stage of the DCI scheduling the PUSCH was transmitted, and $\mu_{UL}$ corresponds to the subcarrier spacing of the uplink channel with which the PUSCH is to be transmitted.

The following embodiments of the present disclosure describe multiplexing HARQ-ACK feedback on co-scheduled PUSCHs. This is described in the following examples and embodiments.

For a UE configured with multi-cell scheduling for PUSCHs, the specifications for system operation may not allow HARQ-ACK multiplexing on co-scheduled PUSCHs, for example, to reduce DCI format size. When multiplexing HARQ-ACK feedback on co-scheduled PUSCHs is supported, a DAI field in an UL DCI format for multi-cell scheduling of PUSCH transmissions can be a cell-common parameter that applies to all co-scheduled PUSCHs or can be a cell-specific parameter that applies to a reference cell from the co-scheduled cells, such as a first or a last PUSCH. When a DCI format for multi-cell scheduling of PUSCHs is configured to be a two-stage DCI, the UE can receive the DAI field in the $2^{nd}$-stage DCI.

In one embodiment, the UE does not expect to multiplex HARQ-ACK information on a PUSCH from a set of co-scheduled PUSCHs. In particular, the UE does not expect that a DCI format for multi-cell scheduling of PUSCHs includes a DAI field. Such UE behavior can be beneficial, for example, to maintain a manageable size for a DCI format for multi-cell scheduling, especially when DAI fields in DL DCI formats are per scheduled PDSCH (instead of per DCI format) or when a number of Type-2 sub-CBs is large, and therefore a size of a DAI field in an UL DCI format is large.

In another embodiment, the UE can multiplex HARQ-ACK information only on a last (or on a first) PUSCH among the co-scheduled PUSCHs, based on a value of DAI field that is provided in the UL DCI format for multi-cell PUSCH scheduling. Herein, the last (or the first) PUSCH can refer to a PUSCH that: (i) ends (or starts) in a latest (or first) slot/symbol, among the co-scheduled PUSCHs, (w.r.t.: an SCS configuration for an associated cell with PUCCH configuration (such as the PCell), or an SCS configuration for a corresponding scheduling cell, or a largest (or smallest) SCS configuration among co-scheduled cells/PUSCHs, or an SCS configuration provided by higher layers, or a predetermined SCS configuration, such as 30 kHz in FR1 and 120 kHz in FR2), or (ii) corresponds to a cell, among the co-scheduled cells, with a largest (or smallest) cell index or CIF, or (iii) corresponds to a cell, among the co-scheduled cells, with a largest (or smallest) SCS, or (iv) corresponds to a cell, among the co-scheduled cells, that is indicated last in the DCI format for multi-cell scheduling, if the DCI format includes an ordered indication for the set of co-scheduled cells, or (v) a combination thereof (such as last/first in ascending order of SCS configuration, and then last/first in ascending order of cell index/CIF).

In another embodiment, the UE can multiplex HARQ-ACK information on all co-scheduled PUSCHs. In one realization, the UE is provided a single DAI field that is commonly applicable to all co-scheduled PUSCHs. In another realization, the UE is provided separate DAI fields, each of which is applicable to one PUSCH from the co-scheduled PUSCHs.

In one example, when a DCI format for multi-cell scheduling of PUSCHs is a two-stage DCI, the UE expects to receive the DAI field(s) in the $2^{nd}$-stage DCI, which can be included in a first PDSCH that is scheduled by a corresponding $1^{st}$-stage DCI.

A UE procedure from among the above realizations can be predetermined in the specifications, such as HARQ-ACK multiplexing only on a last (or first) PUSCH or can be provided by higher layer configuration.

The UE determines a size of a DAI field in a DCI format for multi-cell scheduling of PUSCHs to be same as a size of a DAI field in a UL DCI format for single cell-scheduling of a single PUSCH. When the UE generates a number of Type-2 sub-CBs, the UE expects that a DAI field in a DCI format for multi-cell scheduling of PUSCHs includes a same number of DAI sub-fields/values, each corresponding to one of the Type-2 sub-CBs.

The following embodiments of the present disclosure describe OoO scheduling in presence of multi-cell scheduling. This is described in the following examples and embodiments.

For a UE configured with multi-cell scheduling, and when the UE does not support out-of-order (OoO) scheduling, the UE expects that a DCI format for multi-cell scheduling satisfies the "in-order" scheduling property in a same way as a DCI format for single-cell scheduling. To achieve this property, the OoO property can be defined across all serving cells or across pairs of sets/groups of serving cells, rather than pairs of individual serving cells. The OoO property can be defined with respect to only a first/earliest PDSCH or PUSCH indicated by a DCI format for multi-cell scheduling (rather than all co-scheduled PDSCHs or PUSCHs).

In one example, when a DCI format (for multi-cell scheduling) is a two-stage DCI, the OoO property can be defined with respect to a stage that leads to a tighter constraint. For example, the OoO property can be defined with respect to the $2^{nd}$-stage DCI when the two-stage DCI format is an earlier DCI, and the OoO property can be defined with respect to the $1^{st}$-stage DCI when the two-stage DCI format is a later DCI.

The following embodiments of the present disclosure describe usage of DL total DAI in all PDCCH monitoring occasions for Type-2 CB generation. This is described in the following examples and embodiments.

When a UE generates a Type-2 CB or multiple Type-2 sub-CBs, in order to increase a UE ability for detecting missed DCI formats, the UE can use a total DAI in DL DCI formats received in each PDCCH monitoring occasion (rather than only in a last PDCCH monitoring occasion) with DCI formats associated with a PUCCH transmission in a slot n.

Accordingly, in the pseudo-code for Type-2 CB generation, the UE can check for any missed DCI formats based on a value of DL total DAI inside the "while" loop for parameter 'm' (PDCCH monitoring occasion). This method is based on the property that t-DAI value is fixed for each MO across all serving cells. Therefore, the UE can determine and correct the CB size not only at the very end of the pseudo-code, but also as the UE progresses through each MO, for example, in cases that several missed DCIs are consecutive and cannot be detected by c-DAI for a given MO.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for operating a user equipment (UE), the method comprising:
  receiving:
    first information for a number of sets of cells, second information for second cells,
    first downlink control information (DCI) formats, wherein each DCI format from the first DCI formats:
    is associated with scheduling more than one physical downlink shared channel (PDSCH) reception on more than one cell in a set of cells from the number of sets of cells, and
    includes a value for a counter downlink assignment index (DAI) field, wherein the value is based on a smallest cell index among the more than one cell,
K PDSCHs on N cells, in a first set of cells from the number of sets of cells, that are scheduled by a DCI format from the first DCI formats;
determining first hybrid automatic repeat request acknowledgement (HARQ-ACK) information bits associated with the first DCI formats, wherein the first HARQ-ACK information bits:
    are ordered in ascending order of respective values of the counter DAI field, and include, for the DCI format:
        $M=\Sigma^{N}_{i=1}M_i$ HARQ-ACK information bits, corresponding to receptions of the K PDSCHs on the N cells, in ascending order of cell indexes for the N cells, and
        $(M_{max}-M)$ HARQ-ACK information bits with negative acknowledgement (NACK) values that are appended to the M HARQ-ACK information bits,
    wherein $M_i$ is a number of HARQ-ACK information bits associated with a reception of one or more PDSCHs from the K PDSCHs, on cell i from the N cells, and
    wherein $M_{max}$ is a maximum number of HARQ-ACK information bits for each DCI format from the first DCI formats;
generating a HARQ-ACK sub-codebook that includes the first HARQ-ACK information bits; and
transmitting a physical uplink control channel (PUCCH) or a physical uplink shared channel (PUSCH) that includes the HARQ-ACK sub-codebook.

2. The method of claim 1, wherein:
a value for the counter DAI field in the DCI format is an accumulative number of pairs of a reference cell and a PDCCH monitoring occasion associated with the first DCI formats, up to a second reference cell for the DCI format and up to a second PDCCH monitoring occasion for detection of the DCI format,
ordering of the first DCI formats is first in ascending order of cell index for respective reference cells, and second in ascending order of respective PDCCH monitoring occasions for detection of the first DCI formats, and
the second reference cell is a cell with smallest index from the N cells.

3. The method of claim 1, further comprising:
receiving second information for enabling or disabling spatial bundling of HARQ-ACK information associated with a PUCCH group that includes the number of sets of cells;
determining $N_{max,1}$ to be a maximum number of cells, in a set of cells from the number of sets of cells, that is scheduled by one of the first DCI formats;
determining $N_{max,2}$ to be a maximum total number of transport blocks (TBs) or transport block groups (TBGs) across respective cells, in a respective set of cells from the number of sets of cells, that is scheduled by a DCI format from the first DCI formats; and
determining:
    $M_{max}=N_{max,1}$ bundling is enabled, and
    $M_{max}=N_{max,2}$ bundling is not enabled.

4. The method of claim 1, wherein:
the HARQ-ACK sub-codebook further includes second HARQ-ACK information bits associated with second DCI formats, and
each DCI format from the second DCI formats:
    schedules more than one PDSCH reception on a cell from second cells, and
    is associated with more than one HARQ-ACK information bit in response to the more than one PDSCH reception.

5. The method of claim 1, wherein:
determining the first HARQ-ACK information bits further comprises determining the first HARQ-ACK information bits based on respective DAI values in a second DCI format,
the DAI values correspond to the first HARQ-ACK information bits, and
the second DCI format schedules the PUSCH transmission.

6. The method of claim 1, wherein the N cells are:
with a same sub-carrier spacing (SCS),
all frequency division duplex (FDD) carriers or all time division duplex (TDD) carriers, and
all in a first frequency range (FR1) or all in a second frequency range (FR2).

7. A user equipment (UE), comprising:
a transceiver configured to receive:
    first information for a number of sets of cells,
    first downlink control information (DCI) formats, wherein each DCI format from the first DCI formats:
        is associated with scheduling more than one physical downlink shared channel (PDSCH) reception on more than one cell in a set of cells from the number of sets of cells, and
        includes a value for a counter downlink assignment index (DAI) field, wherein the value is based on a smallest cell index among the more than one cell,
    K PDSCHs on N cells, in a first set of cells from the number of sets of cells, that are scheduled by a DCI format from the first DCI formats; and
a processor operably connected to the transceiver, the processor configured to:
    determine first hybrid automatic repeat request acknowledgement (HARQ-ACK) information bits associated with the first DCI formats, wherein the first HARQ-ACK information bits:
        are ordered in ascending order of respective values of the counter DAI field, and
        include, for the DCI format:
            $M=\Sigma^{N}_{i=1}M_i$ HARQ-ACK information bits, corresponding to receptions of the K PDSCHs on the N cells, in ascending order of cell indexes for the N cells, and
            $(M_{max}-M)$ HARQ-ACK information bits with negative acknowledgement (NACK) values that are appended to the M HARQ-ACK information bits,
        wherein $M_i$ is a number of HARQ-ACK information bits associated with a reception of one or more PDSCHs from the K PDSCHs, on cell i from the N cells, and
        wherein $M_{max}$ is a maximum number of HARQ-ACK information bits for each DCI format from the first DCI formats; and
    generate a HARQ-ACK sub-codebook that includes the first HARQ-ACK information bits,
wherein the transceiver is further configured to transmit a physical uplink control channel (PUCCH) or a physical uplink shared channel (PUSCH) that includes the HARQ-ACK sub-codebook.

8. The UE of claim 7, wherein:
a value for the counter DAI field in the DCI format is an accumulative number of pairs of a reference cell and a PDCCH monitoring occasion associated with the first DCI formats, up to a second reference cell for the DCI format and up to a second PDCCH monitoring occasion for detection of the DCI format,
ordering of the first DCI formats is first in ascending order of cell index for respective reference cells, and second in ascending order of respective PDCCH monitoring occasions for detection of the first DCI formats, and
the second reference cell is a cell with smallest index from the N cells.

9. The UE of claim 7, wherein:
the transceiver is further configured to receive second information for enabling or disabling spatial bundling of HARQ-ACK information associated with a PUCCH group that includes the number of sets of cells; and
the processor is further configured to:
determine $N_{max,1}$ to be a maximum number of cells in a set of cells from the number of sets of cells, that is scheduled by one of the first DCI formats, and
determine $N_{max,2}$ to be a maximum total number of transport blocks (TBs) or transport block groups (TBGs) across respective cells, in a respective set of cells from the number of sets of cells, that is scheduled by a DCI format from the first DCI formats, and
determine:
$M_{max}=N_{max,1}$ bundling is enabled, and
$M_{max}=N_{max,2}$ bundling is not enabled.

10. The UE of claim 7, wherein:
the HARQ-ACK sub-codebook further includes second HARQ-ACK information bits associated with second DCI formats, and
each DCI format from the second DCI formats:
schedules more than one PDSCH reception on a cell from second cells, and
is associated with moree than one HARQ-ACK information bit in response to the more than one PDSCH reception.

11. The UE of claim 7, wherein:
the processor is further configured to determine the first HARQ-ACK information bits based on respective DAI values in a second DCI format,
the DAI values correspond to the first HARQ-ACK information bits, and
the second DCI format schedules the PUSCH transmission.

12. The UE of claim 7, wherein the N cells are:
with a same sub-carrier spacing (SCS),
all frequency division duplex (FDD) carriers or all time division duplex (TDD) carriers, and
all in a first frequency range (FR1) or all in a second frequency range (FR2).

13. A base station comprising:
a transceiver configured to:
transmit:
first information for a number of sets of cells,
first downlink control information (DCI) formats, wherein each DCI format from the first DCI formats:
is associated with scheduling more than one physical downlink shared channel (PDSCH) transmission on more than one cell in a set of cells from the number of set of cells, and
includes a value for a counter downlink assignment index (DAI) field, wherein the value is based on a smallest cell index among the more than one cell,
K PDSCHs on N cells, in a first set of cells from the number of set of cells, that are scheduled by a DCI format from the first DCI formats; and
receive a physical uplink control channel (PUCCH) or a physical uplink shared channel (PUSCH) that includes a hybrid automatic repeat request acknowledgement (HARQ-ACK) sub-codebook that includes first HARQ-ACK information bits; and
a processor operably connected to the transceiver, the processor configured to:
identify the first HARQ-ACK information bits that are associated with the first DCI formats wherein the first HARQ-ACK information bits:
are ordered in ascending order of respective values of the counter DAI field, and
include, for the DCI format:
$M=\Sigma_{i=1}^{N}M_i$ HARQ-ACK information bits corresponding to transmissions of the K PDSCHs on the N cells, in ascending order of cell indexes for the N cells, and
$(M_{max}-M)$ HARQ-ACK information bits with negative acknowledgement (NACK) values that are appended to the M HARQ-ACK information bits,
wherein $M_i$ is a number of HARQ-ACK information bits associated with a transmission of one or more PDSCHs from the K PDSCHs, on cell i from the N cells, and
wherein $M_{max}$ is a maximum number of HARQ-ACK information bits for each DCI format from the first DCI formats.

14. The base station of claim 13, wherein:
a value for the counter DAI field in the DCI format is an accumulative number of pairs of a reference cell and a PDCCH monitoring occasion associated with the first DCI formats, up to a second reference cell for the DCI format and up to a second PDCCH monitoring occasion for detection of the DCI format,
ordering of the first DCI formats is first in ascending order of cell index for respective reference cells, and second in ascending order of respective PDCCH monitoring occasions for detection of the first DCI formats, and
the second reference cell is a cell with smallest index from the N cells.

15. The base station of claim 13, wherein:
the transceiver is further configured to transmit second information for enabling or disabling spatial bundling of HARQ-ACK information associated with a PUCCH group that includes the number of sets of cells,
the processor is further configured to determine:
determine $N_{max,1}$ to be a maximum number of cells in a set of cells from the number of sets of cells, that is scheduled by one of the first DCI formats, and
determine $N_{max,2}$ to be a maximum total number of transport blocks (TBs) or transport block groups (TBGs) across respective cells, in a respective set of cells from the number of sets of cells, that is scheduled by a DCI format from the first DCI formats, and
determine:
$M_{max}=N_{max,1}$ bundling is enabled, and
$M_{max}=N_{max,2}$ bundling is not enabled.

16. The base station of claim 13, wherein:
the HARQ-ACK sub-codebook further includes second HARQ-ACK information bits associated with second DCI formats, and each DCI format from the second DCI formats:
  schedules more than one PDSCH transmission on a cell from second cells, and
  is associated with more than one HARQ-ACK information bit in response to the more than one PDSCH transmission.

17. The base station of claim 13, wherein:
the first HARQ-ACK information bits are based on respective DAI values in a second DCI format,
the DAI values correspond to the first HARQ-ACK information bits, and
the second DCI format schedules the PUSCH reception.

18. The base station of claim 13, wherein the N cells are:
with a same sub-carrier spacing (SCS),
all frequency division duplex (FDD) carriers or all time division duplex (TDD) carriers, and
all in a first frequency range (FR1) or all in a second frequency range (FR2).

* * * * *